United States Patent
Yamamoto et al.

(10) Patent No.: US 9,134,524 B2
(45) Date of Patent: Sep. 15, 2015

(54) MICROSCOPE CONTROL DEVICE, IMAGE DISPLAY DEVICE, IMAGE MANAGEMENT SERVER, IN-FOCUS POSITION INFORMATION GENERATING METHOD, IMAGE DISPLAY METHOD, IMAGE MANAGEMENT METHOD AND MICROSCOPE IMAGE MANAGEMENT SYSTEM

(75) Inventors: Takashi Yamamoto, Tokyo (JP); Gakuho Fukushi, Tokyo (JP); Yoshihiro Wakita, Tokyo (JP); Seiji Miyama, Kanagawa (JP); Mana Miyakoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 418 days.

(21) Appl. No.: 13/175,327

(22) Filed: Jul. 1, 2011

(65) Prior Publication Data

US 2012/0007977 A1    Jan. 12, 2012

(30) Foreign Application Priority Data

Jul. 12, 2010 (JP) ................. 2010-157803
Dec. 27, 2010 (JP) ................. 2010-289776

(51) Int. Cl.
G02B 21/00 (2006.01)
G02B 21/36 (2006.01)
G02B 27/00 (2006.01)

(52) U.S. Cl.
CPC .......... *G02B 21/367* (2013.01); *G02B 27/0075* (2013.01)

(58) Field of Classification Search
CPC .. G02B 21/365; G02B 21/367; G02B 21/002; H04N 7/18; G01N 21/6458

USPC ............................................. 348/79; 396/89
See application file for complete search history.

(56) References Cited

U.S. PATENT DOCUMENTS

| | | |
|---|---|---|
| 6,031,930 A | 2/2000 | Bacus et al. |
| 6,101,265 A | 8/2000 | Bacus et al. |
| 6,226,392 B1 | 5/2001 | Bacus et al. |
| 6,272,235 B1 | 8/2001 | Bacus et al. |
| 6,396,941 B1 | 5/2002 | Bacus et al. |
| 6,404,906 B2 | 6/2002 | Bacus et al. |
| 6,522,774 B1 | 2/2003 | Bacus et al. |
| 6,674,881 B2 | 1/2004 | Bacus et al. |
| 6,674,884 B2 | 1/2004 | Bacus et al. |
| 6,775,402 B2 | 8/2004 | Bacus et al. |

(Continued)

FOREIGN PATENT DOCUMENTS

JP    2003-222801    8/2003

OTHER PUBLICATIONS

European Patent Office, Extended European Search Report, issued in connection with European Patent Application No. 11170580.2, mailed on Oct. 10, 2011. (7 pages).

*Primary Examiner* — Jay Patel
*Assistant Examiner* — Frank Huang
(74) *Attorney, Agent, or Firm* — K&L Gates LLP

(57) ABSTRACT

In one example embodiment, a microscope control device a controller configured to store a plurality of images having different depth positions. In one example embodiment, the microscope control device divides the plurality of images into a plurality of sub-regions. In one example embodiment, the microscope control device, for each sub-region, generates in-focus position information which corresponds to a depth position.

11 Claims, 33 Drawing Sheets

(56) References Cited

U.S. PATENT DOCUMENTS

| | | |
|---|---|---|
| 7,110,586 B2 | 9/2006 | Bacus et al. |
| 7,146,372 B2 | 12/2006 | Bacus et al. |
| 7,149,332 B2 | 12/2006 | Bacus et al. |
| 7,542,596 B2 | 6/2009 | Bacus et al. |
| 7,856,131 B2 | 12/2010 | Bacus et al. |
| 8,179,432 B2 * | 5/2012 | Yazdanfar et al. .............. 348/79 |
| 8,310,531 B2 * | 11/2012 | Nandy ............................ 348/79 |
| 2004/0004614 A1 | 1/2004 | Bacus et al. |
| 2005/0254696 A1 | 11/2005 | Bacus et al. |
| 2006/0045505 A1 * | 3/2006 | Zeineh et al. ................... 396/89 |
| 2006/0171582 A1 | 8/2006 | Eichhorn |
| 2006/0239534 A1 | 10/2006 | Sumida et al. |
| 2007/0169106 A1 | 7/2007 | Douglas et al. |
| 2009/0231362 A1 * | 9/2009 | Kaba et al. .................... 345/660 |

* cited by examiner

FIG. 10
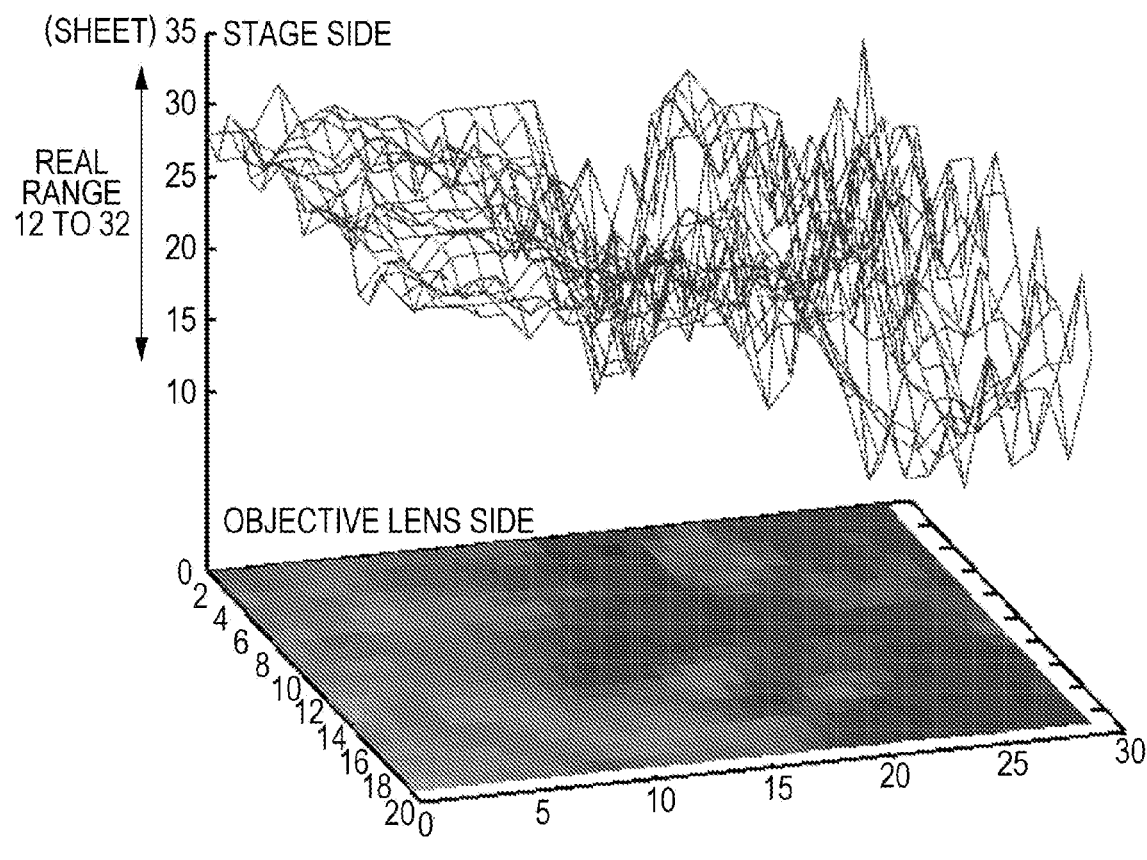
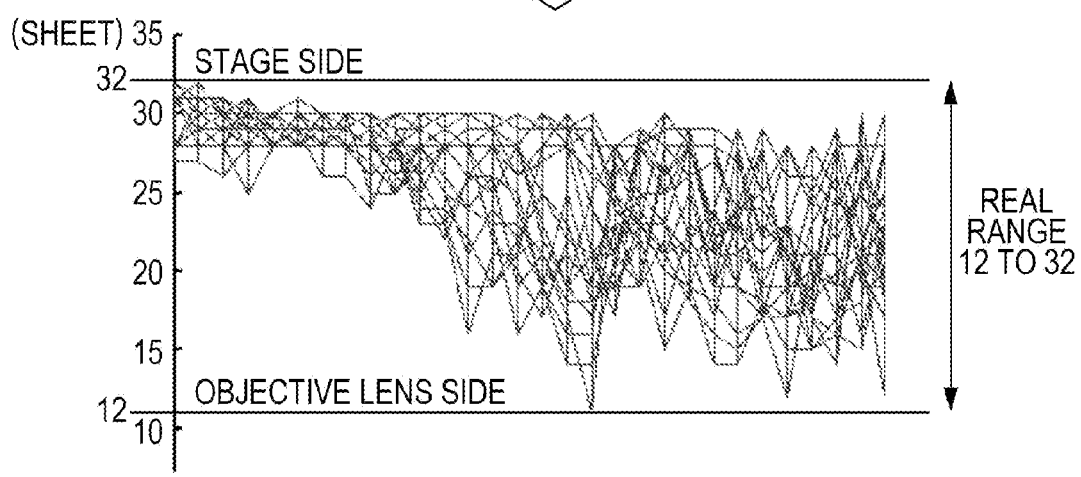

FIG. 11

| SUB-REGION ID | DIGITAL IMAGE IN AN IN-FOCUS STATE |
|---|---|
| 1 | 20 |
| 2 | 18 |
| 3 | 5 |
| 4 | 12 |
| 5 | 31 |
| ⋮ | ⋮ |

| SUB-REGION ID | DIGITAL IMAGE IN AN IN-FOCUS STATE |
|---|---|
| 1 | 20 |
| 2 | 18 |
| 3 | 5 |
| 4 | 12 |
| 5 | 31 |
| ⋮ | ⋮ |

ENTIRE REGION IN-FOCUS IMAGE

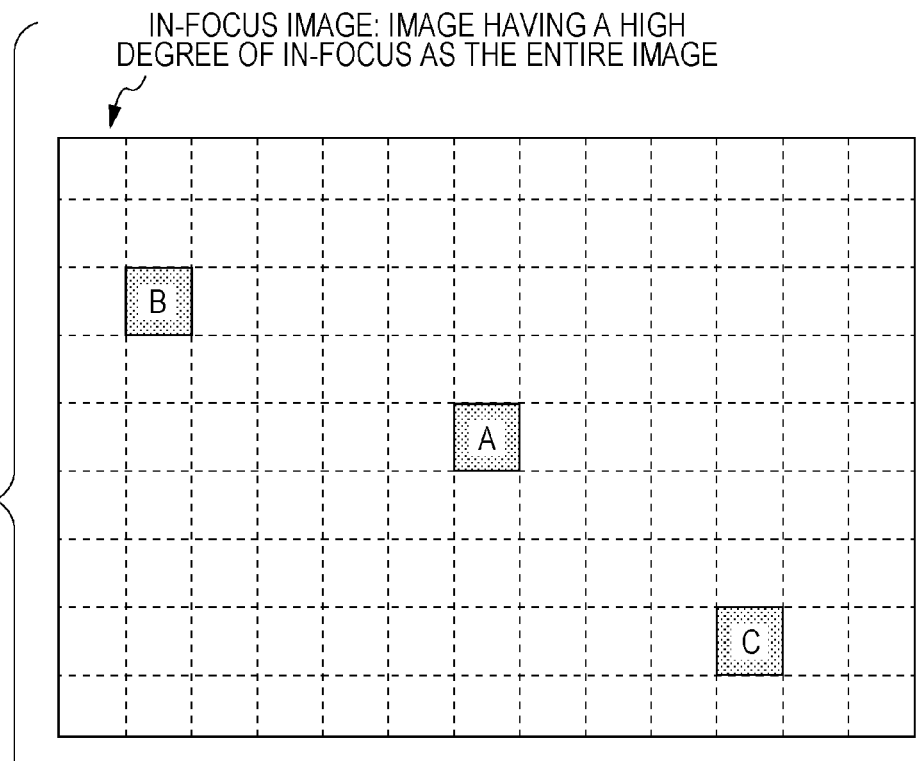
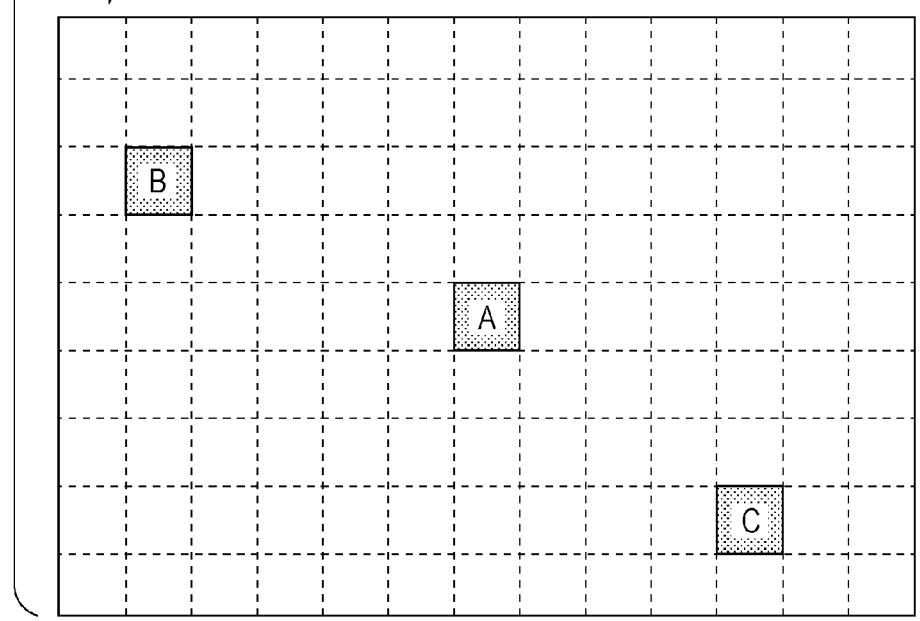
FIG. 13

FIG. 15
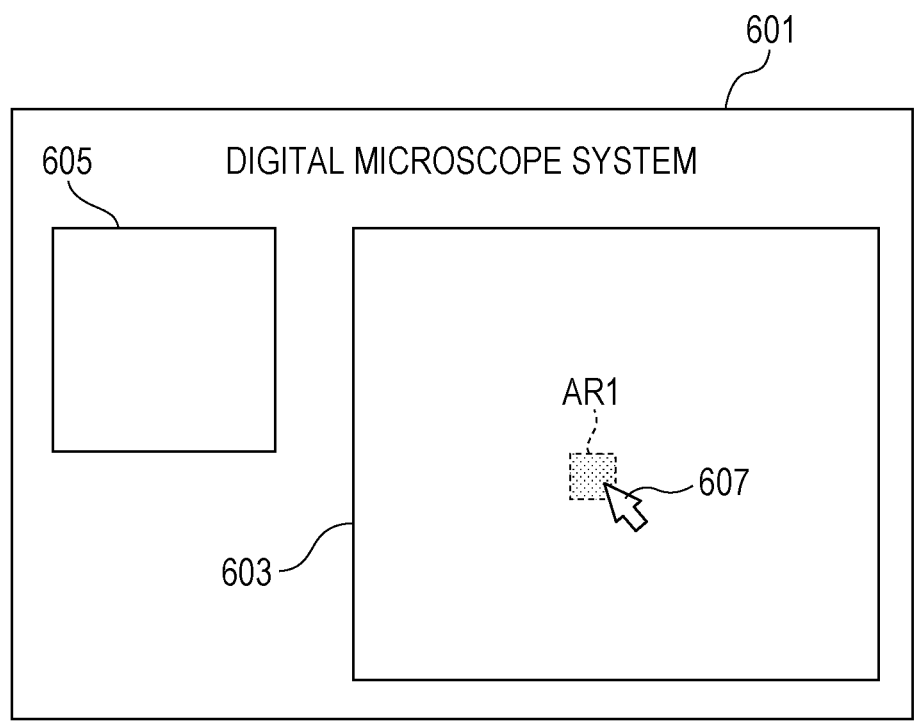
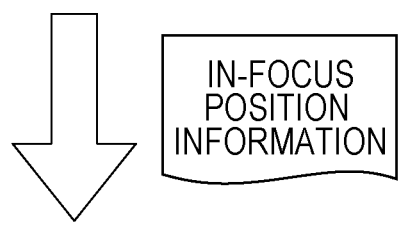
IN-FOCUS POSITION INFORMATION
SELECT IMAGE ON WHICH REGION AR1 IS IN AN IN-FOCUS STATE

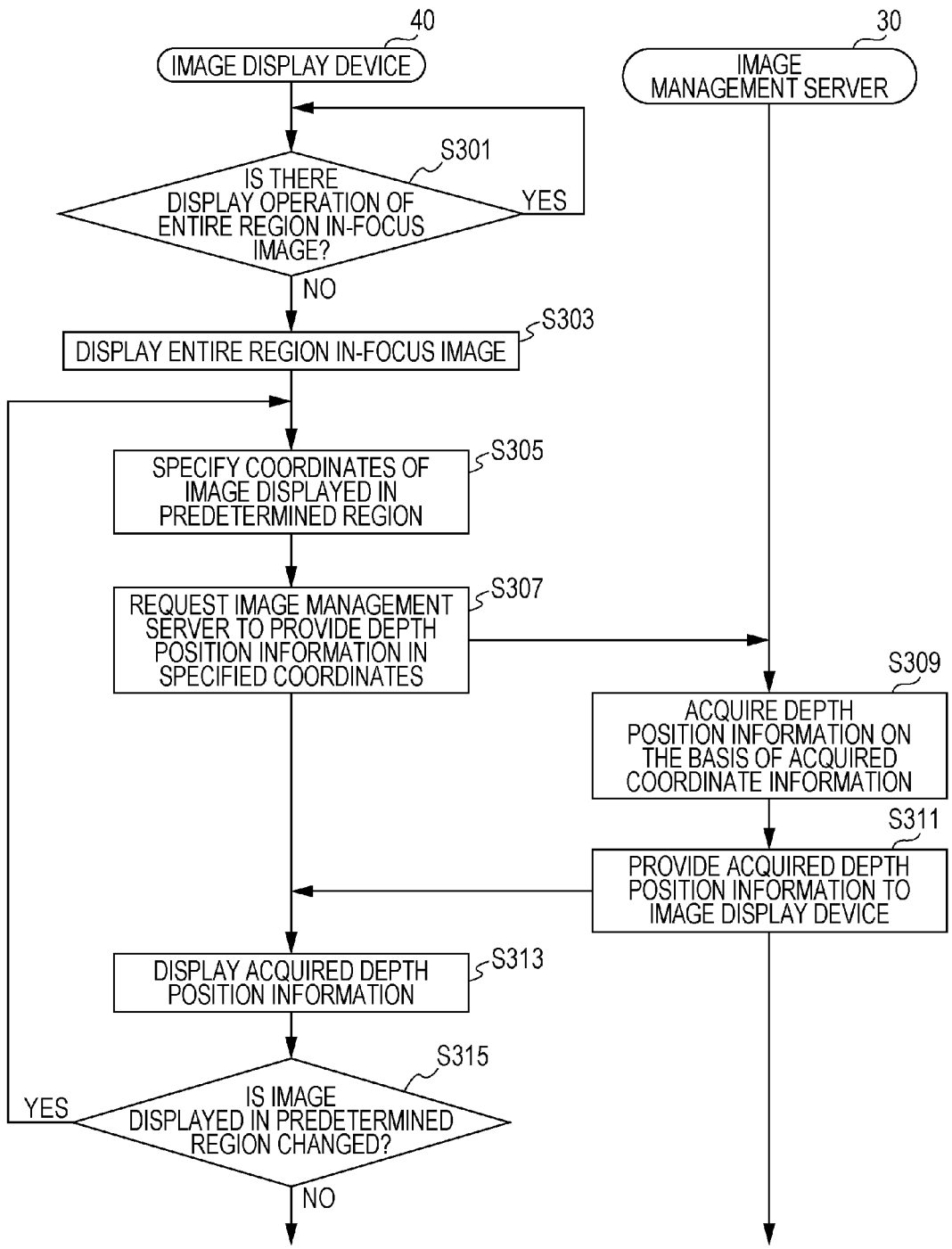

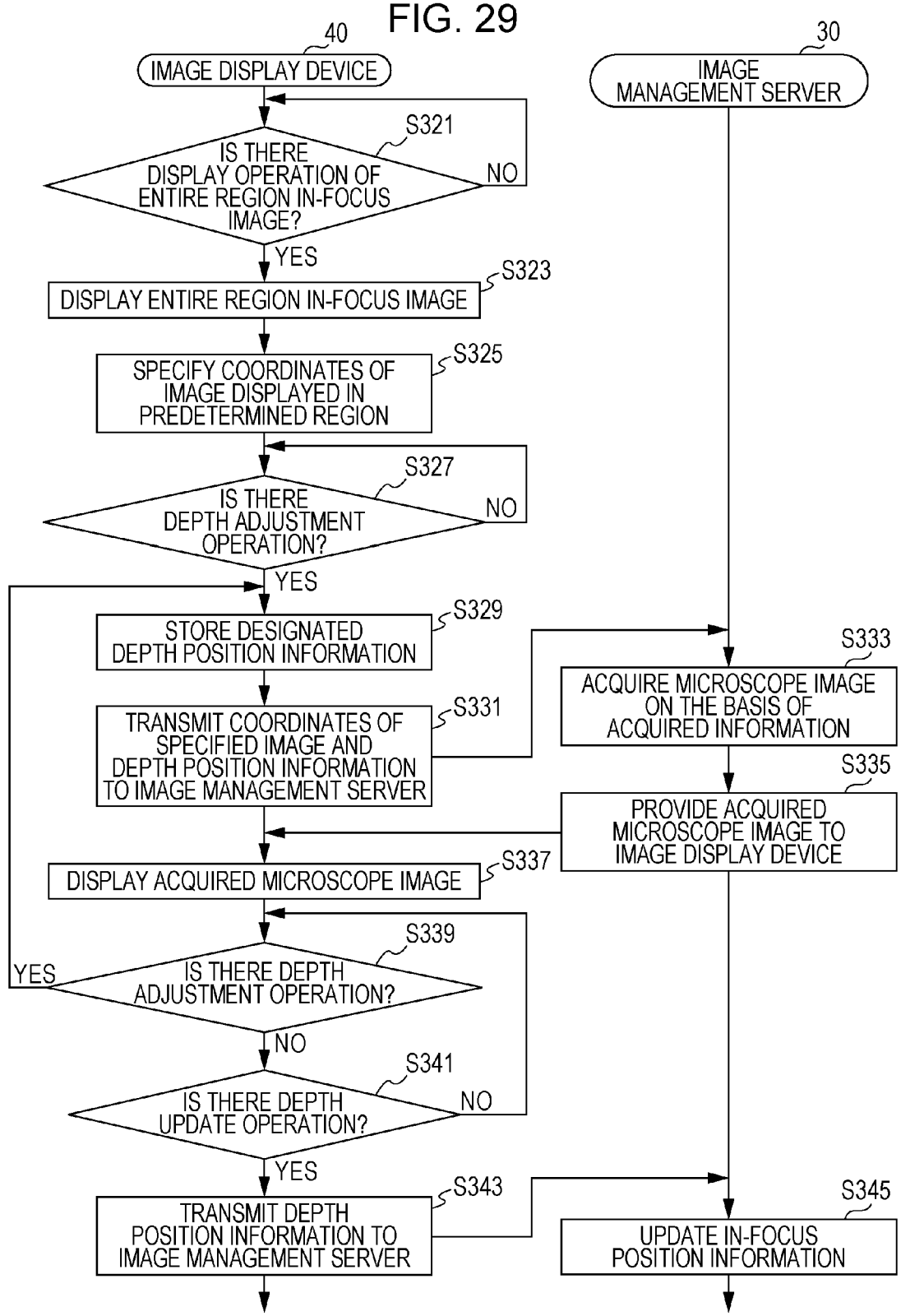

MICROSCOPE CONTROL DEVICE, IMAGE DISPLAY DEVICE, IMAGE MANAGEMENT SERVER, IN-FOCUS POSITION INFORMATION GENERATING METHOD, IMAGE DISPLAY METHOD, IMAGE MANAGEMENT METHOD AND MICROSCOPE IMAGE MANAGEMENT SYSTEM

CROSS REFERENCES TO RELATED APPLICATIONS

The present application claims priority to Japanese Patent Application No. JP 2010-157803, filed in the Japanese Patent Office on Jul. 12, 2010, and Japanese Patent Application JP 2010-289776 filed in the Japan Patent Office on Dec. 27, 2010, the entire contents of which is being incorporated herein by reference.

BACKGROUND

Techniques are proposed in which, using a microscope for observing samples such as cell tissue slides, images of the samples observed through the microscope are saved as digital images, and the saved digital images are observed by other devices provided over the Internet or an intranet (see, for example, Japanese Unexamined Patent Application Publication No. 2003-222801). The use of such techniques is able to promote the development of so-called telepathology in which doctors at remote places perform pathology diagnoses using networks.

Consequently, in a microscope that generates digital images of samples such as cell tissues, the samples are magnified using a magnification optical system and magnified images are projected into an image sensor to capture digital images. At this time, because the depth of field of the microscope is extremely narrow at about 1 μm or so, there is a necessary for multiple captured image data in which the focus position is deviated in the depth direction of the sample, in order to capture an image of the entire sample having a thickness. In addition, even when the sample is relatively small in thickness, there may be a case where the locally optimal in-focus positions are different from each other in one magnified image due to undulation or the irregularities of the cell tissue, and there may be a case where multiple captured image data are necessary in which the focus positions are deviated in the depth direction.

In addition, observers of the digital images operate an input unit such as a mouse in a terminal for observing the digital images, and observe data of digital images captured in advance. At this time, the operators observe the digital images of the targeted sample while changing the positions of observation in a three-dimensional manner such as right to left, up and down and in the depth direction as though the operators were viewing the slide through the microscope by operating the input unit. Here, when the multiple captured sample images are observed in the depth direction, the operators operate a mouse wheel and the like, and can perform focus adjustment by themselves.

However, as mentioned above, because the thickness or undulation exists in the sample to be observed, the operators of the terminal for observing the digital images have to perform focus adjustment each time they change sites of observation. However, there is a problem in that such focus adjustment puts the observers to much trouble.

SUMMARY

Accordingly, the present disclosure is to provide a microscope control device, an image display device, an image management server, an in-focus position information generating method, an image display method, an image management method and a microscope image management system which are capable of suppressing a load associated with focus adjustment at the time of observing a microscope image and improving the convenience of an observer.

In one example embodiment, a microscope control device includes a controller configured to: (a) store a plurality of images having different depth positions; (b) divide the plurality of images into a plurality of sub-regions; and (c) for each sub-region, generate in-focus position information which corresponds to a depth position.

In one example embodiment, for each sub-region, the in-focus position information indicates: (a) said sub-region; and (b) one of the plurality of images in an in-focus state.

In one example embodiment, the plurality of images include a first image and a second image. In one example embodiment, the controller is configured to divide: (i) the first image into a first number of sub-regions having a first plurality of positions; and (ii) the second image into the second number of sub-regions having a second plurality of positions. In one example embodiment, the first plurality of positions correspond to the second plurality of positions.

In one example embodiment, the controller is configured to, for each of the plurality of images with respect to a sub-region of interest: (a) calculate an evaluation value of contrast; and (b) using the calculated evaluation value, determine which of the plurality of images is in an in-focus state.

In one example embodiment, the controller is configured to generate, as the in-focus position information, at least one of a color distribution map and a look-up table.

In one example embodiment, the controller is configured to generate, using the generated in-focus position information, an entire region in-focus image in which an entire plane surface corresponding to the in-focus image is in an in-focus state.

In one example embodiment, the plurality of images are acquired from a microscope.

In one example embodiment, a information processing apparatus includes a microscope control device including a controller configured to: (a) store a plurality of images having different depth positions; (b) divide the plurality of images into a plurality of sub-regions; and (c) for each sub-region, generate in-focus position information which corresponds to a depth position.

In one example embodiment, the information processing apparatus is a microscope.

In one example embodiment, an information processing system includes a display device, an information management server, a microscope, and a microscope control device. In one example embodiment, the microscope control device includes a controller configured to: (a) store a plurality of images having different depth positions; (b) divide the plurality of images into a plurality of sub-regions; and (b) for each sub-region, generate in-focus position information which corresponds to a depth position.

In one example embodiment, the controller is configured to: (a) cause the display device to display a selectable first icon; and (b) in response to a selection of the selectable first icon, cause the display device to display an entire in-focus image.

In one example embodiment, the controller is configured to: (a) cause the display device to display one of the plurality of images; and (b) enable a user to select one of the sub-regions of the display image; (b) for the selected sub-region, cause the display device to display information indicating a depth position of a selected sub-region.

In one example embodiment, a method of operating a microscope control device which includes a controller includes (a) causing the controller to store a plurality of images having different depth positions; (b) causing the controller to divide the plurality of images into a plurality of sub-regions; and (c) causing the controller to, for each sub-region, generate in-focus position information which corresponds to a depth position.

In one example embodiment, a non-transitory computer-readable medium stores instructions which are structured to cause an information processing apparatus to: (a) store a plurality of images having different depth positions; (b) divide the plurality of images into a plurality of sub-regions; and (c) for each sub-region, generate in-focus position information which corresponds to a depth position.

As described above, according to the example embodiments of the present disclosure, because the in-focus position information indicating a local in-focus position of the microscope image is generated with respect to the microscope image of the sample, it is possible to suppress a load associated with focus adjustment at the time of observing the microscope image, and to improving the convenience of an observer.

Additional features and advantages are described herein, and will be apparent from the following Detailed Description and the figures.

BRIEF DESCRIPTION OF THE FIGURES

FIG. 10 is an explanatory diagram illustrating the distribution of the in-focus positions.

FIG. 11 is an explanatory diagram illustrating an example of in-focus position information according to the example embodiment.

FIG. 13 is an explanatory diagram illustrating the all-in-focus image according to the example embodiment.

FIG. 15 is an explanatory diagram illustrating an example of a display screen of the image display device according to the example embodiment.

FIG. 28 is a flow diagram illustrating an example of a flow of display control processing of the microscope image according to the example embodiment.

FIG. 29 is a flow diagram illustrating an example of a flow of display control processing the microscope image according to the example embodiment.

DETAILED DESCRIPTION

Figure 1:
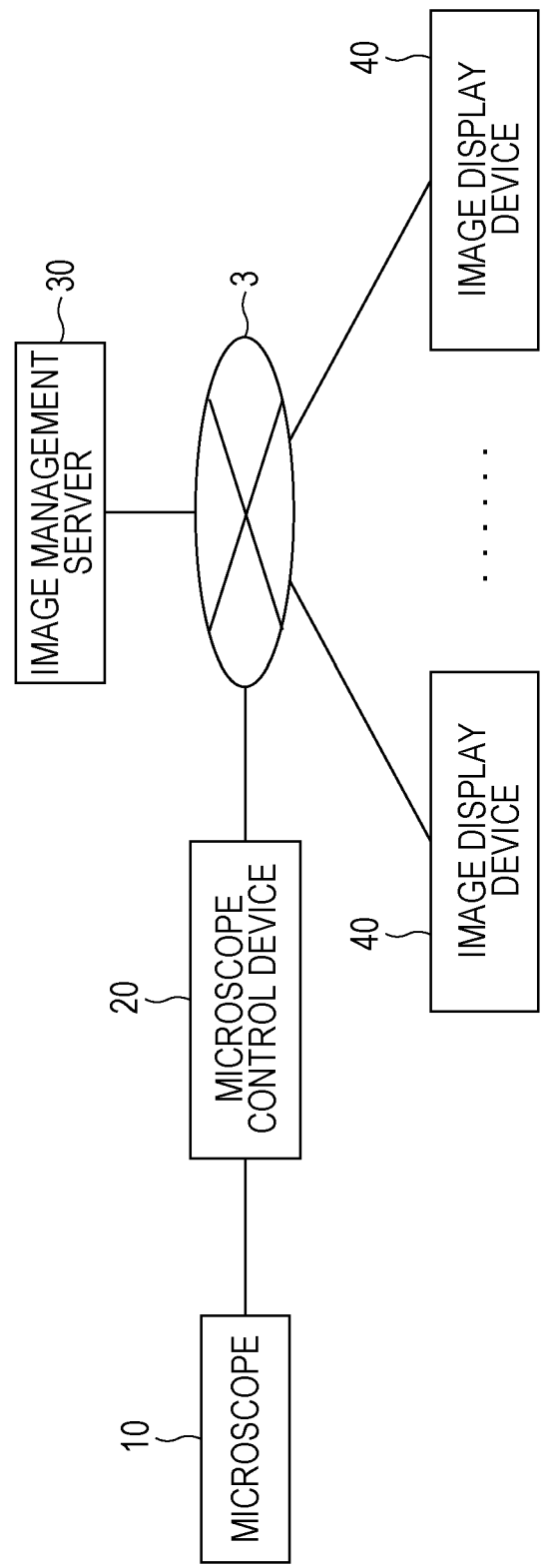
FIG. 1 is an explanatory diagram illustrating the configuration of a microscope image management system according to a first example embodiment of the present disclosure.

Hereinafter, preferred example embodiments of the present disclosure will be described in detail with reference to the accompanying drawings. In the present specification and the drawings, the same reference numerals and signs are assigned to components having the substantially the same function configuration and thus description thereof will not be repeated.

The description will be made in the following order.
(1) First Example Embodiment
(1-1) With Respect to the Configuration of Microscope Image Management System
(1-2) With Respect to the Entire Configuration of Microscope
(1-3) With Respect to the Entire Configuration of Microscope Control Device
(1-4) With Respect to the Configuration of Overall Control Section
(1-5) With Respect to the Configuration of Image Display Device
(1-6) With Respect to an Example of Display Screen
(1-7) With Respect to Flow of Method of Generating Focusing Position Information
(1-8) With Respect to Flow of Image Display Method
(2) Second Example Embodiment
(2-1) With Respect to the Configuration of Image Management Server
(2-2) With Respect to the Configuration of Image Display Device
(2-4) With Respect to an Example of Display Screen and Display Control Processing of Microscope Image
(2-5) With Respect to Flow of Display Control Method of Microscope Image
(3) With Respect to Hardware Configuration of Microscope Control Device and Image Display Device According to Example embodiment of the Present Disclosure In what follows, as a sample captured by a microscope, description will be made of an example of a biological sample (cell tissue sample) including a smear cell or a tissue section of a connective tissue such as blood, an epithelial tissue or both of these tissues, and the like, but not limited thereto.

First Example Embodiment

With Respect to the Configuration of Microscope Image Management System

First, reference will be made to FIG. 1 to describe the configuration of a microscope image management system 1 according to a first example embodiment of the present disclosure. FIG. 1 is an explanatory diagram illustrating the configuration of the microscope image management system 1 according to the example embodiment.

The microscope image management system 1 according to the example embodiment includes a microscope 10, a microscope control device 20, an image management server 30 and an image display device 40, as shown in FIG. 1. The microscope control device 20, the image management server 30 and the image display device 40 are connected to each other through a network 3.

The network 3 is a communication network that allows the microscope control device 20, the image management server 30 and the image display device 40 according to the example embodiment to be connected to each other in two-way communication. This network 3 includes, for example, public networks such as the Internet, telephone networks, satellite communication networks, and multicast communication channels, or leased line networks such as WANs (Wide Area Networks), LANs (Local Area Networks), IP-VPNs (Internet Protocol-Virtual Private Networks), Ethernet (registered trademark), and wireless LANs, and wired/wireless networks are no matter. In addition, this network 3 may be a communication network exclusively provided to the microscope image management system 1 according to the example embodiment.

The microscope 10 irradiates a sample (for example, biological sample) placed on a stage of the microscope 10 with predetermined illumination light, and captures light transmitted through this sample, or light emitted from the sample, and the like. The entire configuration of the microscope 10 according to the example embodiment will be described in detail below again.

The microscope 10 is controlled by the microscope control device 20, and the sample image captured by the microscope 10 is stored in the image management server 30 through the microscope control device 20.

The microscope control device 20 is a device that controls the microscope 10 for capturing an image of the sample. The microscope control device 20 controls the microscope 10 to capture a digital image of the sample, and performs predetermined digital processing on obtained digital image data of the sample. In addition, the microscope control device 20 uploads the obtained digital image data of the sample to the image management server 30.

The image management server 30 is a device that stores the digital image data of the sample captured by the microscope 10, and manages these digital image data. When the digital image data of the sample is output from the microscope control device 20, the image management server 30 stores the acquired digital image data of the sample in a predetermined storage region to allow an observer to use the image data. In addition, when observation of the digital image data of a certain sample is requested from the image display device 40 (that is, device corresponding to a viewer) operated by the observer, the image management server 30 provides the digital image data of the corresponding sample to the image display device 40.

The image display device 40 is a terminal (that is, device corresponding to a viewer) operated by a person who intends to observe the digital image data of the sample. A person who hopes to observe the digital image data refers to a list of the digital image data, and the like, stored in the image management server 30 to specify the digital image data he or she intends to observe, and requests the image management server 30 to provide the specified digital image data. When the digital image data are provided from the image management server 30, an image corresponding to the provided digital image data is displayed on a display and the like of the image display device 40, and a person who hopes to perform observation is able to observe the image.

The detailed configuration of the microscope control device 20 and the image management server 30 according to the example embodiment will be described below again.

In FIG. 1, although a case where each one of the microscope 10, the microscope control device 20 and the image management server 30 belonging to the system 1 exists is shown, the number of the microscopes 10, the microscope control devices 20 and the image management servers 30 belonging to the microscope image management system 1 is not limited to the example of FIG. 1, and multiple numbers may exist.

<With Respect to the Entire Configuration of Microscope>

Figure 2:
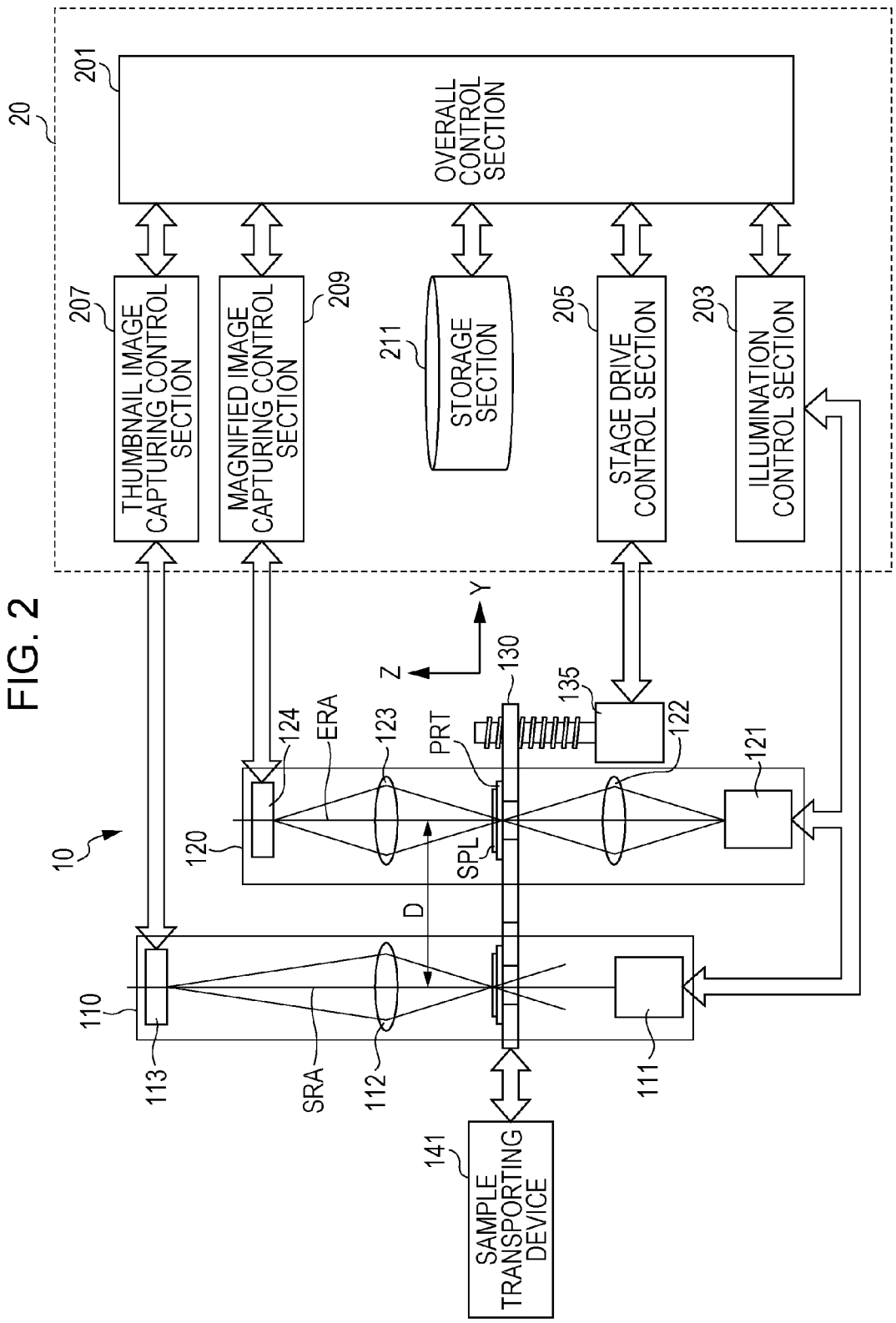
FIG. 2 is an explanatory diagram illustrating the entire configuration of a microscope and a microscope control device according to the example embodiment.

Subsequently, reference will be made to FIG. 2 to describe the entire configuration of the microscope 10 according to the example embodiment. FIG. 2 is an explanatory diagram illustrating the entire configuration of the microscope 10 and the microscope control device 20 according to the example embodiment.

[Entire Configuration]

As shown in FIG. 2, the microscope 10 according to the example embodiment includes a thumbnail image capturing section 110 that captures an image of the entire prepared slide PRT (hereinafter, this image is also called a thumbnail image) on which a biological sample SPL is arranged, and a magnified image capturing section 120 that captures an image in which the biological sample SPL is magnified at a predetermined magnification (hereinafter, this image is also called a magnified image).

The prepared slide PRT is to fix the biological sample SPL including a smear cell or a tissue section of a connective tissue such as blood, an epithelial tissue or both of these tissues, and the like, to a glass slide by a predetermined fixing method. Various types of stains are performed on the tissue section or the smear cell, as necessary. The stains include not only general stain represented by HE (hematoxylin-eosin) stain, Giemsa stain or Papanicolaou stain, and the like, but also fluorescence stain such as FISH (Fluorescence In-Situ Hybridization) or an enzyme antibody method.

In addition, a label on which supplementary information (for example, name of a person who collected a sample, date and time of collection, types of stains, and the like) for specifying the corresponding biological sample SPL is listed may be attached to the prepared slide PRT.

The microscope 10 according to the example embodiment is provided with a stage 130 on which the prepared slide PRT as mentioned above is placed, and is further provided with a stage drive mechanism 135 for moving the stage 130 in various directions. The stage 130 can be freely moved by this stage drive mechanism 135 in a direction (X-axis and Y-axis direction) parallel to the stage surface, and in a direction (Z-axis direction) perpendicular to this.

In addition, the microscope 10 according to the example embodiment may be provided with a sample transport device 141 that transports the prepared slide PRT including the sample SPL to a stage 130. The sample of which an image is to be captured is automatically installed on the stage 130 by providing such a transporting device 141, thereby allowing replacement of the sample SPL to be automated.

[Thumbnail Image Capturing Section]

As shown in FIG. 2, the thumbnail image capturing section 110 mainly includes a light source 111, an objective lens 112, and an image capturing element 113.

The light source 111 is provided at the side of the surface opposite to the prepared slide arrangement surface of the stage 130. The light source 111 can emit light by switching between light illuminating the biological sample SPL on which the general stain is performed (hereinafter, bright-field illumination light, or also simply referred to as illumination light) and light illuminating the biological sample SPL on which the special stain is performed (hereinafter, also referred to as dark-field illumination light). In addition, the light source 111 may emit only one of the bright-field illumination light or the dark-field illumination light. In this case, the light source 111 is provided with two types of light sources including a light source that emits the bright-field illumination light and a light source that emits the dark-field illumination light.

Further, the thumbnail image capturing section 110 may be separately provided with a label light source (not shown) that emits light for capturing an image of supplementary information listed on the label attached to the prepared slide PRT.

The objective lens 112 with a predetermined magnification is arranged at the prepared slide arrangement surface side of the stage 130, using a normal line of a reference position of the thumbnail image capturing section 110 in the prepared slide arrangement surface as the optical axis SRA. Light transmitted through the prepared slide PRT arranged on the stage 130 is condensed by this objective lens 112, and forms an image on the image capturing element 113 provided at the rear (that is, traveling direction of the illumination light) of the objective lens 112.

Light in the image capturing range including the entire prepared slide PRT (in other words, light transmitted through the entire prepared slide PRT) placed on the prepared slide arrangement surface of the stage 130 forms an image on the image capturing element 113. The image formed on this image capturing element 113 becomes a thumbnail image which is a microscope image obtained by capturing the image of the entire prepared slide PRT.

[Magnified Image Capturing Section]

As shown in FIG. 2, the magnified image capturing section 120 mainly includes a light source 121, a condenser lens 122, an objective lens 123, and an image capturing element 124.

The light source 121 serves to emit the bright-field illumination light, and is provided at the side of the surface opposite to the prepared slide arrangement surface of the stage 130. In addition, a light source (not shown) that emits the dark-field illumination light is provided at a position (for example, prepared slide arrangement surface side) different from that of the light source 121.

The condenser lens 122 is a lens that condenses the bright-field illumination light emitted from the light source 121 or the dark-field illumination light emitted from a light source for dark-field illumination, and guides the light to the prepared slide PRT on the stage 130. This condenser lens 122 is arranged between the light source 121 and the stage 130, using a normal line of a reference position of the magnified image capturing section 120 in the prepared slide arrangement surface as the optical axis ERA.

The objective lens 123 with a predetermined magnification is arranged at the prepared slide arrangement surface side of the stage 130, using a normal line of a reference position of the magnified image capturing section 120 in the prepared slide arrangement surface as the optical axis ERA. In the magnified image capturing section 120, this objective lens 123 is appropriately exchanged, so that the biological sample SPL can be magnified at various magnifications to capture the image thereof. Light transmitted through the prepared slide PRT arranged on the stage 130 is condensed by this objective lens 123, and forms an image on the image capturing element 124 provided at the rear (that is, traveling direction of the illumination light) of the objective lens 123.

An image in the image capturing range including a predetermined horizontal width and a vertical width on the prepared slide arrangement surface of the stage 130 is formed on the image capturing element 124 in accordance with the pixel size of the image capturing element 124 and the magnification of the objective lens 123. Because a portion of the biological sample SPL is magnified by the objective lens 123, the above-mentioned image capturing range becomes sufficiently narrower than the image capturing range of the image capturing element 113.

Here, as shown in FIG. 2, the thumbnail image capturing section 110 and the magnified image capturing section 120 are arranged so that the optical axis SRA and the optical axis ERA which are normal lines of each of the reference positions are away from each other by a distance D in the Y-axis direction. This distance D is set to a near distance in order that an image of a lens tube (not shown) that holds the objective lens 123 of the magnified image capturing section 120 in the image capturing range of the image capturing element 113 is not formed and the lens tube is miniaturized.

Image capturing elements provided to the thumbnail image capturing section 110 and the magnified image capturing section 120, respectively, may be one-dimensional image capturing elements, and may be two-dimensional image capturing elements.

<With Respect to the Entire Configuration of Microscope Control Device>

The microscope control device 20 for controlling various sites of the microscope is connected to the microscope 10 according to the example embodiment, as shown in FIG. 2. This microscope control device 20 mainly includes, as shown in FIG. 2, an overall control section 201, an illumination control section 203, a stage drive control section 205, a thumbnail image capturing control section 207, a magnified image capturing control section 209, and a storage section 211.

Here, the illumination control section 203 is a processing section that controls various types of light sources, included in the microscope 10, such as the light source 111 and the light source 121, and the stage drive control section 205 is a processing section that controls the stage drive mechanism 135. In addition, the thumbnail image capturing control section 207 is a processing section that controls the image capturing element 113 for capturing the thumbnail image, and the magnified image capturing control section 209 is a processing section that controls the image capturing element 124 for capturing the magnified image of the biological sample SPL. These control sections are connected to the sites that perform the control through various types of data communication channels.

In addition, the microscope control device 20 according to the example embodiment is separately provided with the control section (overall control section 201) that performs the control of the entire microscope, and is connected to various types of control sections mentioned above through various types of data communication channels.

These control sections are implemented by a CPU (Central Processing Unit), a GPU (Graphics Processing Unit), a ROM (Read Only Memory), a RAM (Random Access Memory), a storage unit, a communication unit, an operational circuit, and the like.

The storage section 211 is an example of the storage unit included in the microscope control device 20 according to the example embodiment. Various types of setting information for controlling the microscope 10 according to the example embodiment, various types of databases, a look-up table such as a load forecast table, and the like are stored in the storage section 211. In addition, various types of history information such as an image capturing history of a sample in the microscope 10 may be recorded in the storage section 211. Further, various parameters or processes during processing which are necessary to be saved when the microscope control device 20 according to the example embodiment performs some kind of processing, or various types of databases or programs, and the like are appropriately recorded in the storage section 211.

In the storage section 211, each of the processing sections included in the microscope control device 20 can freely perform read/write.

Hereinafter, functions of the above-mentioned control sections except for the overall control section 201 will be described in brief. In addition, the overall control section 201 will be described below in detail again.

[Illumination Control Section]

The illumination control section 203 is a processing section that controls various types of light sources included in the microscope 10 according to the example embodiment. When information indicating a method of illuminating the biological sample SPL is output from the overall control section 201, the illumination control section 203 performs the illumination control of the corresponding light source on the basis of the information indicating the acquired illumination method.

For example, attention is focused on a case where the illumination control section 203 controls the light source 111 provided to the thumbnail image capturing section 110. In such a case, the illumination control section 203 refers to the information indicating the illumination method to determine whether to execute either a mode to acquire the bright-field image (hereinafter, also called the bright-field mode) or a mode to acquire the dark-field image (hereinafter, also called the dark-field mode). Thereafter, the illumination control section 203 sets parameters in accordance with each of the modes with respect to the light source 111, and causes illumination light suitable for each of the modes to be emitted from the light source 111. Thereby, the illumination light emitted from the light source 111 illuminates the entire biological sample SPL through an opening of the stage 130. The parameters set by the illumination control section 203 can include, for example, the intensity of the illumination light or selection of the types of the light sources, and the like.

In addition, attention is focused on a case where the illumination control section 203 controls the light source 121 provided to the magnified image capturing section 120. In such a case, the illumination control section 203 refers to the information indicating the illumination method to determine whether to execute either the bright-field mode or the dark-field mode. Thereafter, the illumination control section 203 sets the parameters in accordance with each of the modes with respect to the light source 121, and causes the illumination light suitable for each of the modes to emitted from the light source 121. Thereby, the illumination light emitted from the light source 121 illuminates the entire biological sample SPL through the opening of the stage 130. The parameters set by the illumination control section 203 can include, for example, the intensity of the illumination light or selection of the types of the light sources, and the like.

As the illumination light in the bright-field mode, visible light is preferably used. In addition, as the illumination light in the dark-field mode, light including a wavelength capable of exciting a fluorescent marker used in the special stain is preferably used. In the dark-field mode, the background portion for the fluorescent marker is cut out.

[Stage Drive Control Section]

The stage drive control section 205 is a processing section that controls the stage drive mechanism 135 for driving the stage provided to the microscope 10 according to the example embodiment. When the information indicating a method of capturing an image of the biological sample SPL is output from the overall control section 201, the stage drive control section 205 controls the stage drive mechanism 135 on the basis of the information indicating the acquired image capturing method.

For example, attention is focused on a case where the thumbnail image is captured by the microscope 10 according to the example embodiment. When information about the purport to capture the thumbnail image of the biological sample SPL is output from the overall control section 201, the stage drive control section 205 moves the stage 130 in the stage surface direction (X-Y-axis direction) so that the entire prepared slide PRT enters the image capturing range of the image capturing element 113. In addition, the stage drive control section 205 moves the stage 130 in the Z-axis direction so as to focus the objective lens 112 on the entire prepared slide PRT.

In addition, attention is focused on a case where the magnified image is captured by the microscope 10 according to the example embodiment. When information about the purport to capture the magnified image of the biological sample SPL is output from the overall control section 201, the stage drive control section 205 moves the stage 130 in the stage surface direction so that the biological sample SPL is located between the condenser lens 122 and the objective lens 123 from between the light source 111 and the objective lens 112 by driving the stage drive mechanism 135.

In addition, the stage drive control section 205 moves the stage 130 in the stage surface direction (X-Y-axis direction) so that a predetermined site of the biological sample is located in the image capturing range formed on the image capturing element 124.

Further, the stage drive control section 205 moves the stage 130 in a direction (Z-axis direction and depth direction of the tissue section) perpendicular to the stage surface so as to focus the objective lens 123 on the site of the biological sample SPL located within a predetermined image capturing range by driving the stage drive mechanism 135.

[Thumbnail Image Capturing Control Section]

The thumbnail image capturing control section 207 is a processing section that controls the image capturing element 113 provided to the thumbnail image capturing section 110. The thumbnail image capturing control section 207 sets the parameters in accordance with the bright-field mode or the dark-field mode in the image capturing element 113. In addition, when an output signal corresponding to an image formed on the image formation surface of the image capturing element 113, which is output from the image capturing element 113, is acquired, the thumbnail image capturing control section 207 uses the acquired output signal as an output signal corresponding to the thumbnail image. When the output signal corresponding to the thumbnail image is acquired, the thumbnail image capturing control section 207 outputs data (RAW data) corresponding to the acquired signal to the overall control section 201. The parameters set by the thumbnail image capturing control section 207 can include, for example, start timing and end timing of exposure, and the like.

[Magnified Image Capturing Control Section]

The magnified image capturing control section 209 is a processing section that controls the image capturing element 124 provided to the magnified image capturing section 120. The magnified image capturing control section 209 sets the parameters in accordance with the bright-field mode or the dark-field mode in the image capturing element 124. In addition, when an output signal corresponding to an image formed on the image formation surface of the image capturing element 124, which is output from the image capturing element 124, is acquired, the magnified image capturing control section 209 uses the acquired output signal as an output signal corresponding to the magnified image. When the output signal corresponding to the magnified image is acquired, the magnified image capturing control section 209 outputs data (RAW data) corresponding to the acquired signal to the overall control section 201. The parameters set by the magnified image capturing control section 209 can include, for example, start timing and end timing of exposure, and the like.

[Overall Control Section]

The overall control section 201 is a processing section that controls the entire microscope including various types of control sections mentioned above. The overall control section 201 acquires data regarding the thumbnail image and the magnified image captured by the microscope 10 from the microscope 10, to develop these data or perform predetermined digital processing. Thereafter, the overall control section 201 uploads microscope image data including the thumbnail image and the magnified image to the image management server 30 through the network 3. Thereby, the microscope image of the sample captured by the microscope 10 can be observed by the image display device 40 which is a client device connected to the network 3.

<With Respect to Configuration of Overall Control Section>

Figure 3:
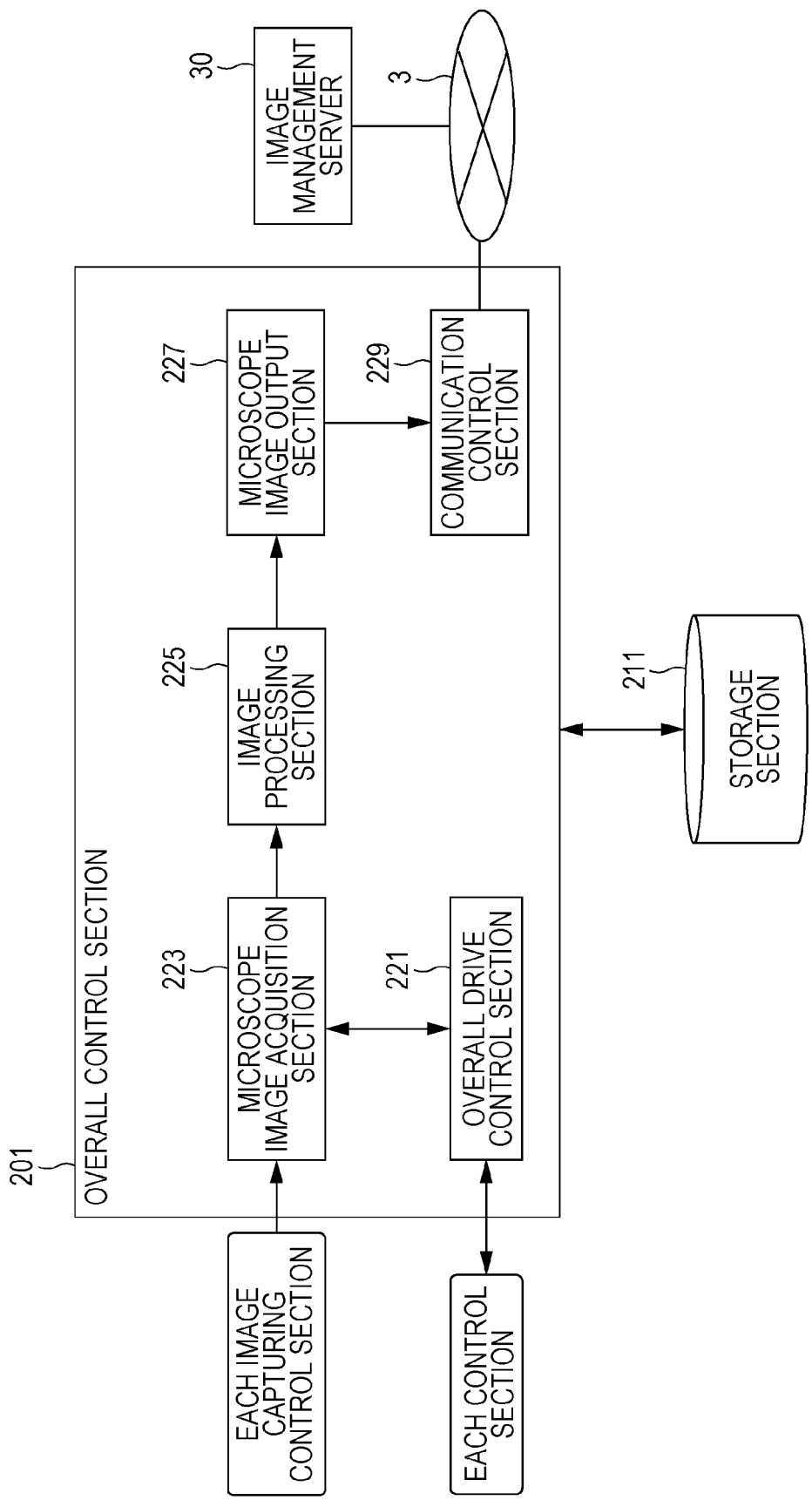
FIG. 3 is a block diagram illustrating the configuration of an overall control section of the microscope control device according to the example embodiment.
Figure 4:
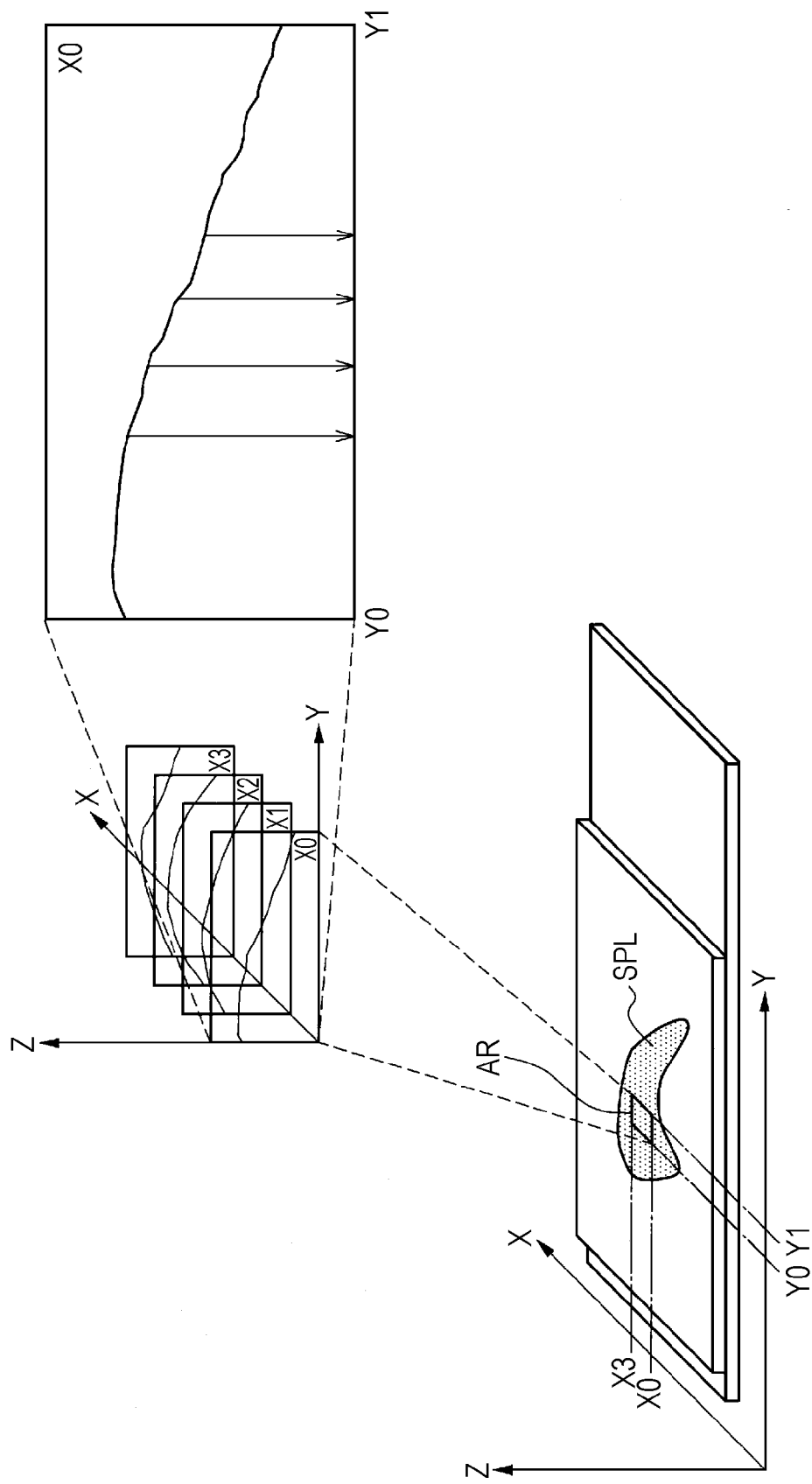
FIG. 4 is an explanatory diagram illustrating a microscope image.
Figure 5:
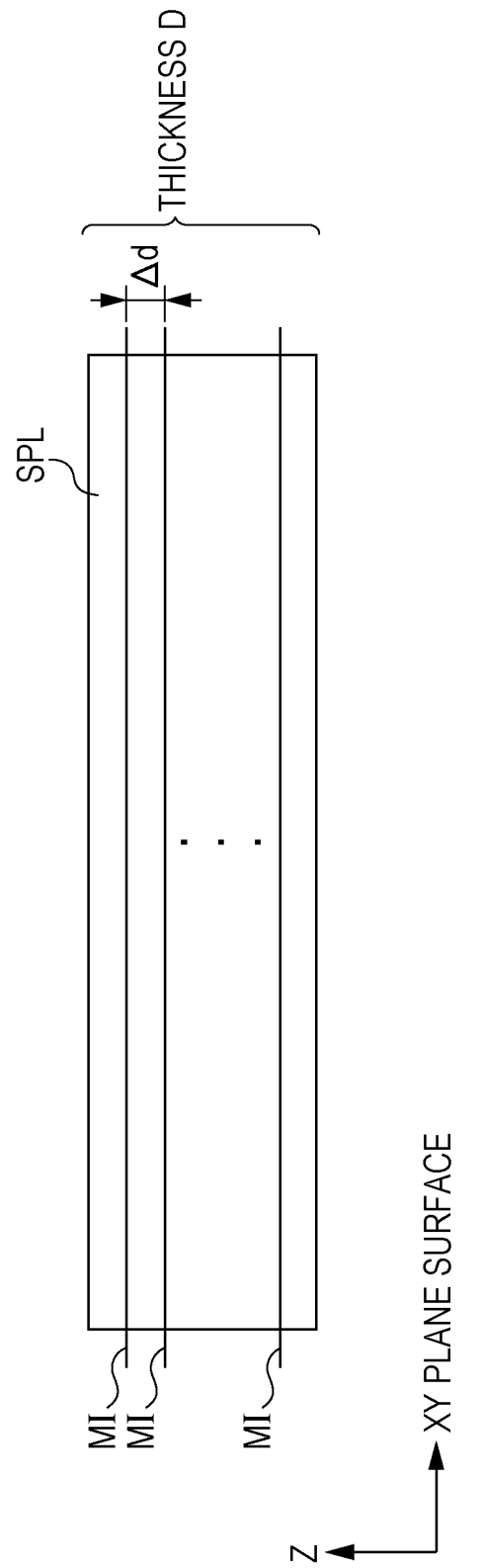
FIG. 5 is an explanatory diagram illustrating the microscope image.

Next, the configuration of the overall control section 201 according to the example embodiment will be described in detail with reference to FIG. 3. FIG. 3 is a block diagram illustrating the configuration of the overall control section 201 according to the example embodiment.

As shown in FIG. 3, the overall control section 201 according to the example embodiment mainly includes an overall drive control section 221, a microscope image acquisition section 223, an image processing section 225, a microscope image output section 227, and a communication control section 229.

The overall drive control section 221 is implemented by, for example, a CPU, a ROM, a RAM, and the like. The overall drive control section 221 is a drive control section that overall controls the control sections (illumination control section 203, stage drive control section 205, thumbnail image capturing control section 207 and magnified image capturing control section 209) for controlling each of the sites of the microscope 10. The overall drive control section 221 sets various types of information (for example, various types of setting parameters, and the like) with respect to each of the sites of the microscope 10, or acquires various types of information from each of the sites of the microscope 10.

The slide of a cell tissue sample is a member in which a thinly sliced tissue having a thickness of several micrometers or so is fixed to a glass slide. When this slide is digitally imaged using the microscope 10 having a depth of field of 1 μm or so, the overall drive control section 221 drives the stage 130 in the thickness direction of the tissue (hereinafter, referred to as the Z direction), and captures a plurality of digital images in which the observation site is changed in the depth direction. In this case, the positions in the depth direction in an in-focus state which is most appropriate in one captured image vary with each region of the image due to factors such as thickness unevenness of the cell tissue, or undulation at the time of placing the cell tissue on the glass and undulation of the tissue section itself. This becomes more remarkable as a sensor (image capturing element) used at the time of digitization becomes larger in size.

The overall drive control section 221 performs the drive control of the microscope 10 so as to include a depth of the optimal in-focus position of all regions at the time of selection of the image capturing range in which a plurality of magnified images is captured in the Z direction in order to provide a distinct image in an in-focus state at all regions of the captured microscope image.

That is, as shown in FIG. 3, when the magnified image capturing section 120 captures an image of a region AR ($X0 \leq X \leq X3, Y0 \leq Y \leq Y1$) of the cell tissue sample SPL placed on the prepared slide PRT, the heights (heights in the Z direction) of the sample are often different at each position. Consequently, when an image of the sample SPL having a thickness D is captured, the overall drive control section 221 captures a digital image MI for each position in the depth direction while deviating the position in the depth direction by $\Delta d$ every time. Therefore, the magnified image regarding a certain sample includes a plurality of digital image groups having different depth positions. Thereby, it is possible to capture a plurality of digital images MI including a depth of the optimal in-focus position of all regions. Here, the movement width $\Delta d$ is preferably determined in consideration of the depth of field and the like of the microscope 10, and for example, can be set to 0.2 μm or so.

When scanning auto focus (AF), for example, is performed at the microscope 10, it is preferable that a detection window is not provided only to some regions of the image, but the separate detection window is provided for individual regions, and the in-focus point is determined for each window. Thereby, it is possible to more accurately capture a plurality of digital images MI including a depth of the optimal in-focus position. In addition, when phase difference-type AF, for example, is performed at the microscope 10, the optimal in-focus position of the entire magnified image can be acquired as a defocused plane (in other words, undulating shape).

The microscope image acquisition section 223 is implemented by, for example, a CPU, a ROM, a RAM, a communication unit, and the like. The microscope image acquisition section 223 acquires data corresponding to the thumbnail image captured by the thumbnail image capturing section 110 and data corresponding to the magnified image captured by the magnified image capturing section 120 through each of the image capturing control sections.

When the data (thumbnail image data) corresponding to the thumbnail image and the data (magnified image data) corresponding to the magnified image are acquired through each of the image capturing control sections, the microscope image acquisition section 223 outputs these acquired image data to the image processing section 225 described later.

The microscope image acquisition section 223 may store these acquired image data (microscope image data) in the storage section 211 and the like in association with the acquired information and the like about data and time.

The image processing section 225 is implemented by, for example, a CPU, a GPU, a ROM, a RAM, and the like. The image processing section 225 performs predetermined image processing on the microscope image (particularly, the thumbnail image and magnified image) output from the microscope image acquisition section 223. The image processing section 225 outputs the microscope image including the thumbnail image and the magnified image, in which predetermined image processing is performed, and various types of metadata to the microscope image output section 227 described later.

The detailed configuration of the image processing section 225 will be described below in detail again.

The microscope image output section 227 is implemented by, for example, a CPU, a ROM, a RAM, and the like. The microscope image output section 227 outputs the microscope image output from the image processing section 225 and various types of information such as metadata contingent on the microscope image to the image management server 30 through the communication control section 229 described later. Thereby, the microscope image (digital microscope image) of the sample captured by the microscope 10 is managed by the image management server 30.

The communication control section 229 is implemented by, for example, a CPU, a ROM, a RAM, a communication unit, and the like. The communication control section 229 controls communications performed through the network 3 between the microscope control device 20 and the image management server 30 provided outside the microscope control device 20.

[With Respect to Configuration of Image Processing Section]

Figure 6:
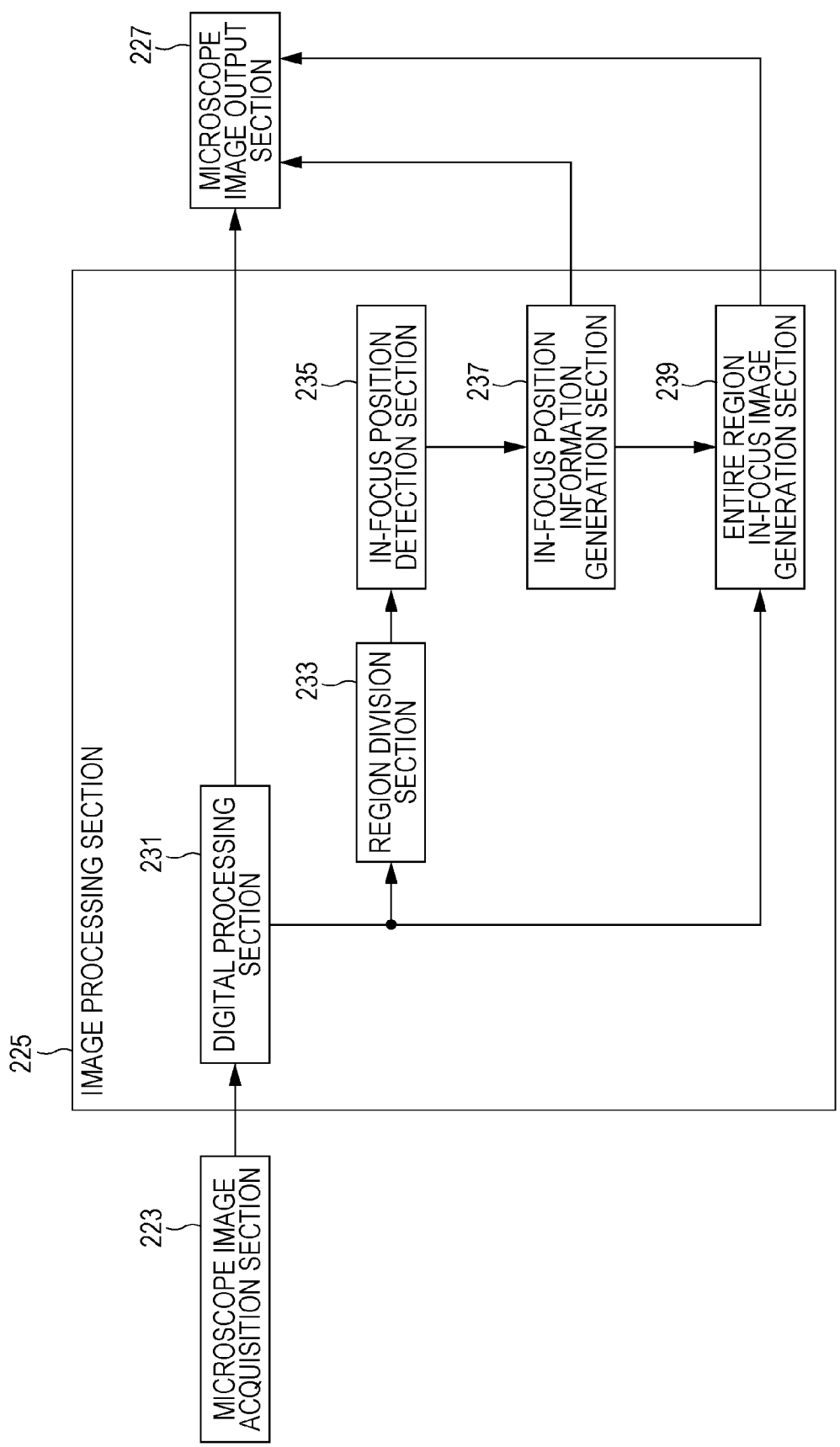
FIG. 6 is a block diagram illustrating the configuration of an image processing section included in the overall control section according to the example embodiment.

Next, the configuration of the image processing section 225 according to the example embodiment will be described in detail with reference to FIG. 6. FIG. 6 is a block diagram illustrating the configuration of the image processing section 225 according to the example embodiment.

As shown in FIG. 6, the image processing section 225 further includes a digital processing section 231, a region division section 233, an in-focus position detection section 235, an in-focus position information generation section 237, and an all-in-focus image generation section 239.

The digital processing section 231 is implemented by, for example, a CPU, a GPU, a ROM, a RAM, and the like. When the thumbnail image data or the magnified image data (more specifically, RAW data of these images) output from the microscope image acquisition section 223 are acquired, the digital processing section 231 performs development processing on these RAW data. In addition, the digital processing section 231 performs development processing of the image data, and processing (stitching processing) for linking together a plurality of images included in these images.

In addition, the digital processing section 231 can also perform conversion processing (transcoding) and the like of the obtained digital image data, as necessary. The conversion processing of the digital image can include processing in which the digital image is compressed to generate a JPEG image and the like, or data compressed to the JPEG image and the like are converted into compressed images having different formats (for example, GIF format and the like). In addition, the conversion processing of the digital image also includes processing and the like in which the compressed image data are decompressed once and then processing such as edge enhancement is performed, to perform compression again or change the compression rate of the compressed image.

The digital processing section 231 outputs the microscope image (thumbnail image and magnified image) obtained in this way to the microscope image output section 227, and to the region division section 233 and the all-in-focus image generation section 239 described later. In addition, the digital processing section 231 may store the obtained microscope image in the storage section 211.

Figure 7:
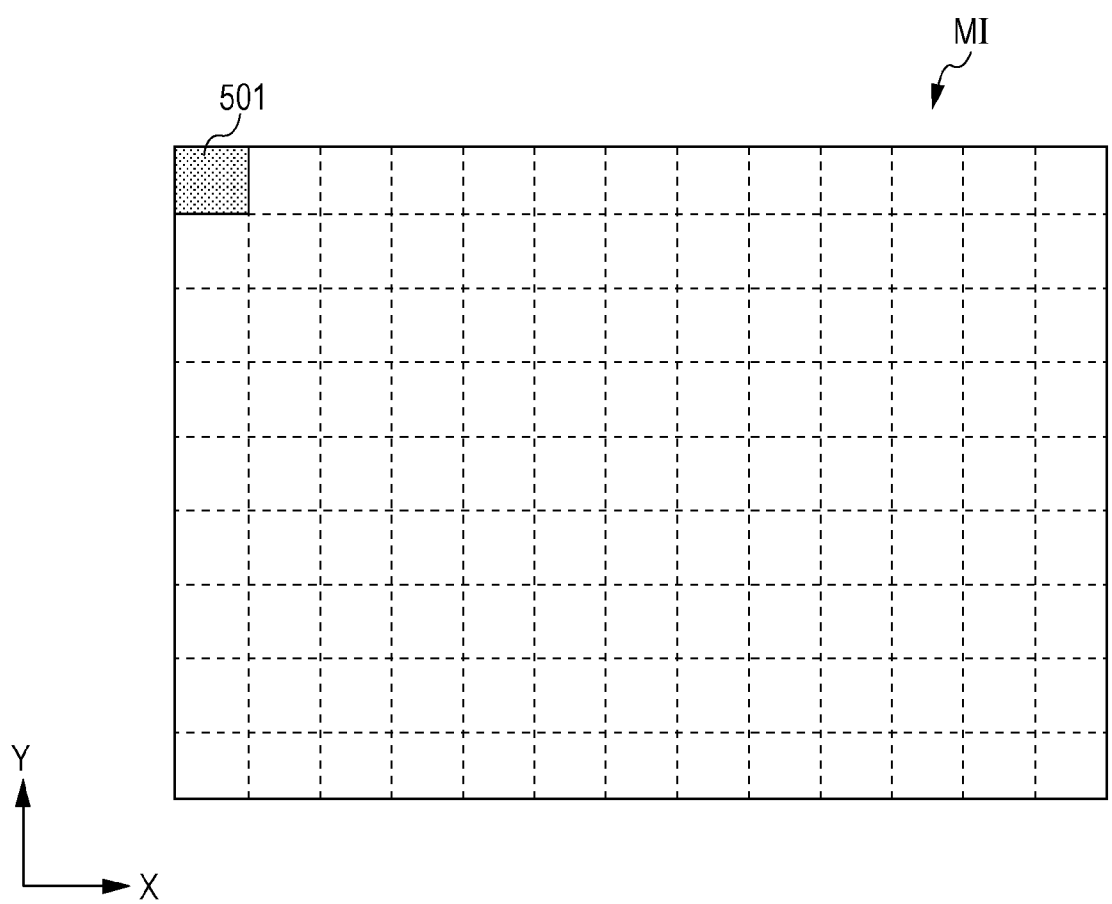
FIG. 7 is an explanatory diagram illustrating sub-regions according to the example embodiment.

The region division section 233 is implemented by, for example, a CPU, a GPU, a ROM, a RAM, and the like. When the data corresponding to the magnified image of the sample are acquired, for example, as shown in FIG. 7, the region division section 233 divides the plane surface region corresponding to the digital image MI into a plurality of sub-regions 501 with respect to each of a plurality of digital images MI, having different depth positions, included in the magnified image. Here, the sizes of the sub-regions 501 are unified with each other between a plurality of digital images MI included in the magnified image. Since a plurality of digital images MI included in a certain magnified image has the same size with each other, these digital images MI are divided into the same number of the sub-regions, thereby allowing the positions of the sub-regions to be matched with each other between the digital images MI.

In FIG. 7, the size of each sub-region 501 may be appropriately determined in accordance with the size (number of pixels) of the digital image MI. For example, when the size of the digital image MI is 4064×6104 pixels or so, the size of the sub-region 501 can be set to, for example, a size having a pixel of 30×20 or so.

In addition, the region division section 233 preferably gives unique identification information (for example, identification number and the like) within the corresponding digital image MI to each sub-region 501 included in the digital image MI. In such a case, methods of giving identification information are unified between the digital images MI. In this manner, the sub-regions 501 to which the same identification information is given in each of the digital images MI indicate the same region between the digital images MI, comparison of the sub-regions between the digital images MI is made easily.

When the plane surface regions corresponding to each of the digital images MI are divided into a plurality of sub-regions 501, the region division section 233 outputs the division result thereof to the in-focus position detection section 235 described later.

In the example embodiment, although a case where the region division section 233 divides the plane surface region into rectangular sub-regions is described by way of example, the shape of the sub-region is not limited thereto, but may be a shape capable of filling the plane surface region without any gap.

The in-focus position detection section 235 is implemented by, for example, a CPU, a GPU, a ROM, a RAM, and the like. The in-focus position detection section 235 detects the digital image in an in-focus state from a plurality of digital images MI included in the microscope image with respect to each of the sub-regions divided by the region division section 233.

In what follows, the microscope image is intended to include N digital images MI having different depth positions. In addition, these N digital images MI are given the number (that is, specific information) for specifying the depth position of the digital image in order from one located at the objective lens side.

The in-focus position detection section 235 detects the digital images in an in-focus state for each sub-region in such a manner that, for example, p-th ($1 \leq p \leq N$) digital image is in an in-focus state with respect to a certain sub-region, and q-th ($1 \leq q \leq N$) digital image is in an in-focus state with respect to a certain sub-region.

Here, the in-focus position detection section 235 calculates evaluation values of the contrasts focused the contrasts of N digital images, and detects the digital images in an in-focus state for each sub-region on the basis of the calculated evaluation values.

Figure 8:
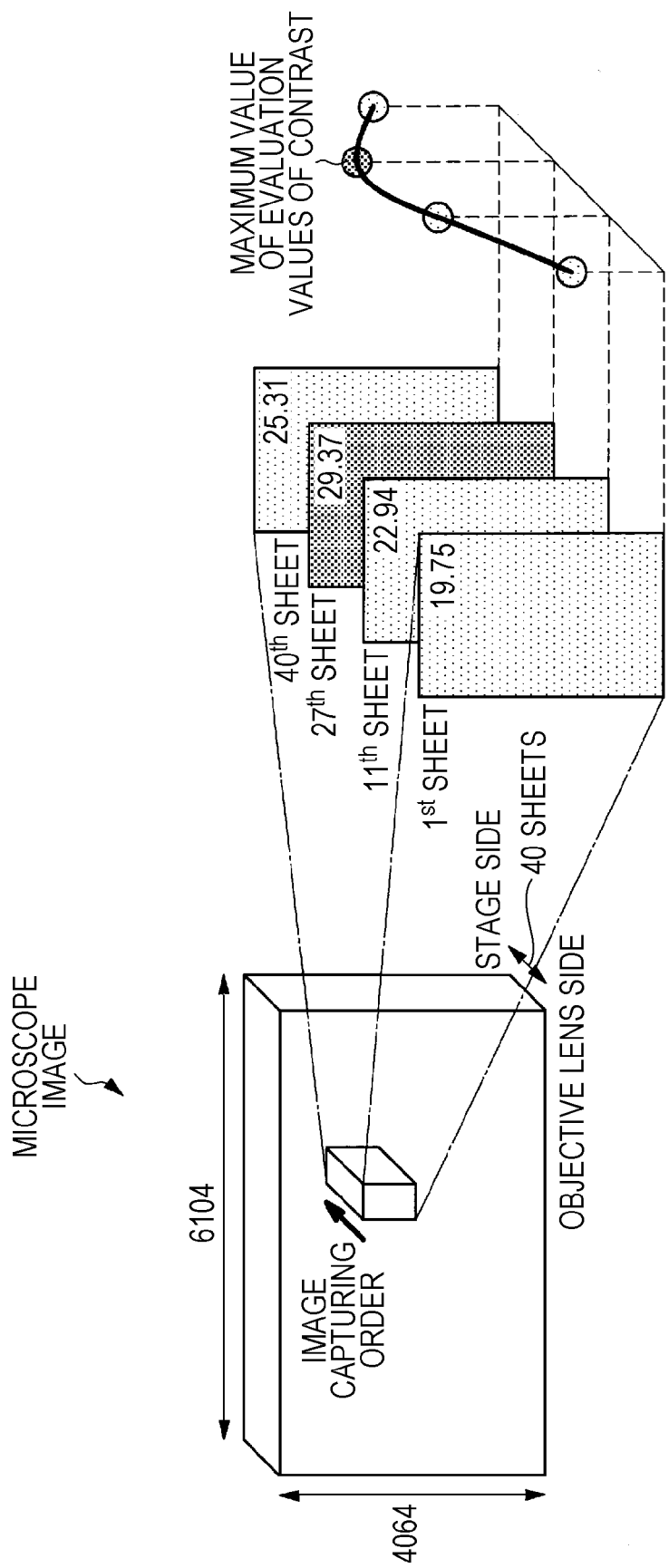
FIG. 8 is an explanatory diagram illustrating a method of detecting in-focus positions according to the example embodiment.

FIG. 8 is an explanatory diagram illustrating a case where a region (region corresponding to the digital image) having 4064×6104 pixels is divided into the sub-regions having 30×20 pixels. In FIG. 8, the microscope image of the sample includes 40 (N=40) digital images MI. In such a case, the in-focus position detection section 235 calculates the evaluation value of the contrast for each digital image MI with respect to the sub-region of interest. In addition, the in-focus position detection section 235 sets the digital image of which the evaluation value of the contrast becomes a maximum value to a digital image in an in-focus state. In the example shown in FIG. 8, because the evaluation value of the contrast becomes a maximum value in the digital image corresponding to $27^{th}$ sheet numbered from the objective lens side, the in-focus position detection section 235 determines the $27^{th}$ digital image to be a digital image in an in-focus state, in the sub-region of interest.

Although an arbitrary value can be used as the evaluation value for evaluating the contrast, for example, dispersion of a luminance value of the digital image can be used as the evaluation value of the contrast. In this case, the in-focus position detection section 235 calculates the average of the luminance values of the digital images with respect to each sub-region of each digital image, and calculates the sum V of dispersions of the luminance values on the basis of the following Expression 101.

$$V = \sum_{j=1}^{n} (Y_j - Y_{AVE})^2 \quad \text{(Expression 101)}$$

Here, in the above Expression 101, the parameter n is the number of pixels included in the sub-region, $Y_j$ is a luminance value of the j-th pixel included in the sub-region, and $Y_{AVE}$ indicates the average of the luminance values of the sub-regions of interest.

The in-focus position detection section 235 extracts a digital image giving the maximum value of the sum of dispersions of the calculated luminance values from N (40 in the example of FIG. 8) digital images, and sets the extracted digital image to a digital image in an in-focus state in the sub-region of interest.

Figure 9:
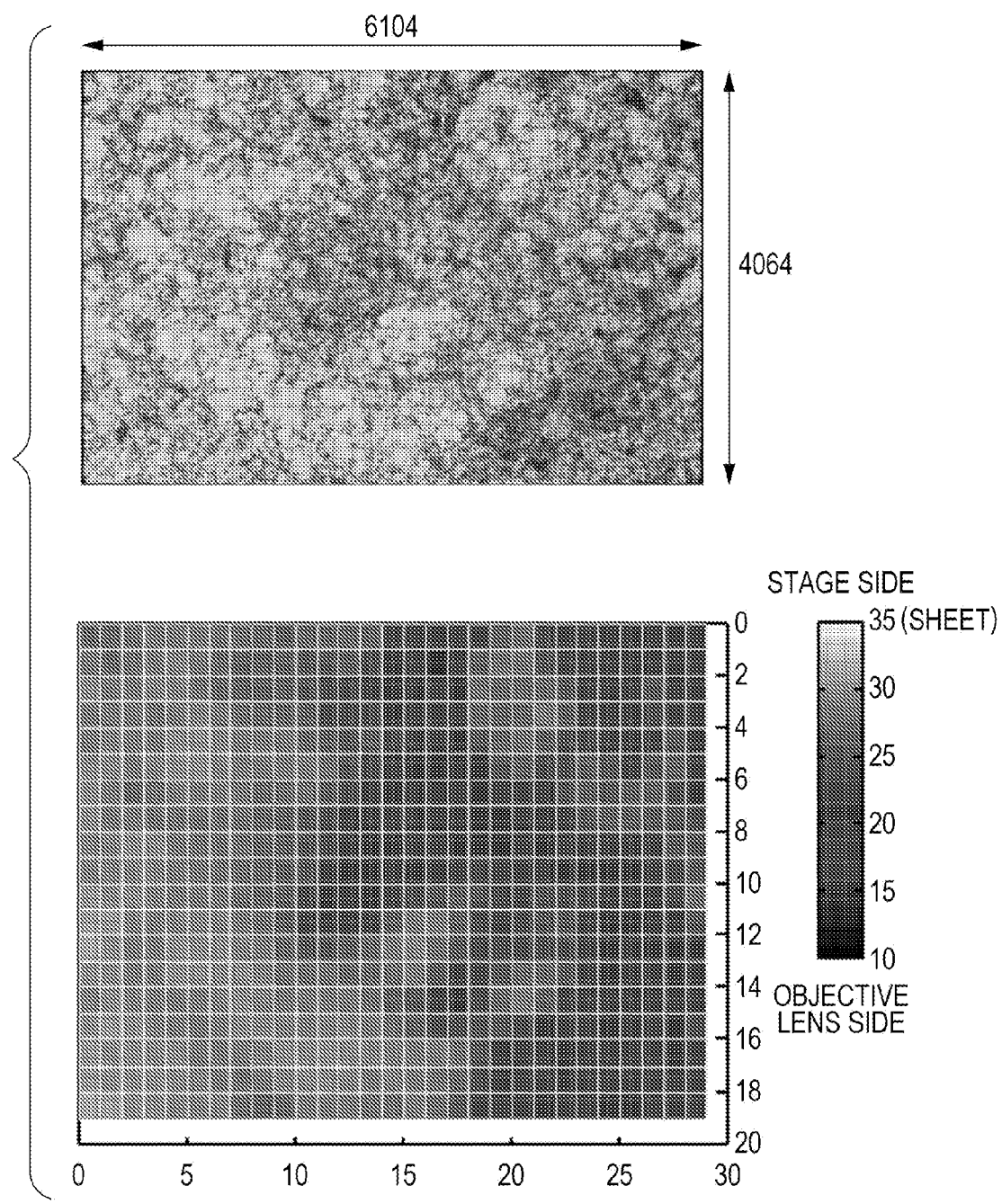
FIG. 9 is an explanatory diagram illustrating the distribution of the in-focus positions.

FIGS. 9 and 10 show the distribution of the digital images in an in-focus state detected in this manner. The result shown in FIG. 8 is a two-dimensional map expressing the difference between the depth positions by color shading, and the result shown in FIG. 9 three-dimensionally expresses the difference between the depth positions. As is clear from the results of FIGS. 8 and 9, even in one cell tissue sample, the depth positions of the digital image in an in-focus state are not constant. In addition, it is possible to clarify that the in-focus state exists in the digital images located from which sheet to which sheet by referring to the graph diagram showing the change of the depth positions of the digital image in an in-focus state as shown in FIG. 9. By using such results, it is also possible to perform additional image processing, such as an increase in the compression rate at the time of compressing an image, for example, on a defocused image or a defocused portion.

The in-focus position detection section 235 outputs the detection result of the digital image in an in-focus state detected in this manner to the in-focus position information generation section 237 described later. In addition, the in-focus position detection section 235 may record the detection result of the digital image in an in-focus state in the storage section 211 and the like.

When a hole is opened in the cell tissue section which is a sample, there may occur a case where it is difficult to specify the digital image in an in-focus state. In such a case, the in-focus position detection section 235 focuses on the in-focus state of the sub-regions (for example, peripheral eight sub-regions) located at the periphery of the sub-region of interest, and sets the digital image which is in an in-focus state in these peripheral sub-regions to a digital image which is in an in-focus state in the sub-region of interest. This is because it is considered that there is a high possibility that the sub-regions located at the vicinity of the sub-region of interest are focused at the same depth position as that of the sub-region of interest.

In addition, there may occur a case where a plurality of digital images determined to be in an in-focus state exists depending on the sample. In such a case, the in-focus position detection section 235 may use the obtained multiple detection results directly, and may use only any one of the detection results.

Further, there may be a case where the cell tissue which is a sample exhibits a specific color (hue) due to stain processing. In such a case, the in-focus position detection section 235 can also use intended color information of the cell, in place of dispersion of the luminance values, as the evaluation value of the digital image in an in-focus state. For example, when Hematoxilin-Eosin (HE) stain is performed on the cell tissue, cytoplasm is red-stained, and cell nuclei are blue-stained. Consequently, color information on a blue component is used in the case of the cell nuclei of interest, and color information on a red component is used in the case of the cytoplasm of interest, thereby allowing the in-focus position to be detected more effectively with respect to the tissue of interest. In this case, for example, modification such as non-use of the pixel value having color information of no interest is added to the above Expression 101, thereby allowing the evaluation value to be calculated.

The in-focus position information generation section 237 is implemented by, for example, a CPU, a ROM, a RAM, and the like. The in-focus position information generation section 237 generates in-focus position information with which specific information for specifying the digital image in an in-focus state is associated for each sub-region, on the basis of the detection result in the in-focus position detection section 235.

When the in-focus position information is information in which identification information for specifying the sub-region and specific information for specifying the digital image in an in-focus state are associated with each other, the format thereof does not matter, but the in-focus position information generation section 237 generates, for example, in-focus position information as shown in FIG. 11. The in-focus position information shown in FIG. 11 is indicated by a look-up table in which identification numbers (ID) for specifying the sub-regions and numbers given to the digital images which are in an in-focus state in the corresponding sub-regions are associated with each other. The identification information for specifying the sub-regions may be identification numbers given to the sub-regions as shown in FIG. 11, and may be coordinates indicating the positions of the sub-regions within the plane surface region corresponding to the digital image.

In addition, the in-focus position information generation section 237 may generate image information like a color distribution map as shown in FIG. 9 instead of the look-up table as shown in FIG. 11, as the in-focus position information.

The in-focus position information generation section 237 outputs the generated in-focus position information to the microscope image output section 227, and to the all-in-focus image generation section 239 described later. In addition, the in-focus position information generation section 237 may store the generated in-focus position information in the storage section 211 and the like.

The all-in-focus image generation section 239 is implemented by, for example, a CPU, a GPU, a ROM, a RAM, and the like. The all-in-focus image generation section 239 generates the all-in-focus image using the microscope image (digital image) output from the digital processing section 231 and the in-focus position information output from the in-focus position information generation section 237. The all-in-focus image is a microscope image (digital image) in which the entire plane surface corresponding to the digital image is in an in-focus state.

The all-in-focus image generation section 239 first refers to the in-focus position information to extract the digital image (more specifically, a portion corresponding to the sub-region of interest of the digital image in an in-focus state) in an in-focus state for each sub-region. Thereafter, the all-in-focus image generation section 239 links together the extracted digital images in an in-focus state to generate the all-in-focus image.

Figure 12:
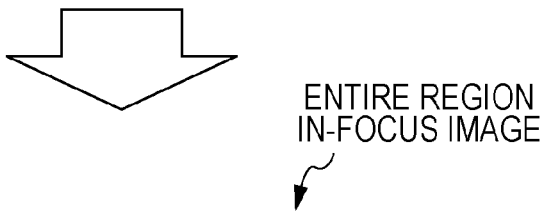
FIG. 12 is an explanatory diagram illustrating a method of generating the all-in-focus image according to the example embodiment.

FIG. 12 is an explanatory diagram illustrating an outline of a method of generating the all-in-focus image. The all-in-focus image generation section 239 refers to the in-focus position information output from the in-focus position information generation section 237 to specify which digital images are in an in-focus state with respect to each sub-region. In the example shown in FIG. 12, the all-in-focus image generation section 239 specifies that the $20^{th}$ digital image from the objective lens side is in an in-focus state with respect to the sub-region of sub-region ID=1. Similarly, the all-in-focus image generation section 239 specifies which digital images are in an in-focus state with respect to all the sub-regions.

Next, the all-in-focus image generation section 239 extracts the portion corresponding to the sub-region of ID=1 of the $20^{th}$ digital image with respect to the sub-region of ID=1, and extracts the portion corresponding to the sub-region of ID=2 of the $18^{th}$ digital image with respect to the sub-region of ID=2. Similarly, the all-in-focus image generation section 239 extracts image data, used in generating the all-in-focus image, from the corresponding digital image with respect to all the sub-regions. The all-in-focus image is generated by linking together theses extracted digital images.

The difference between the all-in-focus image generated in this manner and a normal in-focus image will be described in brief with reference to FIG. 13.

The in-focus image is an image having a high degree of in-focus as the entire image. The sample of which the microscope image is to be captured has a finite thickness, and has different depth positions in-focus state for each site of the sample, as mentioned above. For this reason, as shown in the upper portion of FIG. 13, even when the sub-region A is in an in-focus state in the normal in-focus image, the sub-region B and the sub-region C are not necessarily in an in-focus state.

On the other hand, the all-in-focus image generated by the all-in-focus image generation section 239 is an image in which all the sub-regions are focused. For this reason, as shown in the lower portion of FIG. 13, all the sub-regions of the all-in-focus image including the sub-region A, the sub-region B and the sub-region C are in a focused state. Therefore, an observer of the microscope image can observe images in which all the plane surface regions of the microscope image of the sample are in an in-focus state without performing focus adjustment of the image. Thereby, it is possible to dramatically improve the convenience of the observer.

The microscope image output section 227 associates the in-focus position information generated in this manner with data of the microscope image. In addition, the microscope image output section 227 not only associates the in-focus position information with the data of the microscope image, but also may record the in-focus position information in a predetermined position within the data (for example, inside of a header of the image data, and the like). Moreover, when the all-in-focus image is generated by the all-in-focus image generation section 239, the microscope image output section 227 further associates data regarding such an all-in-focus image with the microscope image data.

The microscope image data according to the example embodiment are large, and thus are preferably saved using some kind of compression formats. In such a case, when the in-focus position information according to the example embodiment does not exist, the image display device 40 decodes the number of the images selected one by one in all depth directions at the time of displaying the microscope image, and calculates the optimal in-focus point with respect to the total number thereof. However, it is considered that loads related to resources of a CPU or a memory and the like of the image display device 40 become large in performing such processing. In this way, it is possible to reduce the load of the image display device 40 at the time of displaying the microscope image in the image display device 40 by using the in-focus position information according to the example embodiment. When the load of the image display device 40 does not have to be considered, at a point in time of digitization of the microscope image, the in-focus position information does not have to be generated and saved by association with the inside of the image data or the image data.

As mentioned above, an example of the function of the microscope control device 20 according to the example embodiment is shown. Each of the components mentioned above may be configured using general-purpose members or circuits, and may be configured by hardware specific to the functions of each of the components. In addition, the functions of each of the components may all be performed by a CPU and the like. Therefore, it is possible to change the configuration appropriately used in accordance with the technical level whenever the example embodiment is carried out.

Computer programs for realizing each function of the microscope control device 20 according to the above-mentioned example embodiment can be created and implemented in a personal computer and the like. In addition, a recording medium capable of being read by the computer in which such computer programs are stored can also be provided. The recording medium is, for example, a magnetic disk, an optical disk, a magneto-optical disk, a flash memory, and the like. In addition, the above-mentioned computer programs may be distributed through, for example, a network without using the recording medium.

<With Respect to Configuration of Image Display Device>

Figure 14:
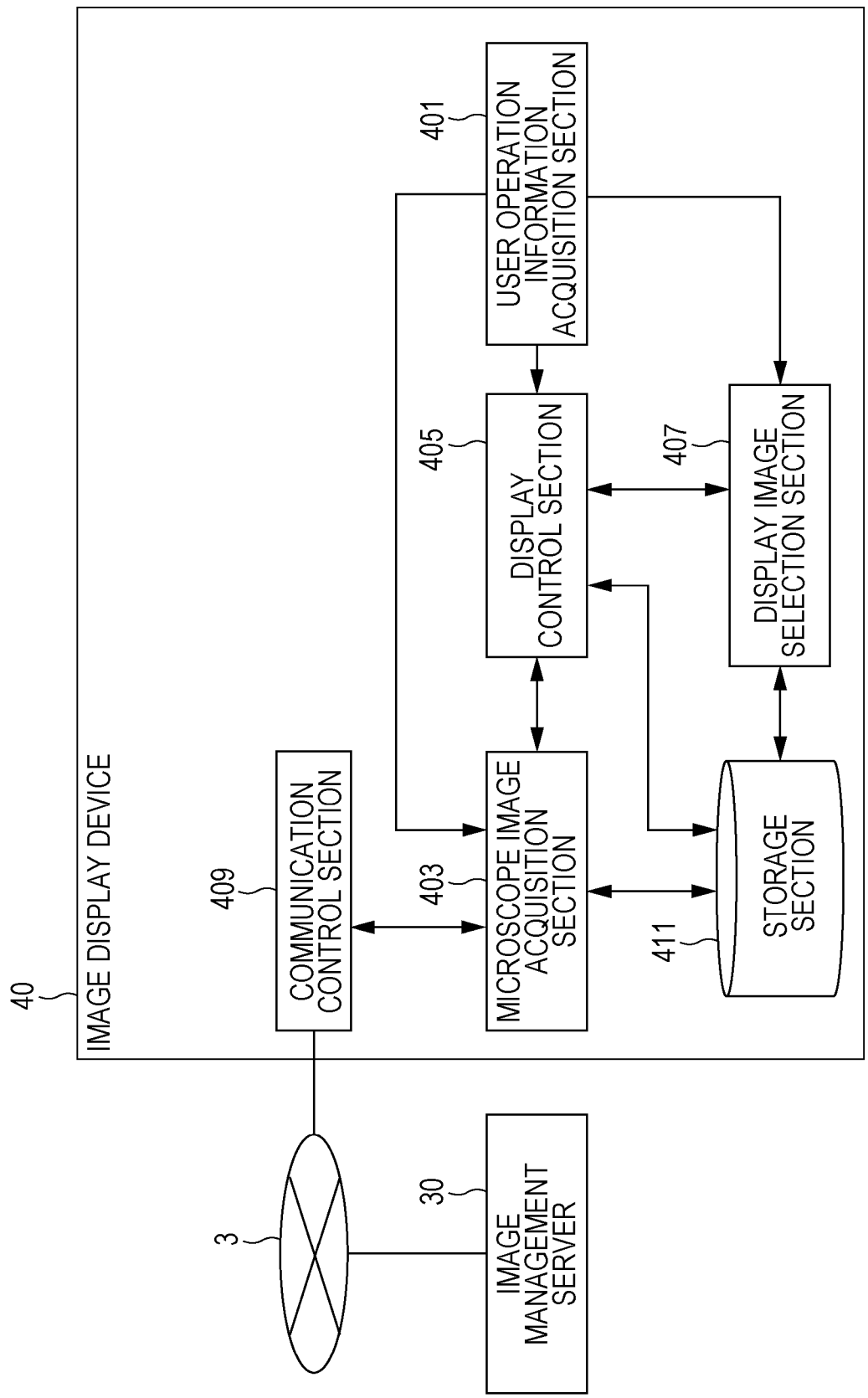
FIG. 14 is a block diagram illustrating the configuration of an image display device according to the example embodiment.

Next, the configuration of the image display device 40 according to the example embodiment will be described in detail with reference to FIG. 14. FIG. 14 is a block diagram illustrating the configuration of the image display device 40 according to the example embodiment.

As shown in FIG. 14, the image display device 40 according to the example embodiment mainly includes a user operation information acquisition section 401, a microscope image acquisition section 403, a display control section 405, a display image selection section 407, a communication control section 409, and a storage section 411.

The user operation information acquisition section 401 is implemented by, for example, a CPU, a ROM, a RAM, an input unit, and the like. The user operation information acquisition section 401 acquires output signals, output from the input unit such as a keyboard, a mouse and a touch panel, that correspond to user operations performed on the corresponding input unit by a user, and generates user operation information indicating the operations (user operations) performed by the user. The user operation information acquisition section 401 outputs the generated user operation information to the microscope image acquisition section 403, the display control section 405 and the display image selection section 407 which are described later. In addition, the user operation information acquisition section 401 may store the generated user operation information in the storage section 411 described later to use history information.

Here, an example of the operations performed on the input unit such as a keyboard, a mouse and a touch panel by the user can include, for example, selection processing of the microscope image, or change processing of a display region with respect to a certain microscope image, and the like. In addition, the user operations performed by the user are not limited thereto, and the user operations performed by the user are appropriately converted into user operation information indicating the corresponding user operation, and are output to each of the processing sections.

The microscope image acquisition section 403 is implemented by, for example, a CPU, a ROM, a RAM, and the like. The microscope image acquisition section 403 acquires a list of the microscope images managed by the image management server 30 from the image management server 30, in accordance with user operation information, indicating the acquisition start of a list of the microscope image, which is output from the user operation information acquisition section 401. In addition, when the microscope image of a certain sample is selected by the user operation, the microscope image acquisition section 403 transmits a transmission request for the selected microscope image to the image management server 30.

When the microscope image acquisition section 403 acquires data of the microscope image including a plurality of digital images output from the image management server 30, the acquired data of the microscope image are output to the display control section 405 described later. In addition, the microscope image acquisition section 403 may store the acquired data of the microscope image in the storage section 411.

The display control section 405 is implemented by, for example, a CPU, a ROM, a RAM, and the like. The display control section 405 controls a display screen displayed on the display device such as a display included in the image display device 40 according to the example embodiment. In addition, the display control section 405 changes the content displayed on the display screen, in accordance with at least any of user operation information output from the user operation information acquisition section 401 and selected image information output from the display image selection section 407 described later.

Specifically, when information about a list of the microscope images is output from the microscope image acquisition section 403, the display control section 405 displays a list of the microscopes image capable of being observed by the user on the display screen on the basis of the output information. In addition, when information for starting a display of the microscope image is output as the user operation information, the display control section 405 displays the magnified image of the sample, designated by the corresponding selected image information, on the display screen, on the basis of the selected image information output from the display image selection section 407 described later. In addition, when information for changing the display region displayed on the display screen is output as the user operation information, the magnified image is moved within the display screen from side to side and up and down (within the plane surface), is magnified and demagnified by zooming and panning or like, or is moved so as to change the focus position in the depth direction.

At this time, the display control section 405 specifies the site (region) of the digital image displayed on the display screen, and outputs information about the region displayed on this display screen to the microscope image acquisition section 403 and the display image selection section 407. In addition, the display control section 405 specifies a position (position in the display screen) displayed by a position designation object such as a mouse pointer, and outputs information about this display position to the display image selection section 407. Thereby, the microscope image acquisition section 403 and the display image selection section 407 can grasp various types of information about the content (hereinafter, also referred to as the display content information) displayed on the display screen within the image display device 40.

The display control section 405 can use various types of information stored in the storage section 411 and the like as the content displayed on the display screen of the image display device 40.

The display image selection section 407 is implemented by, for example, a CPU, a GPU, a ROM, a RAM, and the like. The display image selection section 407 selects the digital image used at the time of displaying the designated sample on the display screen, on the basis of the user operation information output from the user operation information acquisition section 401 and various types of display content information output from the display control section 405.

Specifically, when the user operation information for starting a display of the microscope image is output from the user operation information acquisition section 401, the display image selection section 407 can select the all-in-focus image as the magnified image of the sample initially displayed on the display screen. At this time, when the all-in-focus image previously generated in the microscope image of the sample for performing a display exists, the display image selection section 407 generates the selected image information indicating the purport to use the generated all-in-focus image, and outputs the generated selected image information to the display control section 405. Here, the selected image information is information indicating the selection result of the selection processing of the image performed by the display image selection section 407. In addition, when the all-in-focus image does not exist, the display image selection section 407 can generate the all-in-focus image using the same method as that of the all-in-focus image generation section 239 of the microscope control device 20.

When the user operation information for starting a display of the microscope image is output from the user operation information acquisition section 401, the display image selection section 407 can select the digital image so that the sub-region corresponding to the approximately central portion of the display region on which the magnified image of the sample is displayed is in an in-focus state. When a certain image is displayed on the display screen, the user often watches the central portion initially. For this reason, by selecting the digital image configured such that the approximately central portion of the display region on which the magnified image is displayed is in an in-focus state, the observer of the magnified image of the sample can save performing the operation such as focus adjustment, and the convenience of the user can be improved.

In such a case, the display image selection section 407 acquires display content information about the size of the region on which the magnified image of the sample is displayed from the display control section 405, and specifies which portion of the surface region corresponding to the digital image corresponds to the sub-region located at the approximately central portion of this display region. Thereafter, the display image selection section 407 refers to the in-focus position information associated with the microscope image to select the digital image in which the specified sub-region (sub-region located at the approximately central portion of the display region) is in an in-focus state. Next, the display screen selection section 407 outputs information indicating the selected digital image to the display control section 405 as the selected image information.

When the user operation information for starting a display of the microscope image is output from the user operation information acquisition section 401, the display image selection section 407 can select the digital image so that the sub-region corresponding to a position at which the position designation object exists is in an in-focus state.

In such a case, the display image selection section 407 acquires the display content information indicating a position at which the position designation object exists from the display control section 405, and specifies which sub-region corresponds to the position at which the position designation object exists. Thereafter, the display image selection section 407 refers to the in-focus position information associated with the microscope image to select the digital image in which the specified sub-region is in an in-focus state. Next, the display screen selection section 407 outputs information indicating the select digital image to the display control section 405 as the selected image information.

Three kinds of selection processing of the initial display image as described above can be appropriately turned on/off. That is, it is possible to designate which digital image to display as the initial display screen by using a default behavior setting function and the like of the image display device 40. In addition, the digital image used in the initial display screen is not limited to the above.

Further, when information for changing the display region displayed on the display screen is output as the user operation information, the display image selection section 407 selects the digital image used in display in accordance with the user operation. Thereby, the digital image that the observer of the magnified image of the sample intends to obtain is selected by the display image selection section 407.

In this way, in the image display device 40, the user selects the digital image located at an arbitrary depth position by the wheel operation of a mouse and the like, thereby allowing the same operation as manual adjustment of the focus of the microscope to be performed. However, as mentioned above, in the image of individual depth positions of the digital image data, the in-focus states vary with the display region of the image, and the user performs manual adjustment of the focus whenever the position of observation is moved. Consequently, the display image selection section 407 automatically selects the display position of the depth direction from the in-focus position information so that, for example, the in-focus state of a region corresponding to the center of the display image or a region in which the position designation object such as a pointer is stopped becomes an optimal state using the in-focus position information. Thereby, in the image display device 40 according to the example embodiment, a display just like the auto focusing of the slide stage on the region that the user wants to observe is possible, and the user is saved the trouble of performing the operation. In addition, it is possible for the user to observe the all through one digital image having no depth direction by using the all-in-focus image in which all the display regions are in the optimal in-focus state.

In addition, it is also considered that the user observes the change in the cubic structure of the sample (that is, change in the sample image with the change in the depth position). In such a case, because the operation in which the user manually changes the depth position is performed, the function of the automatic optimum focus display or the all-in-focus image display mentioned above can be preferably turned on/off.

The communication control section 409 is implemented by, for example, a CPU, a ROM, a RAM, a communication unit, and the like. The communication control section 409 controls communications performed through the network 3 between the image display device 40 and the image management server 30 provided to the outside of the image display device 40.

The storage section 411 is an example of a storage unit included in the image display device 40 according to the example embodiment. Microscope image data acquired from the image management server 30 or various types of meta information including the in-focus position information associated with the microscope image data, and the like are stored in the storage section 411. In addition, various types of history information such as the acquisition history of the microscope image data may be recorded in the storage section 411. Further, various parameters or processes during processing which are necessary to be saved when the image display device 40 according to the example embodiment performs some kind of processing, or various types of databases or programs, and the like are appropriately recorded in the storage section 411.

As described above, an example of the function of the image display device 40 according to the example embodiment is shown. Each of the components mentioned above may be configured using general-purpose members or circuits, and may be configured by hardware specific to the functions of each of the components. In addition, the functions of each of the components may all be performed by a CPU and the like. Therefore, it is possible to change the configuration appropriately used in accordance with the technical level whenever the example embodiment is carried out.

Computer programs for realizing each function of the image display device 40 according to the above-mentioned example embodiment can be created and implemented in a personal computer and the like. In addition, a recording medium capable of being read by the computer in which such computer programs are stored can also be provided. The recording medium is, for example, a magnetic disk, an optical disk, a magneto-optical disk, a flash memory, and the like. In addition, the above-mentioned computer programs may be distributed through, for example, a network without using the recording medium.

<With Respect to an Example of Display Screen>

Next, an example of the display screen displayed on a display and the like of the image display device 40 according to the example embodiment will be described in brief with reference to FIG. 15. FIG. 15 is an explanatory diagram illustrating an example of the display screen of the image display device according to the example embodiment.

As shown in FIG. 15, a display screen 601 such as the display of the image display device 40 is provided with a magnified image display region 603 on which the magnified image of a certain sample is displayed. In addition, the display screen 601 may be provided with a sub-information display region 605 on which, for example, an in-focus map image and the like indicating the in-focus position information as shown in FIG. 11 or the in-focus position as shown in FIG. 9 are displayed. It is possible for the user to accurately grasp which vicinity of the thickness of the sample corresponds to the in-focus position of the portion of the magnified image of interest by providing the sub-information display region 605. In addition, appropriate editing may be added to the display content displayed on the sub-information display region 605. For example, when a plurality of depth positions in an in-focus state exists with respect to a certain sub-region, editing such as the change of a bordering color of the sub-region may be added so as to indicate that a plurality of depth positions in an in-focus state exists. In addition, when the sub-region exists in which a plurality of in-focus positions exists, the all-in-focus image may be displayed on the sub-information display region 605 for each combination of the in-focus positions.

When the user of the image display device 40 operates the input unit such as a mouse, a keyboard and a touch panel to perform an operation for displaying the magnified image of the sample on the display screen 601, a predetermined initial display image is displayed on the magnified image display region 603. As mentioned above, this initial display image may be the all-in-focus image, or may be the digital image in which the approximately central portion of the magnified image display region 603 is in an in-focus state. In the example shown in FIG. 15, a case is shown in which a pointer 607 which is an example of the position designation object exists in a sub-region AR1. In this case, the display image selection section 407 specifies a position of the sub-region AR1 on the basis of the display content information output from the display control section 405 and then refers to the in-focus position information to select the digital image in which the region AR1 is in an in-focus state as the initial display image. As a result, the digital image in which the region AR1 is in an in-focus state is displayed on the magnified image display region 603.

The display screen shown in FIG. 15 is only an example, and the display screen displayed on the display device such as a display of the image display device 40 according to the example embodiment is not limited to the example shown in FIG. 15.

<With Respect to Flow of Method of Generating In-Focus Position Information>

Figure 16:
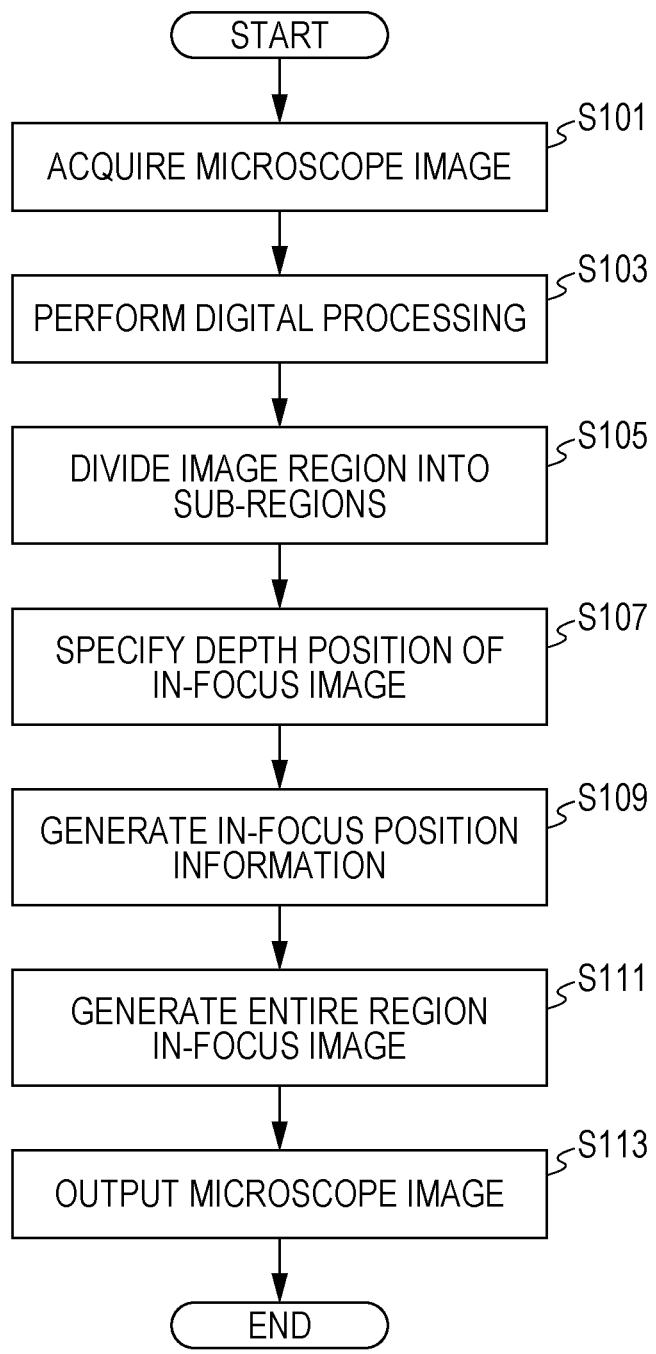
FIG. 16 is a flow diagram illustrating a flow of a method of generating the in-focus position information according to the example embodiment.

Next, reference will be made to FIG. 16 to describe a flow of a method of generating the in-focus position information which is performed in the microscope control device 20 according to the example embodiment. FIG. 16 is a flow diagram illustrating a flow of a method of generating the in-focus position information according to the example embodiment.

The microscope image acquisition section 223 of the microscope control device 20 first acquires the microscope image of the sample captured by the microscope 10 from the microscope 10 (step S101). As mentioned above, this microscope image includes a plurality of digital images captured along the thickness direction (depth direction) of the sample. The microscope image acquisition section 223 of the microscope control device 20 outputs data of the microscope image including a plurality of digital images to the digital processing section 231 of the image processing section 225.

The digital processing section 231 performs predetermined digital processing such as development processing, stitching processing and compression processing of the image data on the microscope image including a plurality of output digital images (step S103). Thereafter, the digital processing section 231 outputs the microscope image after the digital processing to the microscope image output section 227, the region division section 233 and the all-in-focus image generation section 239.

Subsequently, the region division section 233 divides the plane surface region (image region) corresponding to the digital image into a plurality of sub-regions (step S105), and outputs information indicating the division result to the in-focus position detection section 235.

Next, the in-focus position detection section 235 specifies the digital image in an in-focus state for each sub-region to thereby specify the depth position of the image which is focused (step S107). The in-focus position detection section 235 outputs the detection result of the digital image in an in-focus state to the in-focus position information generation section 237.

Subsequently, the in-focus position information generation section 237 generates the in-focus position information on the basis of the detection result of the digital image in an in-focus state output from the in-focus position detection section 235 (step S109). Thereafter, the in-focus position information generation section 237 outputs the obtained in-focus position information to the microscope image output section 227 and the all-in-focus image generation section 239.

Next, the all-in-focus image generation section 239 generates the all-in-focus image using the digital image output from the digital processing section 231 and the in-focus position information output from the in-focus position information generation section 237 (step S111). Thereafter, the all-in-focus image generation section 239 outputs the generated all-in-focus image to the microscope image output section 227.

Subsequently, the microscope image output section 227 associates the microscope image output from the digital processing section 231, the in-focus position information output from the in-focus position information generation section 237, and the all-in-focus image output from the all-in-focus image generation section 239 with each other. Thereafter, the microscope image output section 227 outputs data of the microscope image, together with data of the in-focus position information and data of the all-in-focus image, to a server (for example, image management server 30) provided to the outside of the microscope control device 20 (step S113).

Such processing is performed, so that the in-focus position information corresponding to the microscope image is generated, and uploaded to the image management server 30 together with the data of the microscope image.

<With Respect to Flow of Image Display Method>

Figure 17:
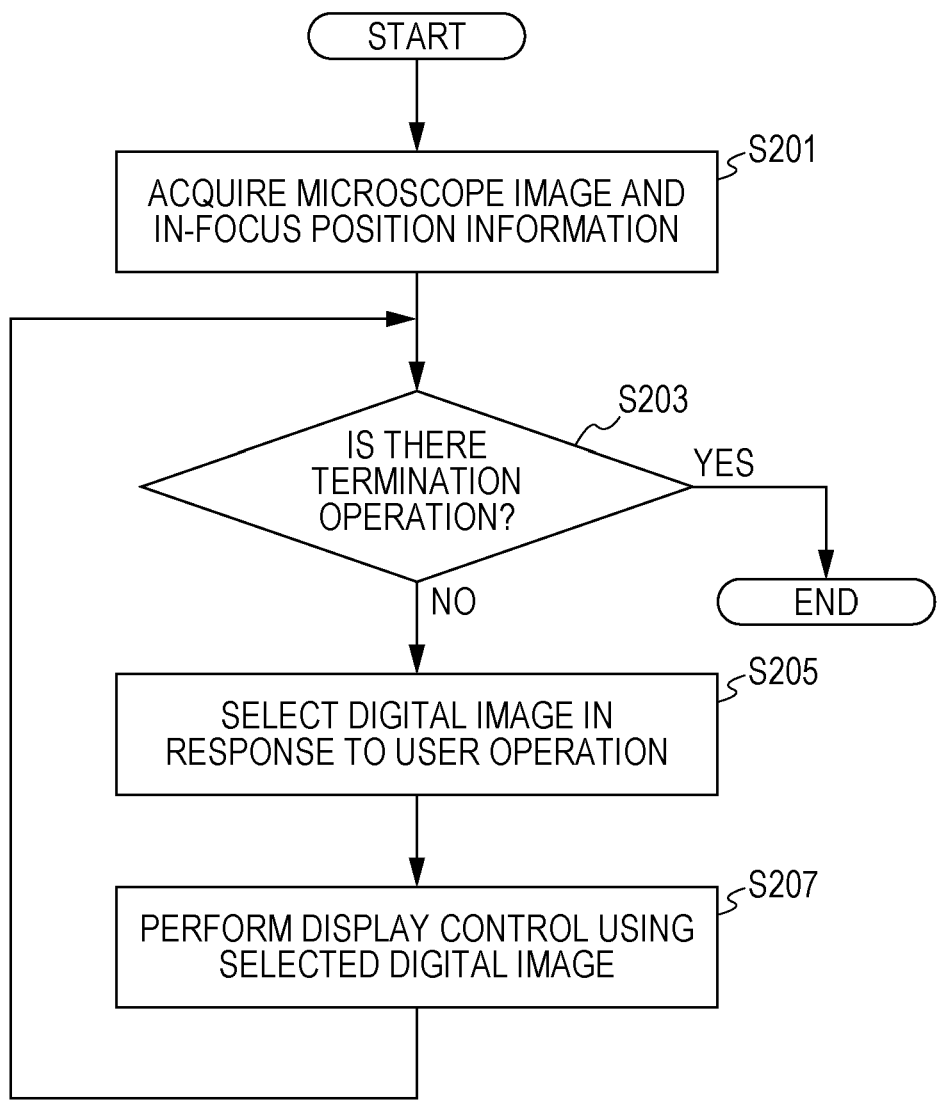
FIG. 17 is a flow diagram illustrating a flow of an image display method according to the example embodiment.

Subsequently, reference will be made to FIG. 17 to describe a flow of an image display method performed in the image display device 40 according to the example embodiment. FIG. 17 is a flow diagram illustrating a flow of an image display method according to the example embodiment.

Prior to the following description, the microscope image acquisition section 403 of the image display device 40 acquires a list of the microscopes image managed by the server from the image management server 30, and the observer of the microscope image selects the magnified image of the sample intended to be observed.

First, the microscope image acquisition section 403 of the image display device 40 acquires the data of the microscope image selected by the user and the in-focus position information from the image management server 30, on the basis of the user operation information indicating the selection result of the microscope image (step S201). Thereafter, the microscope image acquisition section 403 stores the acquired microscope image and the in-focus position information in the storage section 411 or the like. In addition, the microscope image acquisition section 403 may output the acquired microscope image and the in-focus position information or the like directly to the display control section 405 and the display image selection section 407.

Thereafter, the image display device 40 refers to the user operation information to determine whether an operation for terminating the observation of the microscope image is performed (step S203). When the user operation information indicating the termination operation is generated, the image display device 40 terminates display processing of the microscope image.

On the other hand, when the user operation indicating the termination operation is not generated, the display image selection section 407 selects the digital image on the basis of the user operation information output from the user operation information acquisition section 401 and the display content information output from the display control section 405 (step S205). Specifically, the display image selection section 407 selects the all-in-focus image on the basis of the user operation information, or selects the digital image in which the portion of which the approximately central portion of the display screen or a pointer and the like are stopped is in an in-focus state on the basis of the in-focus position information. The display image selection section 407 outputs information indicating the selection result to the display control section 405.

The display control section 405 acquires the selected digital image on the basis of the information indicating the selection result output from the display image selection section 407, and performs the display control for displaying the acquired digital image (step S207).

Such processing is performed, so that the magnified image of the sample selected by the user is displayed, in an appropriate in-focus state, on the display device such as a display of the image display device 40.

Second Example Embodiment

In a second example embodiment of the present disclosure described below, description will be made in detail of display control processing of the microscope image performed between the image management server 30 and the image processing device 40 in cooperation with each other, in the microscope image management system 1 having the configuration as shown in FIG. 1.

The second example embodiment described below is different from the first example embodiment. A case will be described in which, when the depth position of the microscope image displayed on the display screen is changed, the image display device 40 requests the image management server 30 to provide the microscope image used in a display each time. However, the method of acquiring the microscope image through the image display device 40 is not limited to the following example, but can be appropriately set in accordance with performance of the image display device 40 or communication resources of available communication networks and the like.

<With Respect to Configuration of Image Management Server>

Figure 18:
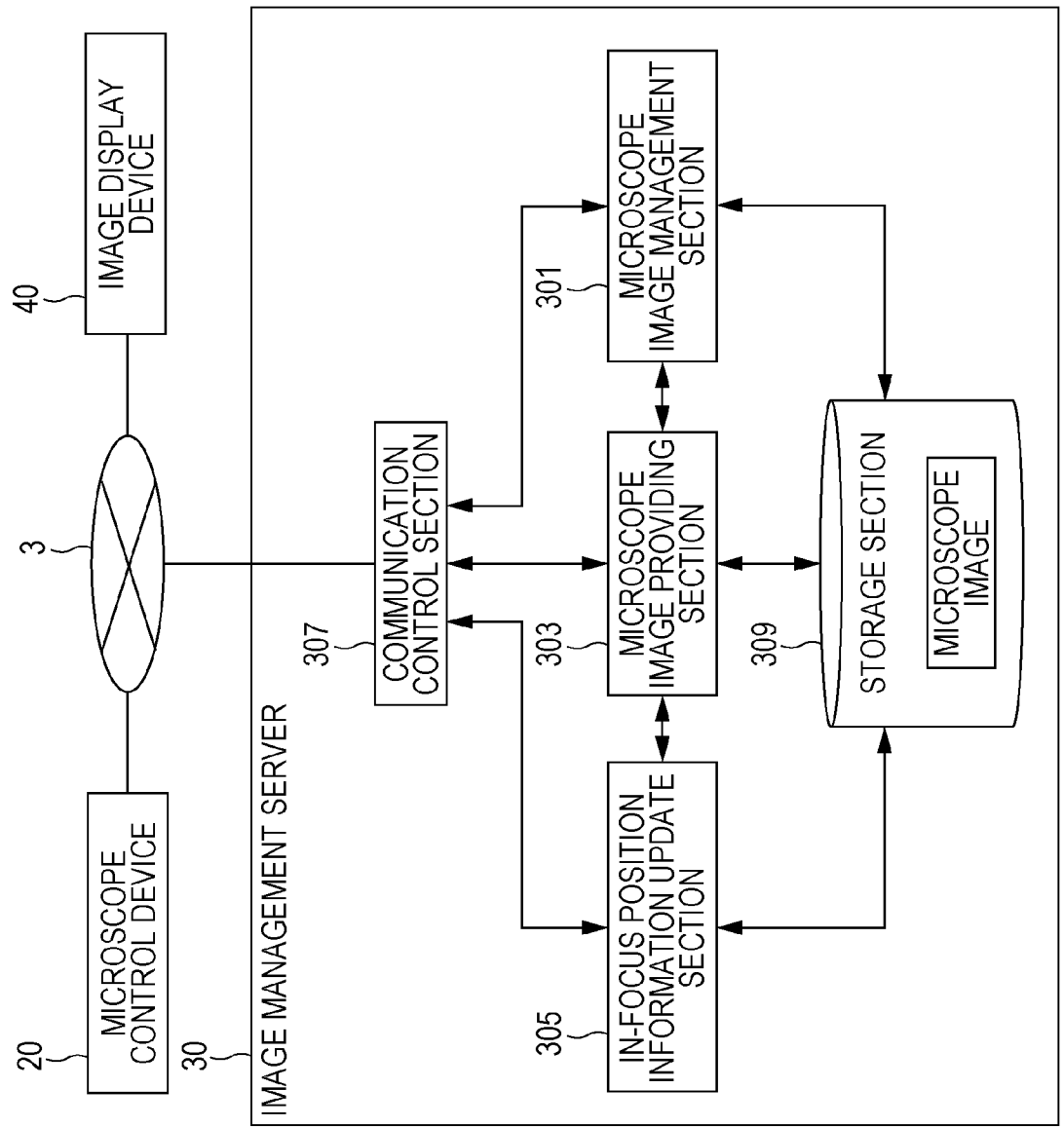
FIG. 18 is a block diagram illustrating the configuration of an image management server according to a second example embodiment of the present disclosure.

First, an example of the configuration of the image management server 30 according to the example embodiment will be described in brief with reference to FIG. 18. FIG. 18 is a block diagram illustrating an example of the configuration of the image management server 30 according to the example embodiment.

As shown in FIG. 18, the image management server 30 according to the example embodiment mainly includes a microscope image management section 301, a microscope image providing section 303, an all-in-focus image update section 305, a communication control section 307, and a storage section 309.

The microscope image management section 301 is implemented by, for example, a CPU, a ROM, a RAM, and the like. The microscope image management section 301 manages microscope image data groups which include the microscope image including a plurality of digital images captured along the thickness direction of the sample, the in-focus position information with which specific information for specifying the digital image in an in-focus state in the corresponding sub-region for each of a plurality of sub-regions forming the plane surface corresponding to the digital image is associated, and the all-in-focus image in which the plane surface corresponding to the digital image is in an in-focus state. These microscope image data groups are generated by, for example, the microscope control device 20 within the microscope image management system 1.

When the above-mentioned microscope image data groups are provided from the microscope control device 20, the microscope image management section 301 gives unique identification information (for example, ID number and the like) to the provided microscope image data groups and stores the unique identification information in a predetermined storage region of the storage section 309 described later. In addition, the microscope image management section 301 can generate a database in which the identification information of the microscope image data groups stored in the storage section 309 or information about metadata and the like contingent on the microscope image is listed, to use the database in the management of the microscope image.

The microscope image providing section 303 is implemented by, for example, a CPU, a ROM, a RAM, and the like. The microscope image providing section 303 selects the microscope image data group requested from among the managed microscope image data group in response to the request for the microscope image output from the image display device 40, and provides the select microscope image data group to the image display device 40.

Here, when the digital image of which the position in the thickness direction of the sample in a predetermined region of the all-in-focus image is changed is requested from the image display device 40, as specifically described below, the microscope image providing section 303 provides the requested digital image of at least a predetermined region located at the position in the thickness direction of the sample to the image display device 40.

In addition, when the digital image in a predetermined region is formed extending over a plurality of sub-regions, as specifically described above, the microscope image providing section 303 provides the digital image of which the position in the thickness direction of the sample is changed for each sub-region to the image display device 40.

Processing for providing the microscope image which is performed in the microscope image providing section 303 will be specifically described below again.

The all-in-focus image update section 305 is implemented by, for example, a CPU, a ROM, a RAM, and the like. When the in-focus position in a predetermined region of the all-in-focus image is changed by the operation of the observer executed on the image display device 40, the all-in-focus image update section 305 at least updates the in-focus position information corresponding to the changed all-in-focus image. In addition, the all-in-focus image update section 305 may further update the all-in-focus image itself using the in-focus position information after being updated and the microscope image stored in the storage section 309.

Here, the updating of the in-focus position information and the all-in-focus image performed in the all-in-focus image update section 305 will be specifically described below again.

The communication control section 307 is implemented by, for example, a CPU, a ROM, a RAM, a communication unit, and the like. The communication control section 307 controls communication performed through the network 3 between the image management server 30 and the microscope control device 20 or the image display device 40 provided to the outside of the image management server 30.

The storage section 309 is an example of the storage unit included in the image management server 30 according to the example embodiment. The microscope image data group, managed by the image management server 30, which is provided from the microscope control device 20 or various types of databases and the like regarding the managed microscope image data group are stored in the storage section 309. In addition, various types of history information such as the registration history, the update history and the deletion history of the microscope image data may be recorded on the storage section 309. Further, various parameters or processes during processing which are necessary to be saved when the image management server 30 according to the example embodiment performs some kind of processing, or various types of databases or programs, and the like are appropriately recorded in the storage section 309.

As described above, an example of the function of the image management server 30 according to the example embodiment is shown. Each of the components mentioned above may be configured using general-purpose members or circuits, and may be configured by hardware specific to the functions of each of the components. In addition, the functions of each of the components may all be performed by a CPU and the like. Therefore, it is possible to change the configuration appropriately used in accordance with the technical level whenever the example embodiment is carried out.

Computer programs for realizing each function of the image management server 30 according to the above-mentioned example embodiment can be created and implemented in a personal computer and the like. In addition, a recording medium capable of being read by the computer in which such computer programs are stored can also be provided. The recording medium is, for example, a magnetic disk, an optical disk, a magneto-optical disk, a flash memory, and the like. In addition, the above-mentioned computer programs may be distributed through, for example, the networks without using the recording medium.

<With Respect to Configuration of Image Display Device>

Figure 19:
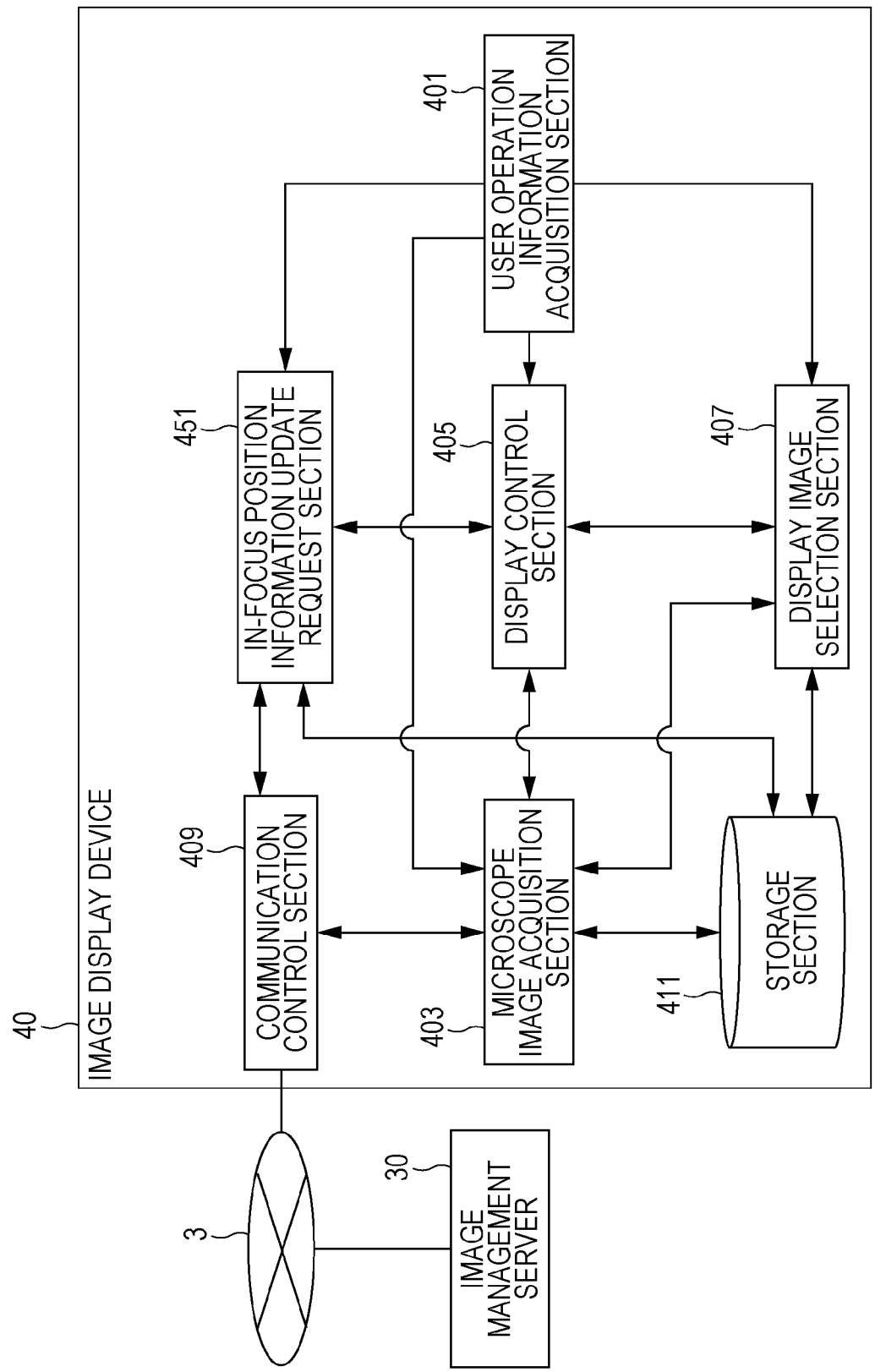
FIG. 19 is a block diagram illustrating the configuration of the image display device according to the example embodiment.

Subsequently, an example of the configuration of the image display device 40 according to the example embodiment will be described in brief with reference to FIG. 19. FIG. 19 is a block diagram illustrating an example of the configuration of the image display device 40 according to the example embodiment.

For example, as shown in FIG. 19, the image display device 40 according to the example embodiment mainly includes the user operation information acquisition section 401, the microscope image acquisition section 403, the display control section 405, the display image selection section 407, the communication control section 409, the storage section 411 and an in-focus position information update request section 451.

The user operation information acquisition section 401 is implemented by, for example, a CPU, a ROM, a RAM, an input unit, and the like. The user operation information acquisition section 401 acquires output signals, output from the input unit such as a keyboard, a mouse and a touch panel, that correspond to user operations performed on the corresponding input unit by a user, and generates user operation information indicating the operations (user operations) performed by the user. The user operation information acquisition section 401 outputs the generated user operation information to the microscope image acquisition section 403, the display control section 405, the display image selection section 407 and the in-focus position information update request section 451 which are described later. In addition, the user operation information acquisition section 401 may store the generated user operation information in the storage section 411 described later to use history information.

Here, an example of the operations performed on the input unit such as a keyboard, a mouse and a touch panel by the user can include, for example, selection processing of the microscope image, change processing of a display region with respect to a certain microscope image, adjustment processing of the depth position in the all-in-focus image, and the like. In addition, the user operations performed by the user are not limited thereto, and the user operations performed by the user are appropriately converted into user operation information indicating the corresponding user operation, and are output to each of the processing sections.

The microscope image acquisition section 403 is implemented by, for example, a CPU, a ROM, a RAM, and the like. The microscope image acquisition section 403 acquires a list of the microscope images managed by the image management server 30 from the image management server 30, in accordance with user operation information, indicating the acquisition start of a list of the microscope images, which is output from the user operation information acquisition section 401. In addition, when the microscope image of a certain sample is selected by the user operation, the microscope image acquisition section 403 transmits a request for the selected microscope image to the image management server 30.

When the microscope image acquisition section 403 acquires data of the digital image (microscope image) provided from the image management server 30, the acquired data of the microscope image is output to the display control section 405 described later. In addition, the microscope image acquisition section 403 may store the data acquired of the microscope image in the storage section 411.

The display control section 405 is implemented by, for example, a CPU, a ROM, a RAM, and the like. The display control section 405 controls a display screen displayed on the display device such as a display included in the image display device 40 according to the example embodiment. In addition, the display control section 405 changes the content displayed on the display screen, in accordance with at least any of user operation information output from the user operation information acquisition section 401 and selected image information output from the display image selection section 407 described later.

Specifically, when information about a list of the microscope images is output from the microscope image acquisition section 403, the display control section 405 displays a list of the microscope images capable of being observed by the user on the display screen, on the basis of the output information. In addition, when information for starting a display of the microscope image is output as the user operation information, the display control section 405 displays the magnified image of the sample, designated by the corresponding selected image information, on the display screen on the basis of the selected image information output from the display image selection section 407 described later. In addition, when information for changing the display region displayed on the display screen is output as the user operation information, the magnified image is moved within the display screen from side to side and up and down (within the plane surface), is magnified and demagnified by zooming and panning or like, or is moved so as to change the focus position in the depth direction.

Further, the display control section 405 according to the example embodiment displays the depth position (position along the thickness direction of the sample) of the displayed digital image (microscope image) on the display screen.

At this time, the display control section 405 specifies the site (region) of the digital image displayed on the display screen, and outputs information about the region displayed on this display screen to the microscope image acquisition section 403 and the display image selection section 407. In addition, the display control section 405 specifies a position (position in the display screen) displayed by a position designation object such as a mouse pointer, or a region (region in the display screen) selected by the position designation object, and the like, and outputs information about this display position to the display image selection section 407. Thereby, the microscope image acquisition section 403 and the display image selection section 407 can grasp various types of information about the content (hereinafter, also referred to as the display content information) displayed on the display screen within the image display device 40.

In addition, when various types of objects (for example, icons or slide bars, and the like for performing various types of processing) displayed on the display screen are selected by the position designation object and the like, or various types of operations such as dragging are performed, the display control section 405 can specify which objects are selected or operated on the basis of the user operation information.

The display control section 405 can use various types of information stored in the storage section 411 and the like as the content displayed on the display screen of the image display device 40.

The display image selection section 407 is implemented by, for example, a CPU, a GPU, a ROM, a RAM, and the like. The display image selection section 407 selects the digital image used at the time of displaying the designated sample on the display screen, on the basis of the user operation information output from the user operation information acquisition section 401 and various types of display content information output from the display control section 405.

Specifically, when the user operation information for starting a display of the microscope image is output from the user operation information acquisition section 401, the display image selection section 407 can select the all-in-focus image as the magnified image of the sample initially displayed on the display screen. At this time, when the all-in-focus image previously generated in the microscope image of the sample for performing a display exists, the display image selection section 407 generates the selected image information indicating the purport to use the generated all-in-focus image, and outputs the generated selected image information to the display control section 405. Here, the selected image information is information indicating the selection result of the selection processing of the image performed by the display image selection section 407.

When the user operation information for starting a display of the microscope image is output from the user operation information acquisition section 401, the display image selection section 407 can select the digital image so that the sub-region corresponding to the approximately central portion of the display region on which the magnified image of the sample is displayed is in an in-focus state. When a certain image is displayed on the display screen, the user often watches the central portion initially. For this reason, by selecting the digital image configured such that the approximately central portion of the display region on which the magnified image is displayed is in an in-focus state, the observer of the magnified image of the sample can omit performing the operation such as focus adjustment, and the convenience of the user can be improved.

In such a case, the display image selection section 407 acquires display content information regarding the size of the region on which the magnified image of the sample is displayed from the display control section 405, and specifies which portion of the surface region corresponding to the digital image corresponds to the sub-region located at the approximately central portion of this display region. Thereafter, the display image selection section 407 refers to the in-focus position information associated with the microscope image to select the digital image in which the specified sub-region (sub-region located at the approximately central portion of the display region) is in an in-focus state. Next, the display screen selection section 407 outputs information indicating the selected digital image to the display control section 405 as the selected image information.

When the user operation information for starting a display of the microscope image is output from the user operation information acquisition section 401, the display image selection section 407 can select the digital image so that the sub-region corresponding to a position at which the position designation object exists is in an in-focus state.

In such a case, the display image selection section 407 acquires the display content information indicating a position at which the position designation object exists from the display control section 405, and specifies which sub-region corresponds to the position at which the position designation object exists. Thereafter, the display image selection section 407 refers to the in-focus position information associated with the microscope image to select the digital image in which the specified sub-region is in an in-focus state. Next, the display screen selection section 407 outputs information indicating the select digital image to the display control section 405 as the selected image information.

Three kinds of selection processing of the initial display image as described above can be appropriately turned on/off. That is, it is possible to designate which digital image to display as the initial display screen by using a default behavior setting function and the like of the image display device 40. In addition, the digital image used in the initial display screen is not limited to the above.

Further, when information for changing the display region displayed on the display screen is output as the user operation information, the display image selection section 407 selects the digital image used in display in accordance with the user operation. Thereby, the digital image that the observer of the magnified image of the sample intends to obtain is selected by the display image selection section 407.

In addition, when the all-in-focus image is displayed on the display screen and the display of the all-in-focus image is released by the user operation, the display image selection section 407 can also select the digital image in which a predetermined region of the all-in-focus image is in an in-focus state as the microscope image displayed on the display screen after being released.

In this way, in the image display device 40, the user selects the digital image located at an arbitrary depth position by the wheel operation of a mouse and the like, thereby allowing the same operation as manual adjustment of the focus of the microscope to be performed. However, as mentioned above, in the image of individual depth positions of the digital image data, the in-focus states vary with the display region of the image, and the user performs manual adjustment of the focus whenever the position of observation is moved. Consequently, the display image selection section 407 automatically selects the display position of the depth direction from the in-focus position information so that, for example, the in-focus state of a region corresponding to the center of the display image or a region in which the position designation object such as a pointer is stopped becomes an optimal state using the in-focus position information. Thereby, in the image display device 40 according to the example embodiment, a display just like the auto focusing of the slide stage on the region that the user wants to observe is possible, and the user is saved the trouble of performing the operation. In addition, it is possible for the user to observe the all through one digital image having no depth direction by using the all-in-focus image in which all the display regions are in the optimal in-focus state.

In addition, it is also considered that the user observes the change in the cubic structure of the sample (that is, change in the sample image with the change in the depth position). In such a case, because the operation in which the user manually changes the depth position is performed, the function of the automatic optimum focus display or the all-in-focus image display mentioned above can be preferably turned on/off.

The communication control section 409 is implemented by, for example, a CPU, a ROM, a RAM, a communication unit, and the like. The communication control section 409 controls communications performed through the network 3 between the image display device 40 and the image management server 30 provided to the outside of the image display device 40.

The storage section 411 is an example of a storage unit included in the image display device 40 according to the example embodiment. The microscope image data group acquired from the image management server 30 or various types of meta information associated with the microscope image data, and the like are stored in the storage section 411. In addition, various types of history information such as the acquisition history of the microscope image data may be recorded in the storage section 411. Further, various parameters or processes during processing which are necessary to be saved when the image display device 40 according to the example embodiment performs some kind of processing, or various types of databases or programs, and the like are appropriately recorded in the storage section 411.

The in-focus position information update request section 451 is implemented by, for example, a CPU, a ROM, a RAM, and the like. When the in-focus position in a predetermined region of the all-in-focus image is changed along the thickness direction of the sample (that is, depth direction of the sample) in accordance with the user operation, the in-focus position information update request section 451 requests the image management server to update the in-focus position information corresponding to a predetermined region.

In all cases where the in-focus position in a predetermined region of the all-in-focus image is changed, the in-focus position information update request section 451 may request the image management server 30 to update the in-focus position information. In addition, when the user operation for requesting the updating of the in-focus position information is performed, the in-focus position information update request section 451 may request the image management server 30 to update the in-focus position information. That is, it is possible to appropriately set how to transmit the update request for the in-focus position information to the image management server 30 under some conditions.

As described above, an example of the function of the image display device 40 according to the example embodiment is shown. Each of the components mentioned above may be configured using general-purpose members or circuits, and may be configured by hardware specific to the functions of each of the components. In addition, the functions of each of the components may all be performed by a CPU and the like. Therefore, it is possible to change the configuration appropriately used in accordance with the technical level whenever the example embodiment is carried out.

Computer programs for realizing each function of the image display device 40 according to the above-mentioned example embodiment can be created and implemented in a personal computer and the like. In addition, a recording medium capable of being read by the computer in which such computer programs are stored can also be provided. The recording medium is, for example, a magnetic disk, an optical disk, a magneto-optical disk, a flash memory, and the like. In addition, the above-mentioned computer programs may be distributed through, for example, the networks without using the recording medium.

<With Respect to an Example of Display Screen and Display Control Processing of Microscope Image>

Subsequently, reference will be made to FIGS. 20 to 27 to specifically describe an example of the display screen displayed on the display section of the image display device 40, and an example of display control processing of the microscope image performed while the image management server 30 and the image display device 40 are in cooperation with each other. FIGS. 20 to 27 are explanatory diagrams illustrating an example of the display screen of the microscope image according to the example embodiment.

Figure 20:
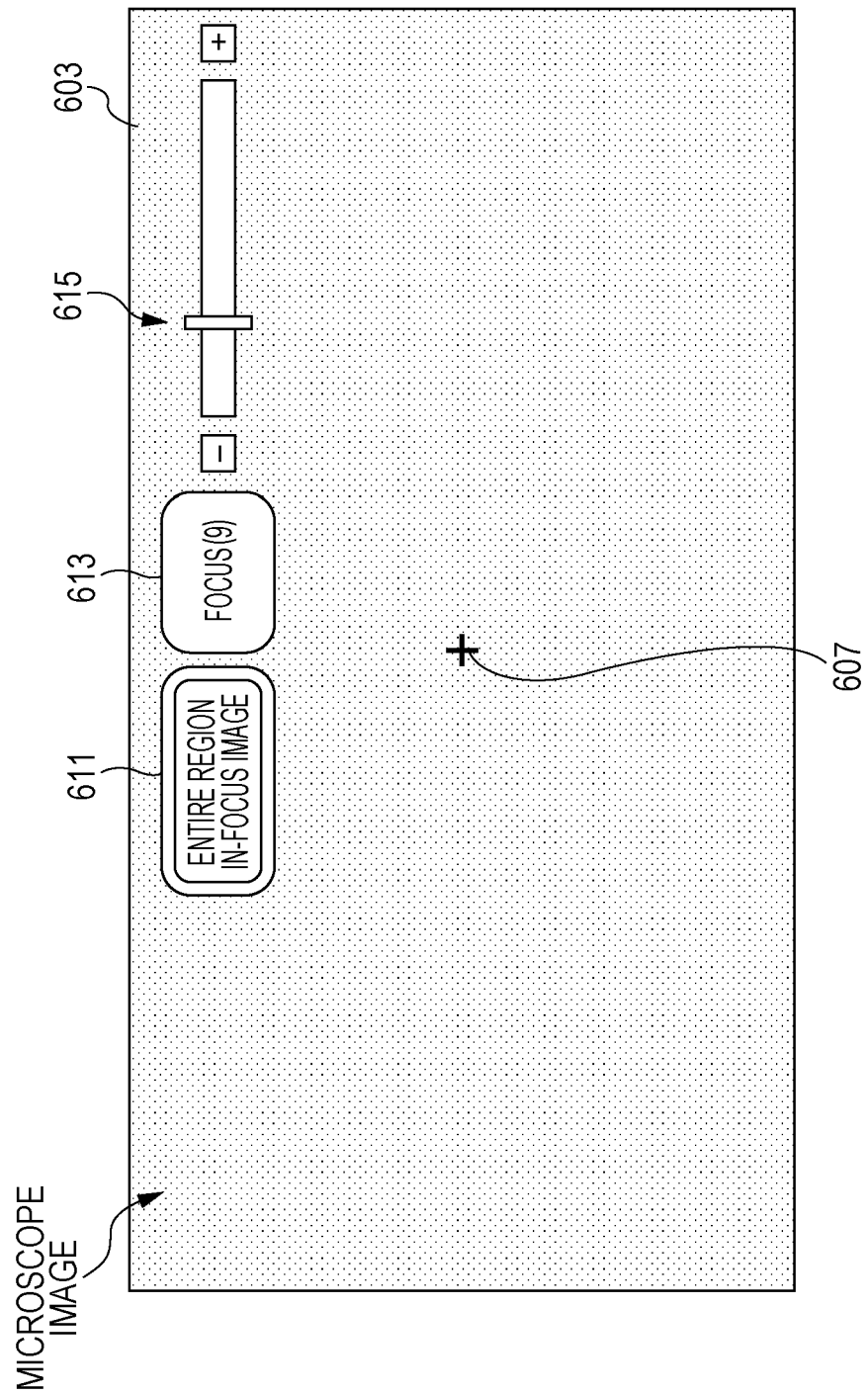
FIG. 20 is an explanatory diagram illustrating an example of the display screen of the microscope image according to the example embodiment.

FIG. 20 is an explanatory diagram illustrating an example of the magnified image display region 603 in the display screen 601. As shown in FIG. 20, the microscope image selected by the user is displayed on the magnified image display region 603, but various types of operation objects such as operation icons or operation toolbars are further displayed on this magnified image display region 603 in addition to the microscope image. For example, an all-in-focus image display icon 611, a depth information display region 613, or a depth position adjusting slide bar 615, and the like are displayed on the magnified image display region 603 shown in FIG. 20 in addition to the pointer 607 which is an example of the position designation object.

Here, the all-in-focus image display icon 611 is a icon for switching a display mode to an all-in-focus image display mode by which the all-in-focus image is displayed on the magnified image display region 603. When the all-in-focus image display icon 611 is selected by the user operation, the display image selection section 407 selects the all-in-focus image as the digital image displayed on the magnified image display region 603, and requests the microscope image acquisition section 403 to acquire the all-in-focus image of the sample of interest. The microscope image acquisition section 403 transmits provision request information of the all-in-focus image to the image management server 30 through the communication control section 409. When the provision request information of the all-in-focus image transmitted from the image display device 40 is acquired, the microscope image providing section 303 of the image management server 30 provides the requested all-in-focus image to the image display device 40 through the communication control section 307. The display control section 405 of the image display device 40 performs display control of the provided all-in-focus image, and displays the all-in-focus image to the magnified image display region 603.

Figure 21:
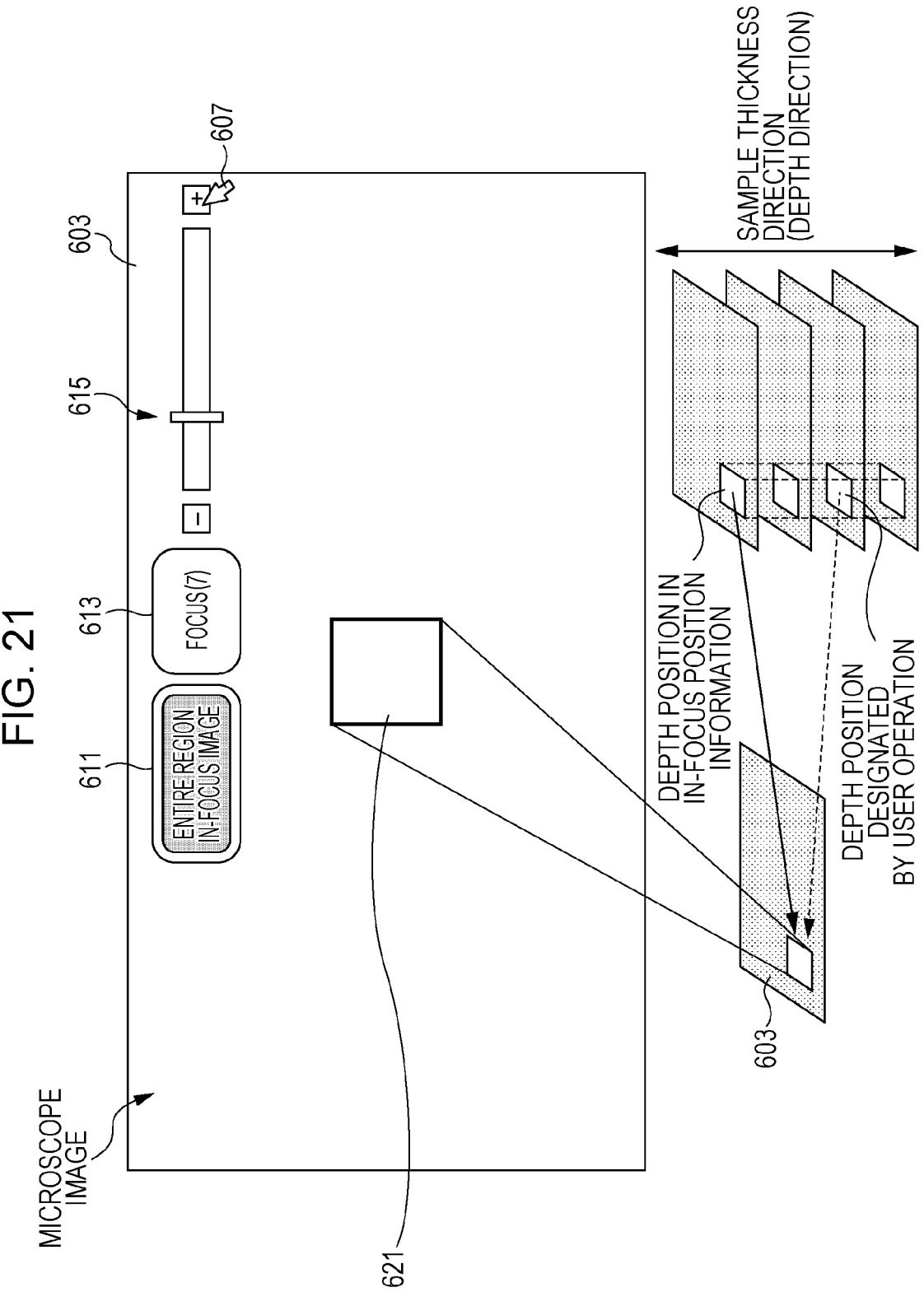
FIG. 21 is an explanatory diagram illustrating an example of the display screen of the microscope image according to the example embodiment.

In addition, information about the position at which the pointer 607 exists or the depth position (that is, position along the thickness direction of the sample) in which the region and the like selected by the pointer 607 are in an in-focus state is displayed on the depth information display region 613. For example, as shown in FIG. 21, this depth position may be displayed using the number of sheets such as x-th sheet (or, y-th sheet from the stage side) from the objective lens side as a unit, and may be displayed as the percentage such as a position of p % from the objective lens side. The user of the image display device 40 can easily grasp where is the position at which the pointer 607 exists or the depth position such as the region selected by the pointer 607, by referring to this depth information display region 613.

The depth position adjusting slide bar 615 is an object operated in order to adjust the depth position of the displayed digital image (microscope image). This operation of the object can allow the depth position of the digital image displayed on the magnified image display region 603 to be adjusted. In addition, as described later, in the case where the depth position adjusting slide bar 615 is operated when the all-in-focus image is displayed on the magnified image display region 603, it is possible to adjust the position at which the pointer 607 exists, or the depth position such as the region selected by the pointer 607.

When the depth position adjusting slide bar 615 is operated, the content displayed on the depth information display region 613 is also changed in response to such an operation. In addition, the display control section 405 may change the size of the pointer 607 displayed on the magnified image display region 603 with the change of the depth position. For example, the display control section 405 may decrease the size of the pointer 607 in the case where the depth position is change to the deeper side from the currently displayed position, and may increase the size of the pointer 607 in the case where the depth position is changed to the front side from the currently displayed position. The user can intuitively grasp the change of the depth position by performing such processing.

In addition, as shown in FIG. 21, in the state where the all-in-focus image display icon 611 is selected, the magnified image display region 603 is switched to the all-in-focus image display mode. At this time, the case is considered where the user operates the pointer 607 to thereby select a certain region of the all-in-focus image. Here, the region selected by the user operation is called a selected region 621. At this time, depth position information of the selected region 621 is displayed on the depth information display region 613. In such a case, when the depth position adjusting slide bar 615 is operated by the user operation, as shown in FIG. 21, the microscope image (digital image) of which the depth position is changed is displayed within the range of the selected region 621.

In such a case, the display control section 405 of the image display device 40 first specifies coordinates that defines the range of the selected region 621 selected by the user operation, and outputs information about the specified coordinates to the display image selection section 407. In addition, in the image selection section 407, information about the operation amount of the depth position adjusting slide bar 615 is output from the user operation information acquisition section 401. The image selection section 407 generates selected image information on the basis of information about the specified coordinates and information about the operation amount of the depth position adjusting slide bar 615, and requests the microscope image acquisition section 403 to acquire the digital image based on the selected image information. The microscope image acquisition section 403 transmits the provision request information of the digital image displayed on the selected region 621 to the image management server 30 through the communication control section 409.

When the provision request information of the digital image transmitted from the image display device 40 is acquired through the communication control section 307, the microscope image providing section 303 of the image management server 30 determines which depth position the user hopes for on the basis of the information about the operation amount of the slide bar 615 and the in-focus position information of the sub-region including such a range 621. Thereafter, the microscope image providing section 303 of the image management server 30 provides the requested digital image to the image display device 40. The display control section 405 of the image display device 40 performs the display control of the provided digital image, and displays the acquired digital image to the selected region 621 of the magnified image display region 603. Thereby, the digital image of which the depth position is adjusted is displayed within the selection range 621.

Figure 22:
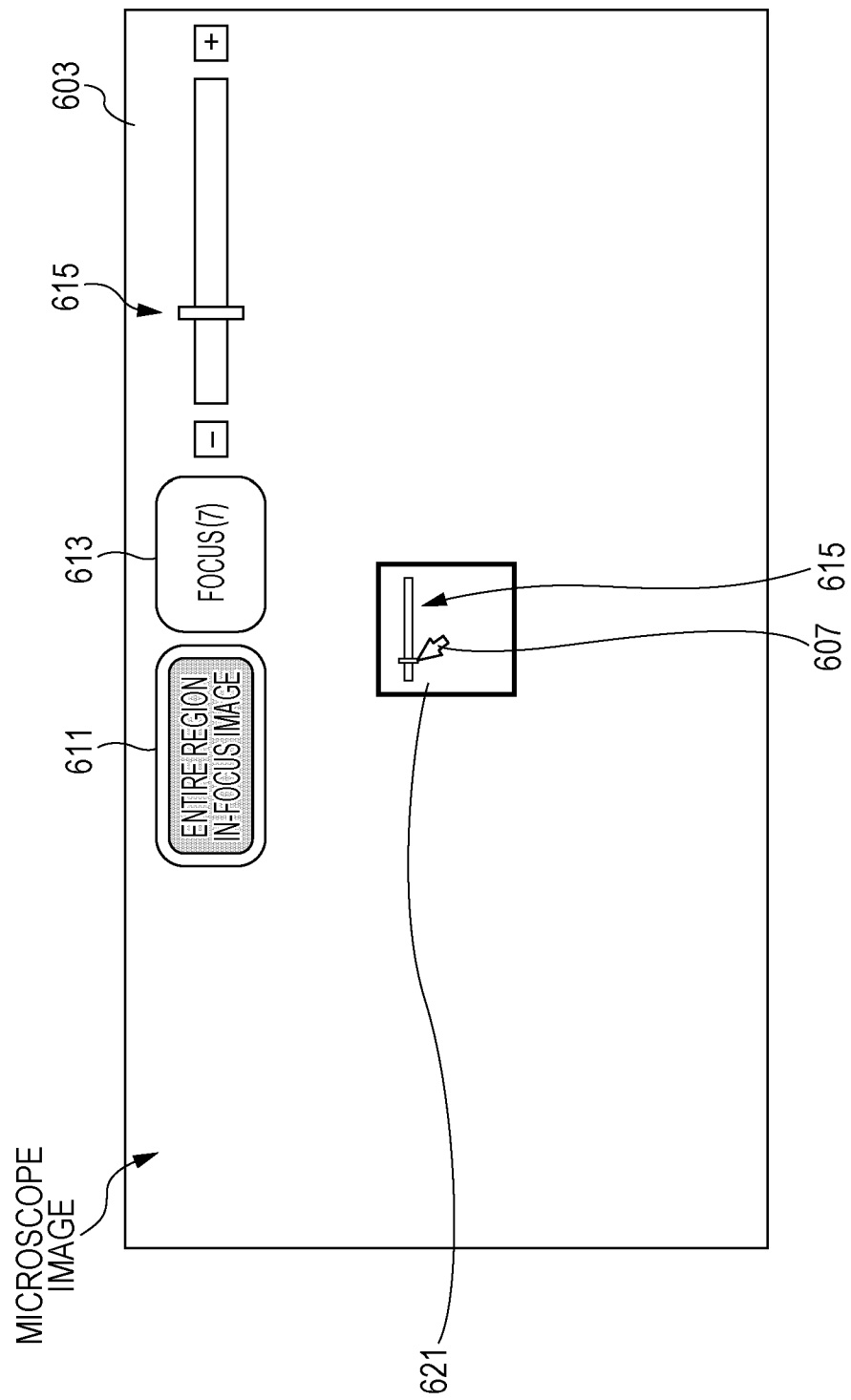
FIG. 22 is an explanatory diagram illustrating an example of the display screen of the microscope image according to the example embodiment.

Here, as shown in FIG. 22, the display control section 405 may individually display the depth position adjusting slide bar 615 in the inside of the selected region 621 (for example, the upper portion of the selected region 621). Thereby, the amount of movement of the pointer 607 by the user can be reduced, and the user can easily execute adjustment of the depth position with respect to each selected region 621. In addition, the user can easily grasp the depth position of each selected region by referring to the individually displayed depth position adjusting slide bar 615.

Figure 23:
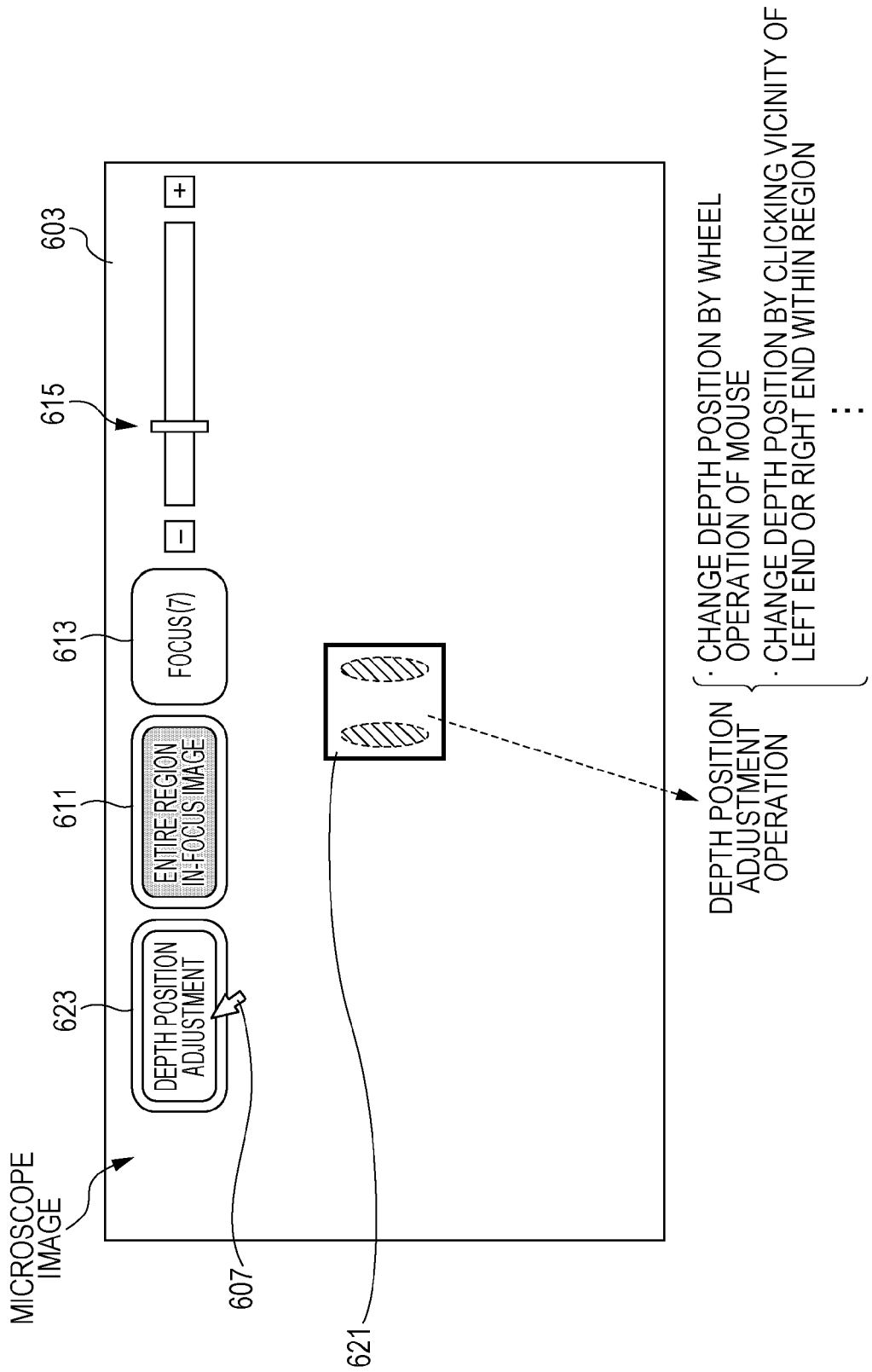
FIG. 23 is an explanatory diagram illustrating an example of the display screen of the microscope image according to the example embodiment.

In addition, as shown in FIG. 23, the display control section 405 may display a depth position adjustment icon 623 for switching the display mode to a depth position adjustment mode for adjusting the depth position of the all-in-focus image on the magnified image display region 603. The display control section 405 may constantly display this depth position adjustment icon 623 on the magnified image display region 603, and may display the depth position adjustment icon when the all-in-focus image is displayed on the magnified image display region 603.

When the depth position adjustment icon 623 is selected by the user operation, and the display mode is changed to the depth position adjustment mode, the depth position within the selected region 621 is adjusted in accordance with the user operation. The user operation for adjusting the depth position is not particularly limited, and for example, can include the wheel operation of the wheel mouse, or the click operation of the vicinity on the left end or the vicinity on the right end within the selected region 621, and the like, as shown by diagonal lines in FIG. 23. Here, in the case where the depth position is adjusted in accordance with the wheel operation, it is possible to perform processing such as adjustment of the depth position in the shallow direction when the wheel is operated toward the front side, and adjustment of the depth position in the deep direction when an operation reverse to the wheel is performed. In addition, in the case where the depth position is adjusted by the click operation within the selected region 621, it is possible to perform processing such as adjustment of the depth position in the shallow direction when the vicinity on the left end thereof is clicked, and adjustment of the depth position in the deep direction when the vicinity on the right end thereof is clicked.

When the adjustment processing of the depth position is performed by these user operations, the user operation information acquisition section 401 generates information indicating the change direction and the amount of change of the depth position (for example, the operation direction and the operation amount of the wheel, the click position and the frequency of clicks) as the user operation information. The user operation information acquisition section 401 outputs the generated user operation information to the display image selection section 407. The display image selection section 407 generates the selected image information on the basis of coordinate information indicating the selected region 621 provided from the display control section 405 and the provided user operation information, and requests the microscope image acquisition section 403 to acquire the digital image based on the selected image information. The microscope image acquisition section 403 transmits the provision request information of the digital image displayed on the selected region 621 to the image management server 30 through the communication control section 409.

When the provision request information of the digital image transmitted from the image display device 40 is acquired through the communication control section 307, the microscope image providing section 303 of the image management server 30 determines which depth position the user hopes for on the basis of the information about the operation amount of the slide bar 615 and the in-focus position information of the sub-region including such a range 621. Thereafter, the microscope image providing section 303 of the image management server 30 provides the requested digital image to the image display device 40. The display control section 405 of the image display device 40 performs the display control of the provided digital image, and displays the acquired digital image on the selected region 621 of the magnified image display region 603. Thereby, the digital image of which the depth position is adjusted is displayed within the selection range 621.

Figure 24:
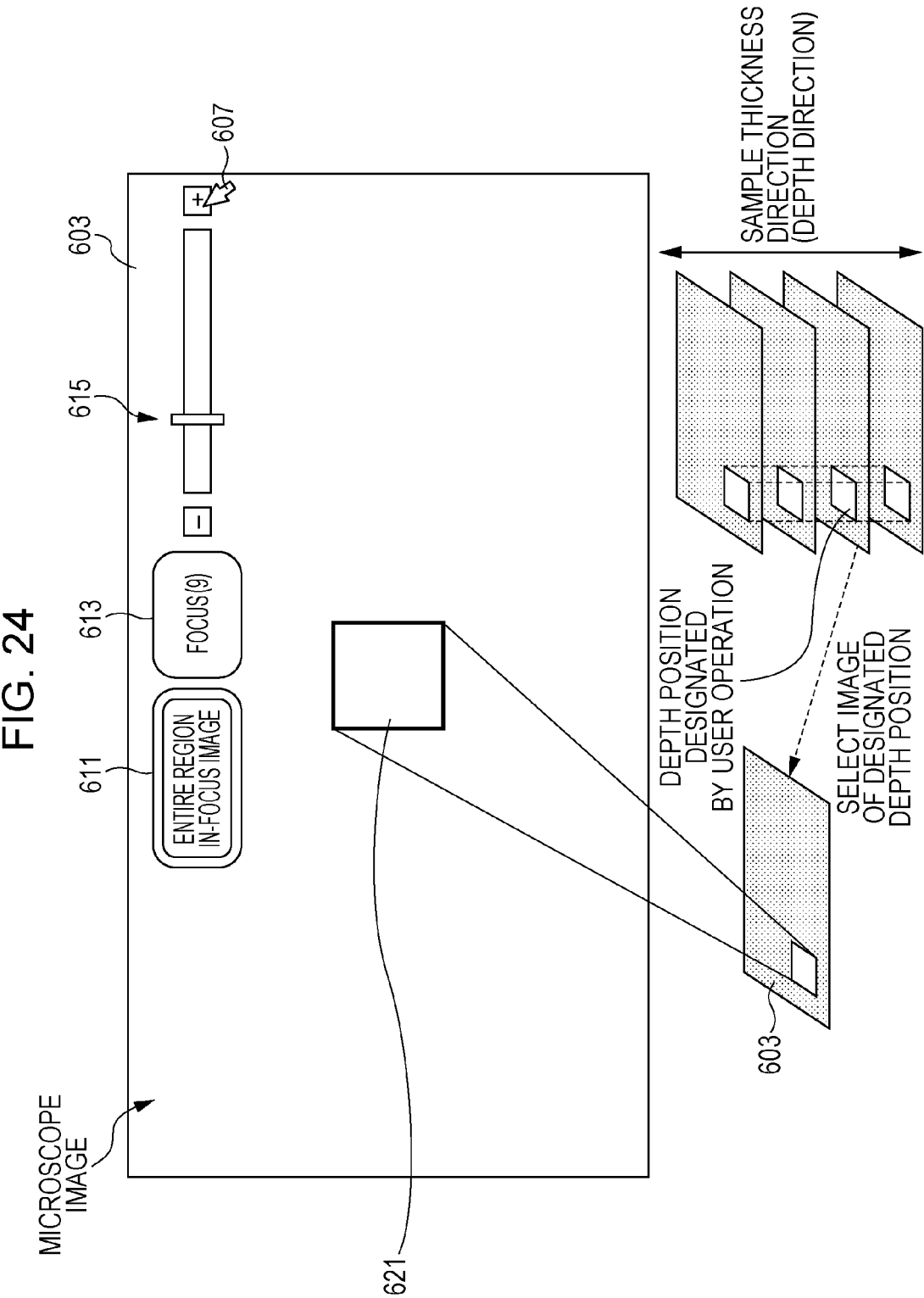
FIG. 24 is an explanatory diagram illustrating an example of the display screen of the microscope image according to the example embodiment.

In addition, as shown in FIG. 24, the previously selected all-in-focus image display icon 611 is selected again, whereby the all-in-focus image display mode is released. When the all-in-focus image display mode is released, the display control section 405 displays, for example, the position at which the pointer 607 exists or the digital image in which the region and the like selected by the pointer 607 are in an in-focus state, on the magnified image display region 603. In addition, when the position at which the pointer 607 exists or the depth position of the selected region 621 selected by the pointer 607 is corrected by the user operation, the display control section 405 displays the digital image in the depth position after being corrected on the magnified image display region 603. The same processing is performed on the case where the previously selected depth position adjustment icon 623 is selected again as shown in FIG. 23.

Figure 25:
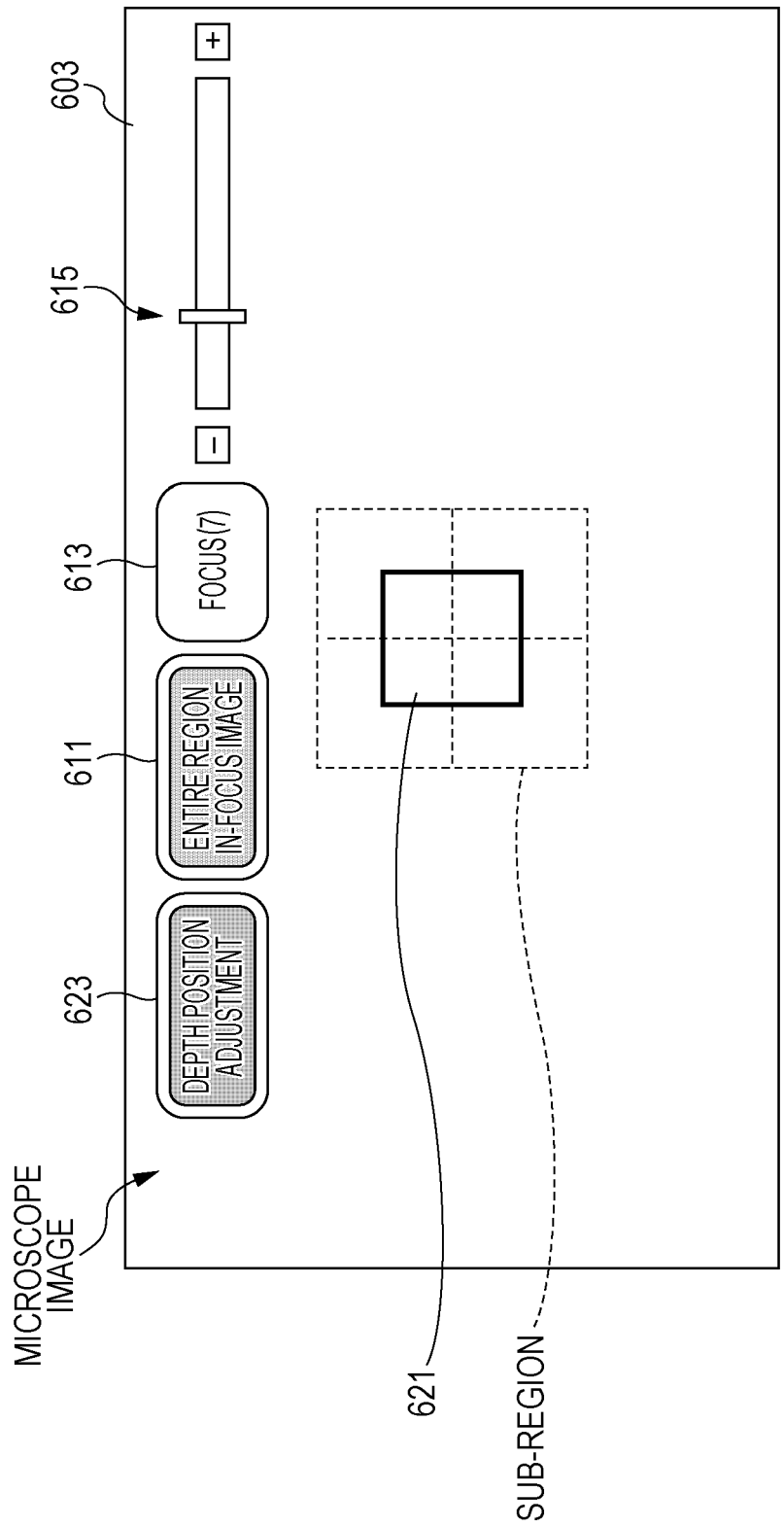
FIG. 25 is an explanatory diagram illustrating an example of the display screen of the microscope image according to the example embodiment.

Here, as shown in FIG. 25, when the adjustment of the depth position of the all-in-focus image is performed, there may be a case where the selected region 621 selected by the user operation exists extending over a plurality of sub-regions of the all-in-focus image. In such a case, the adjustment processing of the depth position is performed on the portion overlapping the selected region 621 in each sub-region.

In addition, when the depth position adjustment processing of the all-in-focus image is performed, and the image used by the amount of change of the depth position is changed from the current in-focus position, there may be a case where the magnified image (digital image) corresponding to such a position (of the amount of change of in-focus position±depth position) does not exist. In such a case, the adjustment of the all-in-focus image is performed using the best image (that is, image having a depth position closest to the amount of change of in-focus position±depth position) among the existing magnified images.

Figure 26:
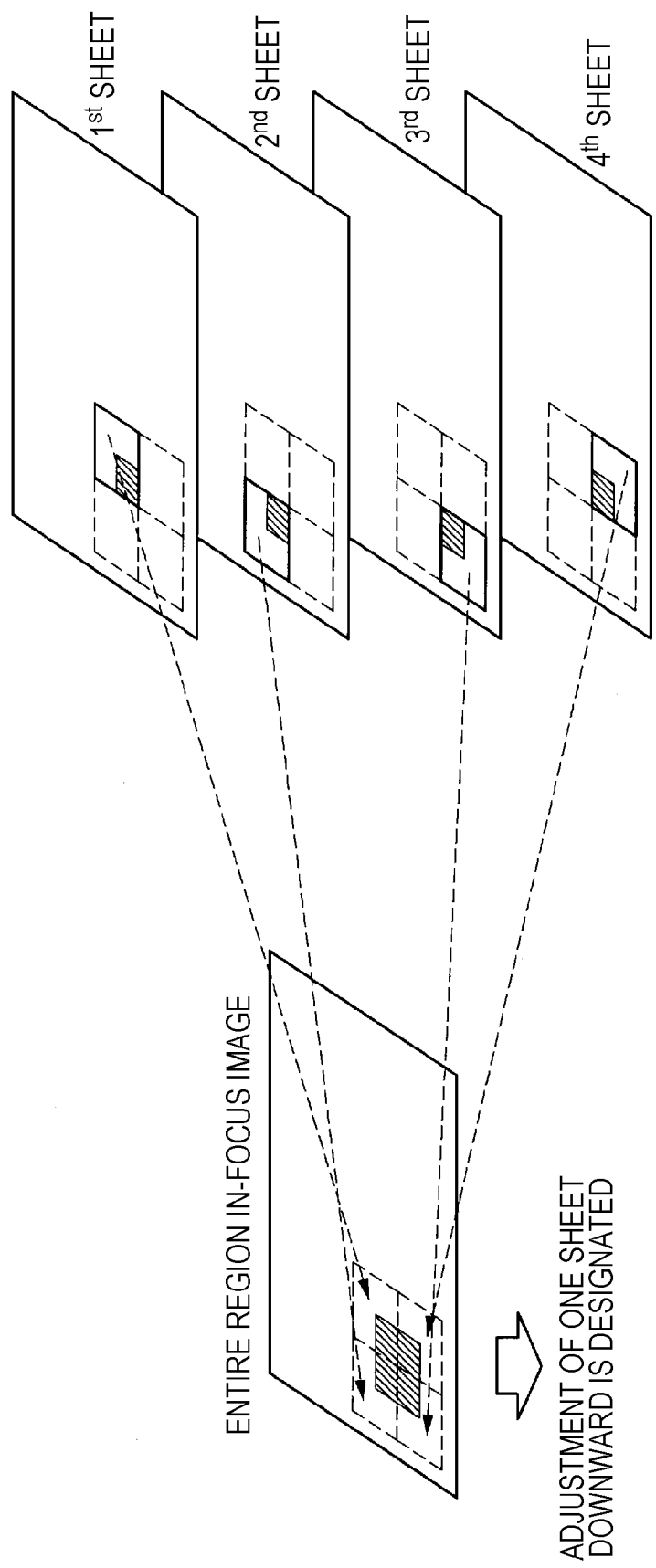
FIG. 26 is an explanatory diagram illustrating an example of the display screen of the microscope image according to the example embodiment.
Figure 27:
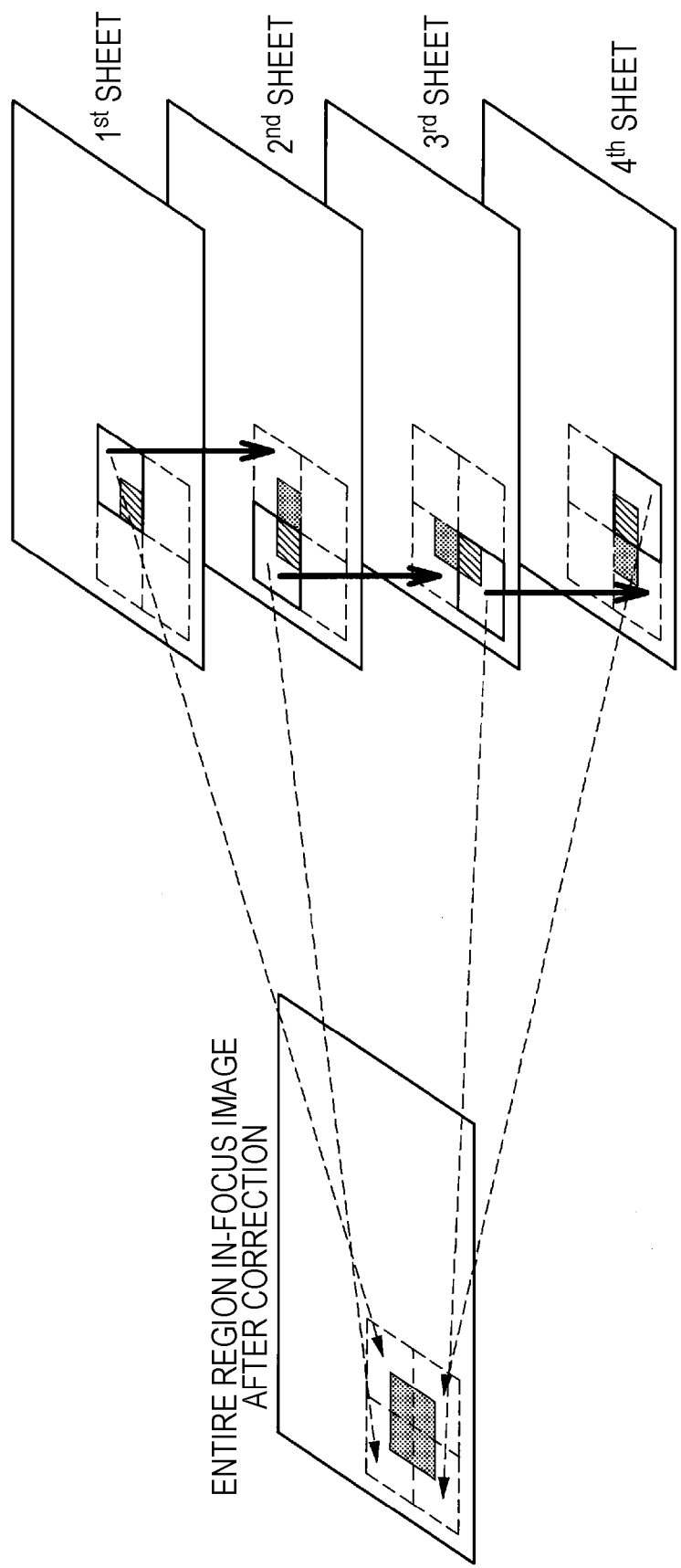
FIG. 27 is an explanatory diagram illustrating an example of the display screen of the microscope image according to the example embodiment.

Reference will be made below to FIGS. 26 and 27 to specifically describe the depth position adjustment processing of the all-in-focus image in the case where the selected region 621 extends over a plurality of sub-regions.

In the following example, attention is focused on the case where the microscope image of a certain sample includes four digital images, and the selected region 621 selected by the user operation exists extending over four sub-regions. Here, as shown in FIG. 26, the purport that the in-focus position of the sub-region to which the upper right portion of the selected region 621 belongs is located at the first sheet is listed in the in-focus position information, and the purport that the in-focus position of the sub-region to which the upper left portion thereof belongs is located at the second sheet is listed in the in-focus position information. Similarly, the purport that the in-focus position of the sub-region to which the lower left portion of the selected region 621 belongs is located at the third sheet is listed in the in-focus position information, and the purport that the in-focus position of the sub-region to which the lower right portion thereof belongs is located at the fourth sheet is listed in the in-focus position information.

In such a case, the case is considered where the user operation for the purport of correcting the depth position of the selected region 621 for one sheet in the downward direction (for example, direction in which the depth position is deepened) is performed. Such user operation information is transferred from the image display device 40 to the image management server 30, and the selection of the microscope image (digital image) provided to the image display device 40 is performed in the microscope image providing section 303 of the image management server 30.

In this case as shown in FIG. 27, the upper right portion of the selected region corresponds to the image of the first sheet before being corrected, but the image of the second sheet is used through the adjustment by the user. Similarly, the upper left portion of the selected region corresponds to the image of the second sheet before being corrected, but the image of the third sheet is used through the adjustment by the user. The lower left portion of the selected region corresponds to the image of the third sheet before being corrected, but the image of the fourth sheet is used through the adjustment of the user. Here, the lower right portion of the selected region corresponds to the image of the fourth before being corrected, and the image of the fifth sheet is used through the adjustment by the user. However, because only four digital images included in the microscope image exist, it is not possible to use the image of the fifth sheet. Consequently, the microscope image providing section 303 selects the use of the image of the fourth sheet as it is, in the lower right portion of the selected region.

A plurality of digital images selected in this way is provided from the image management server 30 to the image display device 40, and the image of which the depth position of the selected region 621 is adjusted is displayed in the image display device 40.

When the depth position adjustment processing of the all-in-focus image as described above is performed, the display control section 405 can display a display for confirming whether to perform the updating of the in-focus position information on the display screen, or a display for confirming whether to perform the updating of the all-in-focus image thereon.

When the purport of performing the updating of the in-focus position information is selected by the user operation, such a user operation is output to the in-focus position information update request section 451. The in-focus position information update request section 451 receives such user operation information, and requests the image management server 30 to update the in-focus position information through the communication control section 409. In addition, even with respect to the case where updating of the all-in-focus image is performed, the in-focus position information update request section 451 requests the image management server 30 to update the all-in-focus image through the communication control section 409.

When the update request of the in-focus position information is acquired through the communication control section 307, the in-focus position information update section 305 of the image management server 30 updates the requested in-focus position information of the sample, and stores the in-focus position information after being updated in the storage section 309 again. The case is considered where the in-focus positions of the digital images of the sample vary with the users who refer to the microscope image. For this reason, the in-focus position information update section 305 may perform the updating of the in-focus position information for each of the users.

In addition, when the updating of the all-in-focus image is requested, the in-focus position information update section 305 of the image management server 30 performs the updating of the all-in-focus image on the basis of the in-focus position information after being updated. In addition, even when there is no update request of the all-in-focus image at the time of performing update processing of the in-focus position information, the in-focus position information update section 305 may perform the update processing of the all-in-focus image.

<With Respect to Flow of Display Control Method of Microscope Image>

Subsequently, reference will be made to FIGS. 28 to 31 to simply describe an example of the flow of display control processing of the microscope image performed while the image management server 30 and the image display device 40 are in cooperation with each other. FIGS. 28 to 31 are flow diagrams illustrating an example of the flow of display control processing of the microscope image according to the example embodiment.

Prior to the following description, the sample of which the microscope image is observed is specified by the user operation, and the magnified image (digital image) displayed on the magnified image display region 603 and image data of the all-in-focus image are provided.

[Display Control Processing of Depth Position Information]

First, the flow related to display control processing of the depth position information shown in FIG. 28 will be described. The user operation information acquisition section 401 of the image display device 40 performs a standby for the user operation, and the image display device 40 determines whether the display operation of the all-in-focus image is performed (step S301). When the display operation of the all-in-focus image is performed, the display control section 405 displays the all-in-focus image on the magnified image display region 603 using the image data of the all-in-focus image (step S303).

Thereafter, the display control section 405 specifies coordinates of the image displayed on a predetermined region (for example, a position displayed by the pointer 607, or a selected region selected by the pointer 607) (step S305), and outputs the coordinates to the display image selection section 407. The display image selection section 407 generates selected image information including the specified coordinates to request the microscope image acquisition section 403 to acquire depth position information, and the microscope image acquisition section 403 requests the image management server 30 to provide the depth position information using the selected image information (step S307).

The microscope image providing section 303 of the image management server 30 acquires information about the depth position in the requested coordinates using the information about the coordinates (coordinate information) included in the request for providing the depth position information and the in-focus position information stored in the storage section 309 (step S309). Thereafter, the microscope image providing section 303 provides the acquired depth position information to the image display device 40 (step S311).

When the microscope image acquisition section 403 of the image display device 40 acquires the depth position information provided from the image management server 30, the acquired depth position information is output to the display control section 405. The display control section 405 displays the depth position information on the depth information display region 613 of the display screen, on the basis of the obtained depth position information (step S313).

Thereafter, the image display device 40 determines whether the image displayed in a predetermined region is changed (step S315), and when the image is changed, the image display device 40 performs step S305.

[Depth Position Adjustment Processing of All-In-Focus Image]

Next, reference will be made to FIG. 29 to describe the flow of depth position adjustment processing of the all-in-focus image. The user operation information acquisition section 401 of the image display device 40 performs a standby for the user operation, and the image display device 40 determines whether the display operation of the all-in-focus image is performed (step S321). When the display operation of the all-in-focus image is performed, the display control section 405 displays the all-in-focus image on the magnified image display region 603 using the image data of the all-in-focus image (step S323).

Thereafter, the display control section 405 specifies the coordinates of the image displayed on a predetermined region (for example, a position displayed by the pointer 607, or a selected region selected by the pointer 607) (step S325).

On the other hand, the user operation information acquisition section 401 performs a standby for the user operation, and the image display device 40 determines whether the depth adjustment operation is performed by the user (step S327). When the depth adjustment device is performed by the user, the display image selection section 407 specifies the depth position designated on the basis of the user operation information, and stores the depth position as the depth position information (step S329). Thereafter, the display image selection section 407 generates the selected image information including the specified coordinates and the store depth position information to request the microscope image acquisition section 403 to acquire the microscope image, and the microscope image acquisition section 403 requests the image management server 30 to provide the microscope image using the selected image information (step S331).

The microscope image providing section 303 of the image management server 30 acquires the microscope image in the requested coordinates and the depth position using the information about the coordinates (coordinate information) and the depth position information included in the request for providing the microscope image (step S333). Thereafter, the microscope image providing section 303 provides the acquired microscope image to the image display device 40 (step S335).

When the microscope image acquisition section 403 of the image display device 40 acquires the microscope image provided from the image management server 30, the acquired microscope image is output to the display control section 405. The display control section 405 displays the microscope image on the magnified image display region 603 of the display screen using the data of the obtained microscope image (step S337).

Thereafter, the image display device 40 determines whether an additional depth adjustment operation is performed (step S339), and when such an operation is performed, the image display device 40 performs step S329. In addition, when the additional depth adjustment operation is not performed, the image display device 40 determines whether the depth update operation of the all-in-focus image is performed (step S341). When such an update operation is not performed, the image display device 40 performs step S339.

In addition, when the depth update operation is performed, the in-focus position information update request section 451 of the image display device 40 transmits the store depth position information to the image management server (step S343). The in-focus position information update section 305 of the image management server 30 updates the managed in-focus position information on the basis of the acquired depth position information (step S345).

Figure 30A:
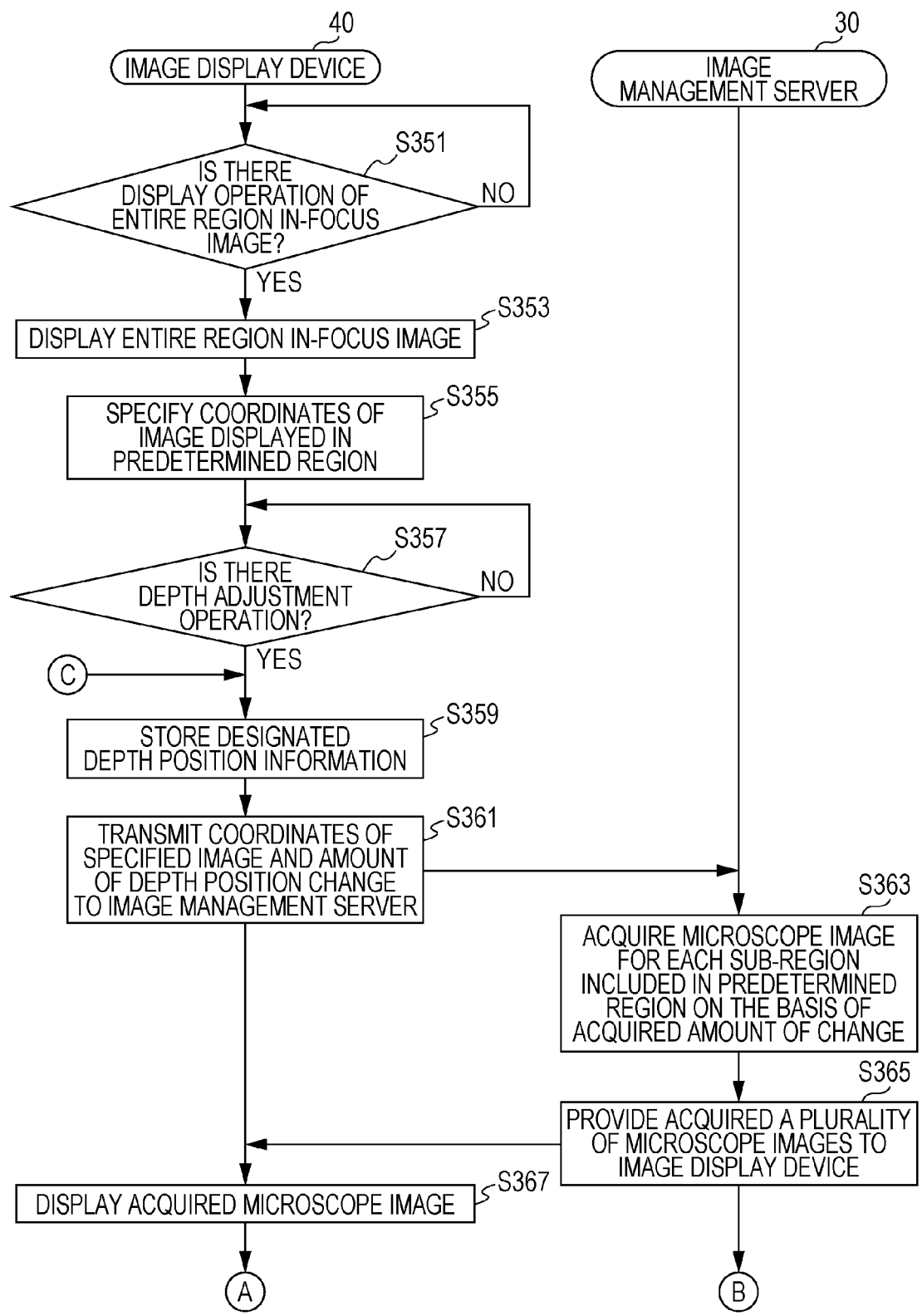
FIG. 30A is a flow diagram illustrating an example of a flow of display control processing of the microscope image according to the example embodiment.
Figure 30B:
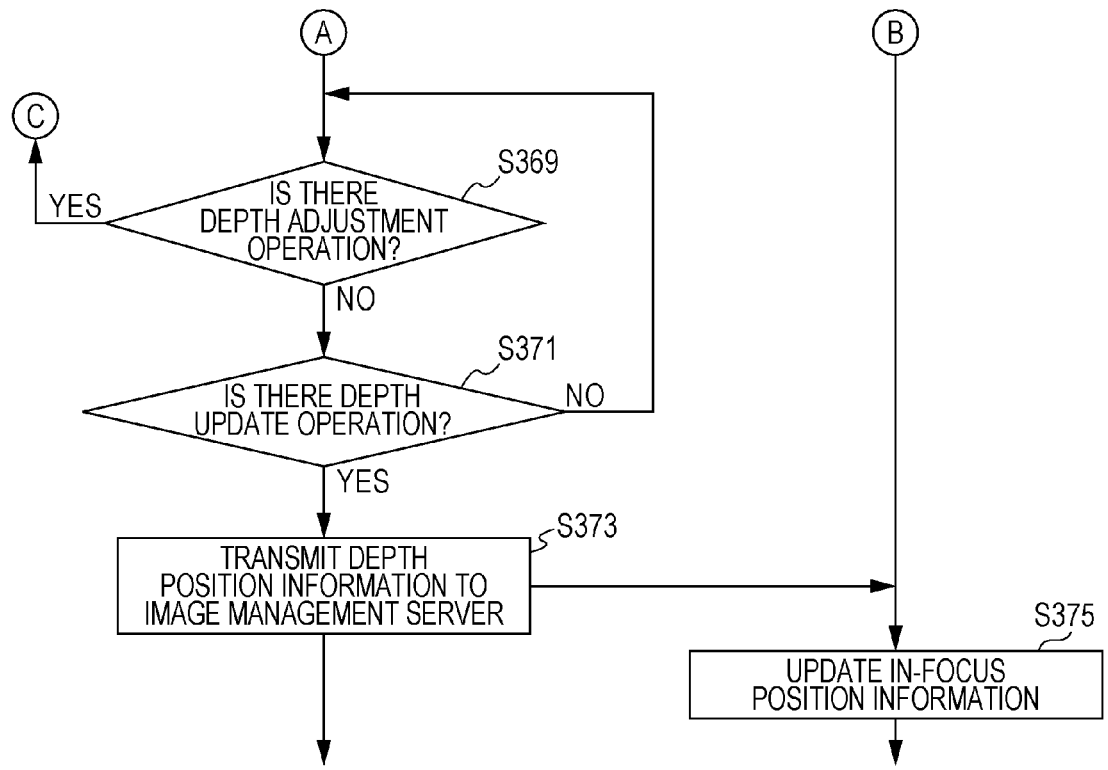
FIG. 30B is a flow diagram illustrating an example of a flow of display control processing of the microscope image according to the example embodiment.

Here, when the selected region 621 exists extending over a plurality of sub-regions, processing in the flow shown in FIGS. 30A and 30B is performed.

Even in such a case, the user operation information acquisition section 401 of the image display device 40 performs a standby for the user operation, and the image display device 40 determines whether the display operation of the all-in-focus image is performed (step S351). When the display operation of the all-in-focus image is performed, the display control section 405 displays the all-in-focus image on the magnified image display region 603 using the image data of the all-in-focus image (step S353).

Thereafter, the display control section 405 specifies the coordinates of the image displayed on a predetermined region (for example, a position displayed by the pointer 607, or a selected region selected by the pointer 607) (step S355).

On the other hand, the user operation information acquisition section 401 performs a standby for the user operation, and the image display device 40 determines whether the depth adjustment operation is performed by the user (step S357). When the depth adjustment device is performed by the user, the display image selection section 407 specifies the depth position designated on the basis of the user operation information, and store the depth position as the depth position information (step S359). Thereafter, the display image selection section 407 generates the selected image information including the specified coordinates and the amount of change of the depth position calculated on the basis of the store depth position information to request the microscope image acquisition section 403 to acquire the microscope image, and the microscope image acquisition section 403 requests the image management server 30 to provide the microscope image using the selected image information (step S361).

The microscope image providing section 303 of the image management server 30 acquires the microscope image in the coordinates and the depth position requested for each sub-region, using the information about the coordinates (coordinate information) and the amount of change of the depth position including the request for providing the microscope image, and the managed in-focus position information (step S363). Thereafter, the microscope image providing section 303 provides a plurality of acquired microscope images to the image display device 40 (step S365).

When the microscope image acquisition section 403 of the image display device 40 acquires the microscope image provided from the image management server 30, the acquired microscope image is output to the display control section 405. The display control section 405 displays the microscope image on the magnified image display region 603 of the display screen using the data of the obtained microscope image (step S367).

Thereafter, the image display device 40 determines whether an additional depth adjustment operation is performed (step S369), and when such an operation is performed, the image display device 40 performs step S359. When the additional depth adjustment operation is not performed, the image display device 40 determines whether the depth update operation of the all-in-focus image is performed (step S371). When such an update operation is not performed, the image display device 40 performs step S369.

In addition, when the depth update operation is performed, the in-focus position information update request section 451 of the image display device 40 transmits the stored depth position information or the amount of change of the depth position to the image management server (step S373). The in-focus position information update section 305 of the image management server 30 updates the managed in-focus position information on the basis of the acquired depth position information (step S375).

[Display Release Processing of All-In-Focus Image]

Figure 31:
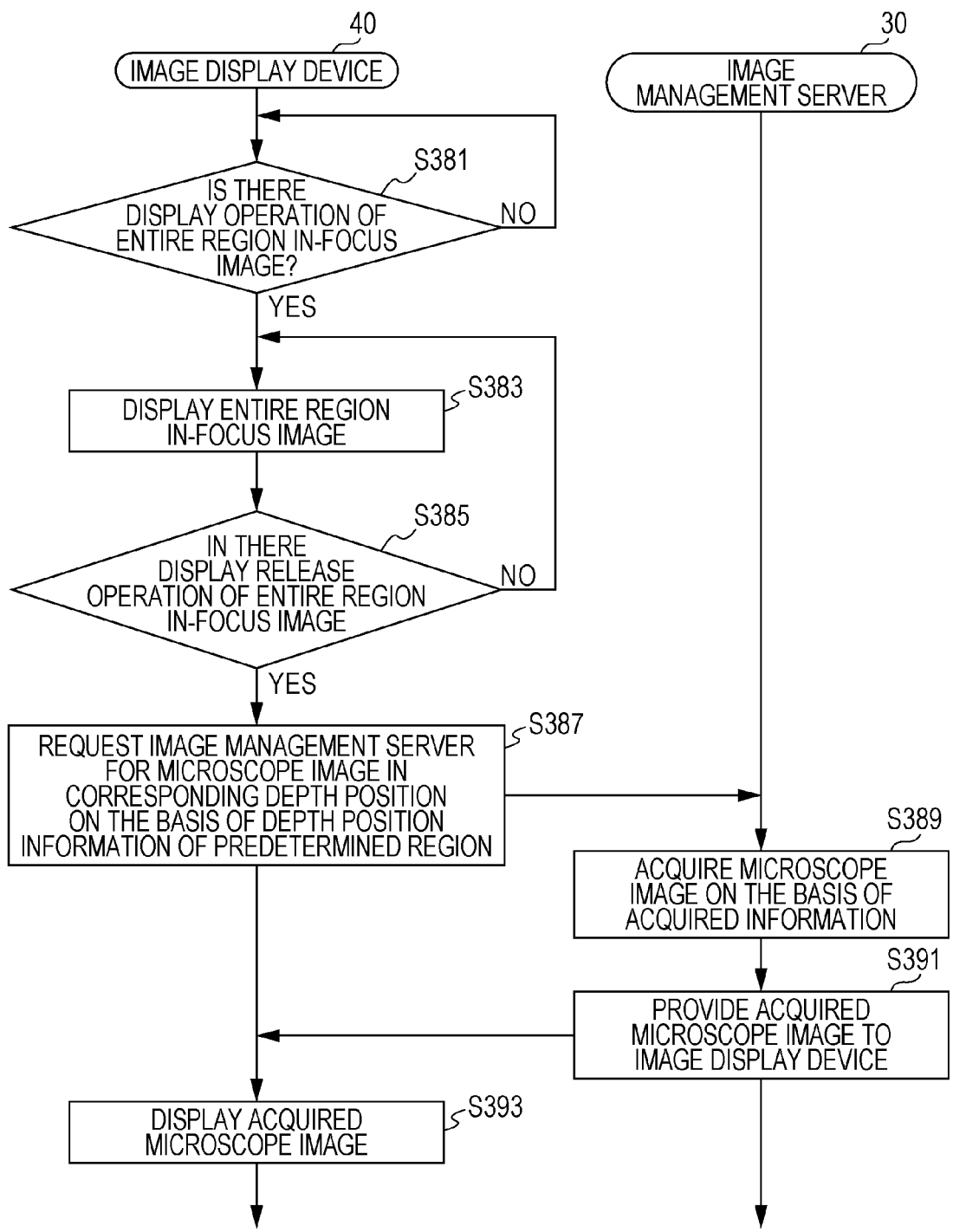
FIG. 31 is a flow diagram illustrating an example of a flow of display control processing of the microscope image according to the example embodiment.

Next, reference will be made to FIG. 31 to describe the flow of display release processing of the all-in-focus image. The user operation information acquisition section 401 of the image display device 40 performs a standby of the user operation, and the image display device 40 determines whether the display operation of the all-in-focus image is performed (step S381). When the display operation of the all-in-focus image is performed, the display control section 405 displays the all-in-focus image on the magnified image display region 603 using the image data of the all-in-focus image (step S383).

On the other hand, the user operation information acquisition section 401 performs a standby for the user operation, and the image display device 40 determines whether the display release operation of the all-in-focus image is performed by the user (step S385). When such an operation is not performed, the image display device 40 performs step S383.

On the other hand, when the display release operation of the all-in-focus image is performed, the display image selection section 407 generates the selected image information using the stored depth position information, and requests the microscope image acquisition section 403 to acquire the microscope image. The microscope image acquisition section 403 requests the image management server 30 to provide the microscope image using the generated selected image information (step S387).

The microscope image providing section 303 of the image management server 30 acquires the microscope image in the requested coordinates and the depth position, using the information about the coordinates (coordinate information) and the depth position information included in the request for providing the microscope image (step S389). Thereafter, the microscope image providing section 303 provides the acquired microscope image to the image display device 40 (step S391).

When the microscope image acquisition section 403 of the image display device 40 acquires the microscope image provided from the image management server 30, the acquired microscope image is output to the display control section 405. The display control section 405 displays the microscope image on magnified image display region 603 of the display screen, using the data of the obtained microscope image (step S393).

The display control processing of the microscope image is performed between the image management server 30 and the image display device 40 according to the example embodiment as described above. Even when the user observes the all-in-focus image by performing such processing, it is possible to grasp the depth position information of an arbitrary region, and to easily grasp the thickness of the sample. Moreover, in the image management server 30 and the image display device 40 according to the example embodiment, because the in-focus position of the all-in-focus image can be adjusted by the user, it is possible to improve the degree of accuracy of the all-in-focus image.

(With Respect to Hardware Configuration)

Figure 32:
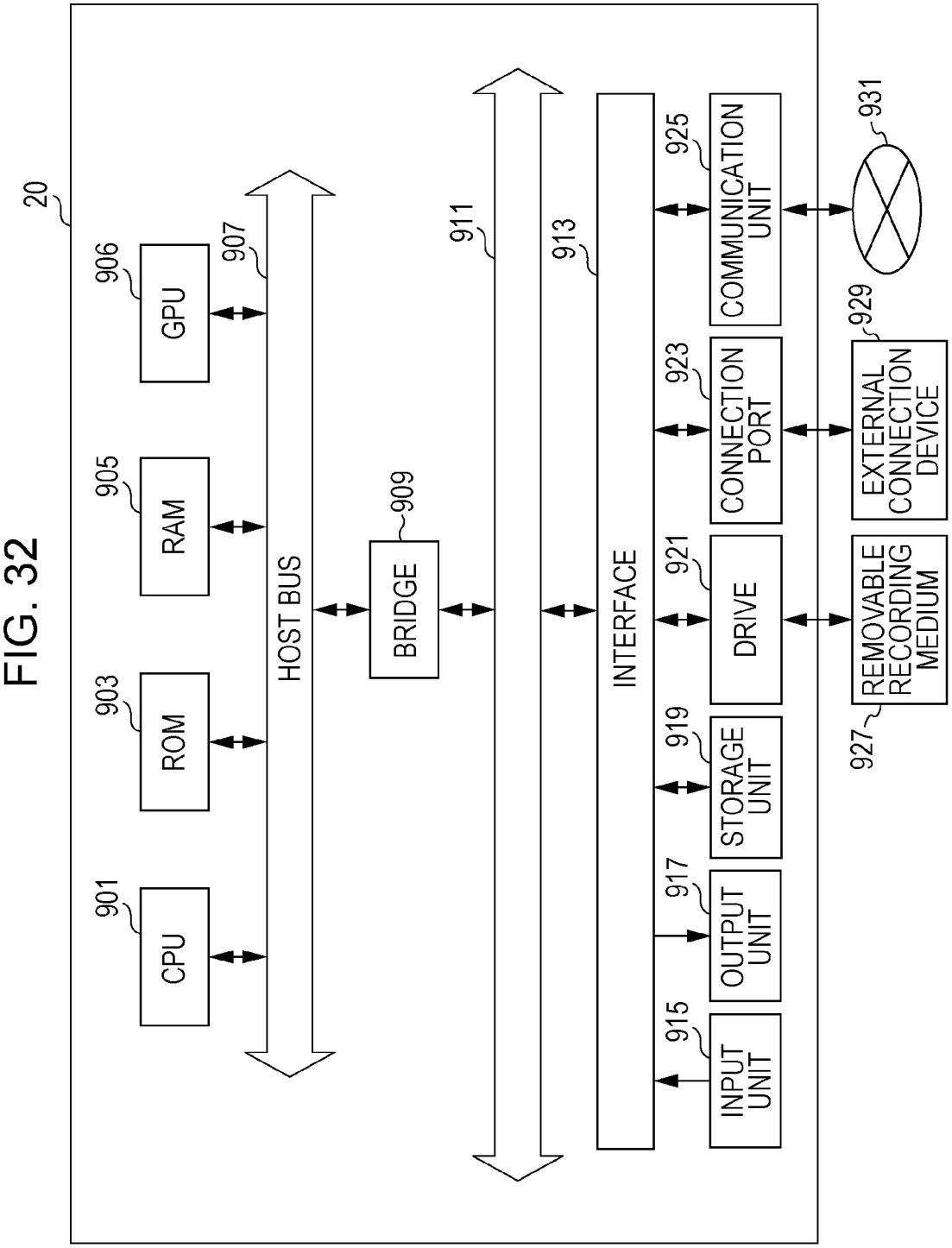
FIG. 32 is a block diagram illustrating the hardware configuration of microscope control device according to the example embodiments of the present disclosure.

Next, the hardware configuration of the microscope control device 20 according to the example embodiments of the present disclosure will be described in detail with reference to FIG. 32. FIG. 32 is a block diagram illustrating the hardware configuration of the microscope control device 20 according to the example embodiments of the present disclosure.

The microscope control device 20 mainly includes a CPU 901, a ROM 903, a RAM 905, and a GPU (Graphics Processing Unit) 906. In addition, the microscope control device 20 further includes a host bus 907, a bridge 909, an external bus 911, an interface 913, an input unit 915, an output unit 917, a storage unit 919, a drive 921, a connection port 923, and a communication unit 925.

The CPU 901 functions as an arithmetic operation processing unit and a control unit, and controls the entirety or a portion of operations within the microscope control device 20 in accordance with various types of programs recorded in the ROM 903, the RAM 905, the storage unit 919, or the removable recording medium 927. The ROM 903 stores programs or operational parameters and the like used by the CPU 901. The RAM 905 primarily stores programs or parameters appropriately changed in executing the programs which are used by the CPU 901. In addition, the GPU 906 functions as a control unit and an arithmetic operation processing unit that performs operational processing regarding various types of image processing performed within the microscope control device 20. The GPU 906 controls the entirety or a portion of operations of the image processing within the microscope control device 20 in accordance with various types of programs recorded in the ROM 903, the RAM 905, the storage unit 919, or the removable recording medium 927. These components are interconnected to each other by the host bus 907 composed of internal buses such as a CPU bus.

The host bus 907 is connected to the external bus 911 such as a PCI (Peripheral Component Interconnect/Interface) bus through the bridge 909.

The input unit 915 is, for example, an operational unit such as a mouse, a keyboard, a touch panel, a button, a switch and lever which are operated by a user. In addition, the input unit 915 may be, for example, a remote control unit (so-called, remocon) in which infrared rays or other radio waves are used, and may be an external connection device 929 such as a cellular phone or a PDA responding to the operation of the microscope control device 20. Further, the input unit 915, for example, generates an input signal on the basis of information input by the user using the above-mentioned operational unit, and includes an input control circuit and the like output to the CPU 901. The user of the microscope control device 20 can input various types of data to the microscope control device 20 or instruct processing operations by operating this input unit 915.

The output unit 917 includes a unit capable of visually or aurally notifying the acquired information of the user. Such a unit includes display devices such as a CRT display device, a liquid crystal device, a plasma display device, an EL display device and a lamp, voice output units such as a speaker and a headphone, a printer, a cellular phone, a facsimile, and the like. The output unit 917, for example, outputs a result obtained through various types of processing performed by the microscope control device 20. Specifically, the display unit displays the result obtained through various types of processing performed by the microscope control device 20 using a text or an image. On the other hand, the voice output unit converts audio signals including reproduced voice data or acoustic data into analog signals and outputs them.

The storage unit 919 is a data storage unit which is an example of the storage section of the microscope control device 20. The storage unit 919 includes, for example, a magnetic storage device such as an HDD (Hard Disk Drive), a semiconductor storage device, an optical storage device, magneto-optical storage device, or the like. This storage unit 919 stores programs executed by the CPU 901 or various types of data, various types of data acquired from the outside, and the like.

The drive 921 is a reader/writer for recording media, and is inside or outside attached to the microscope control device 20. The drive 921 reads out information recorded in the removable recording medium 927 such as a magnetic disk, an optical disk, a magneto-optical disk, or a semiconductor memory which are mounted thereto, and outputs the information to the RAM 905. In addition, the drive 921 can also write a record to the removable recording medium 927 such as a magnetic disk, an optical disk, a magneto-optical disk, or a semiconductor memory which are mounted thereto. The removable recording medium 927 is, for example, DVD media, HD-DVD media, Blu-ray media, or the like. In addition, the removable recording medium 927 may be a compact flash (CF) (registered trademark), a flash memory, an SD (Secure Digital) memory card, or the like. In addition, the removable recording medium 927 may be, for example, an IC (Integrated Circuit) card in which a contactless IC chip is mounted, an electronic apparatus, or the like.

The connection port 923 is a port for directly connecting devices to the microscope control device 20. An example of the connection port 923 includes a USB (Universal Serial Bus) port, an IEEE1394 port, a SCSI (Small Computer System Interface) port, or the like. Another example of the connection port 923 includes a RS-232C port, an optical audio terminal, an HDMI (High-Definition Multimedia Interface) port, or the like. By connecting the external connection device 929 to this connection port 923, the microscope control device 20 acquires various types of data directly from the external connection device 929, or provides various types of data to the external connection device 929.

The communication unit 925 is, for example, a communication interface including a communication device and the like for connection to a communication network 931. The communication unit 925 is, for example, a wired or wireless LAN (Local Area Network), Bluetooth (registered trademark), a communication card for WUSB (Wireless USB), or the like. In addition, the communication unit 925 may be an optical communication router, an ADSL (Asymmetric Digital Subscriber Line) router, various types of communication modems, or the like. This communication unit 925, for example, can transmit and receive signals and the like between the Internet or other communication equipment and the communication unit on the basis of, for example, a predetermined protocol such as TCP/IP. In addition, the communication network 931 connected to the communication unit 925 includes a network and the like which are wiredly or wirelessly connected thereto, and may be, for example, the Internet, a home LAN, infrared communication, radio wave communication, various types of private communication, satellite communication, or the like.

As described above, an example has been shown of the hardware configuration capable of implementing a function of the microscope control device 20 according to the example embodiments of the present disclosure. Each of the above-mentioned components may be configured using a general-purpose member, and may be configured using hardware specific to the functions of each of the components. Therefore, it is possible to change the hardware configuration appropriately used in accordance with the technical level whenever the example embodiments are carries out.

In addition, the image management server 30 and the image display device 40 according to the example embodiments have the same hardware configuration as that of the microscope control device 20 according to the example embodiment, and detailed description thereof will be omitted.

As described above, in the microscope control device 20 according to the example embodiments of the present disclosure, the in-focus position information which is information indicating a local in-focus position is generated with respect to the recorded image (microscope image) of the sample captured continuously in the depth direction. When the magnified image of the sample is displayed on the display screen by using such in-focus position information, the image display device 40 can display the magnified image of the sample in which each of the portions or an arbitrary portion is in an optimal in-focus state due to a low load.

As described above, although the preferred example embodiments of the present disclosure have been described in detail with reference to the accompanying drawings, the present disclosure is not limited to such an example. It should be understood by those skilled in the art that various modifications, combinations, sub-combinations and alterations may occur depending on design requirements and other factors insofar as they are within the scope of the appended claims or the equivalents thereof.

For example, in the above-mentioned example embodiment, although the case has been described where the in-focus position information generation processing according to the example embodiments of the present disclosure is performed by the microscope control device 20, the present disclosure is not limited to such an example. For example, the in-focus position information generation processing according to the example embodiments of the present disclosure may be performed by the image management server, and may be performed by the microscope itself insofar as sufficient resources exist in the microscope itself. The in-focus position information generation processing is performed in, for example, the image management server, whereby it is possible to generate the in-focus position information even with respect to the microscope image captured by the microscope different from the microscope according to the example embodiments of the present disclosure. In addition, the in-focus position information generation processing according to the example embodiments of the present disclosure may be performed in the image display device which is a terminal for observing the microscope image.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A microscope control device comprising:
a controller configured to:
(a) store data for a plurality of images of an object being observed at different depth positions, wherein the plurality of images are magnified digital images and include a first image and a second image;
(b) divide each of the plurality of images into a plurality of sub-regions, comprising dividing the first image into a first number of sub-regions having a first plurality of positions and the second image into a second number of sub-regions having a second plurality of positions, the first plurality of positions corresponding to the second plurality of positions; and
(c) for each sub-region, generate in-focus position information which corresponds to a depth position, wherein the controller is further configured to:
   (a) calculate an evaluation value of contrast for each of the plurality of images with respect to a sub-region of interest;
   (b) using the calculated evaluation value, determine one of the plurality of images whose evaluation value of contrast in the sub-region of interest becomes a maximum value to be an in-focus image; and
   (c) generate, as the in-focus position information, a look-up table in which sub-region identification numbers for specifying the plurality of sub-regions and numbers given to the in-focus images in the corresponding sub-regions are associated with each other to specify the in-focus images with respect to all the sub-regions,
   (d) generate, as the in-focus position information, at least one of a color distribution map,
   (d) use the generated in-focus position information to generate an all-in-focus image of the object being observed by extracting and linking together the in-focus images with respect to all the sub-regions; and
   (e) adjust the depth position of the all-in-focus image of the object being observed by adjusting the depth position of the in-focus image of each sub-region using the in-focus image of a next neighboring sub-region, the in-focus image of the last sub-region being used as it is.

2. The microscope control device of claim 1, wherein, for each sub-region, the in-focus position information indicates: (a) said sub-region; and (b) one of the plurality of images in an in-focus state.

3. The microscope control device of claim 1, wherein the image in the in-focus state is a digital image.

4. The microscope control device of claim 1, wherein the plurality of images are acquired from a microscope.

5. An information processing apparatus comprising:
a microscope control device including a controller configured to:
(a) store data for a plurality of images of an object being observed at different depth positions, wherein the plurality of images are magnified digital images;
(b) divide each of the plurality of images into a plurality of sub-regions; and
(c) for each sub-region, generate in-focus position information which corresponds to a depth position, wherein the controller is further configured to:
   (a) calculate an evaluation value of contrast for each of the plurality of images with respect to a sub-region of interest;
   (b) using the calculated evaluation value, determine one of the plurality of images whose evaluation value of contrast in the sub-region of interest becomes a maximum value to be an in-focus image; and
   (c) generate, as the in-focus position information, a look-up table in which sub-region identification numbers for specifying the plurality of sub-regions and numbers given to the in-focus images in the corresponding sub-regions are associated with each other to specify the in focus images with respect to all the sub-regions,
   (d) use the generated in-focus position information to generate an all-in-focus image of the object being observed by extracting and linking together the in-focus images with respect to all the sub-regions; and
   (e) adjust the depth position of the all-in-focus image of the object being observed by adjusting the depth position of the in-focus image of each sub-region using the in-focus image of a next neighboring sub-region, the in-focus image of the last sub-region being used as it is.

6. The information processing apparatus of claim 5, wherein the information processing apparatus is a microscope.

7. An information processing system comprising:
a display device;
an information management server;
a microscope; and
a microscope control device including a controller configured to:
(a) store data for a plurality of images of an object being observed at different depth positions, wherein the plurality of images are magnified digital images;
(b) divide each of the plurality of images into a plurality of sub-regions; and
(c) for each sub-region, generate in-focus position information which corresponds to a depth position, wherein the controller is further configured to:
   (a) calculate an evaluation value of contrast for each of the plurality of images with respect to a sub-region of interest;
   (b) using the calculated evaluation value, determine one of the plurality of images whose evaluation value of contrast in the sub-region of interest becomes a maximum value to be an in-focus image; and
   (c) generate, as the in-focus position information, a look-up table in which sub-region identification numbers for specifying the plurality of sub-regions and numbers given to the in focus images in the corresponding sub-regions are associated with each other to specify the in-focus images with respect to all the sub-regions,
   (d) use the generated in-focus position information to generate an all-in-focus image of the object being observed by extracting and linking together the in-focus images with respect to all the sub-regions; and
   (e) adjust the depth position of the all-in-focus image of the object being observed by adjusting the depth position of the in-focus image of each sub-region using the in-focus image of a next neighboring sub-region, the in-focus image of the last sub-region being used as it is.

8. The information processing system of claim 7, wherein the controller is configured to:
(a) cause the display device to display a selectable first icon; and
(b) in response to a selection of the selectable first icon, cause the display device to display an entire in-focus image.

9. The information processing system of claim 7, wherein the controller is configured to:

(a) cause the display device to display one of the plurality of images; and
(b) enable a user to select one of the sub-regions of the display image;
(c) for the selected sub-region, cause the display device to display information indicating a depth position of a selected sub-region.

10. A method of operating a microscope control device, the method comprising:
(a) causing a controller to store data for a plurality of images of an object being observed at different depth positions, wherein the plurality of images are magnified digital images;
(b) causing the controller to divide each of the plurality of images into a plurality of sub-regions; and
(c) causing the controller to, for each sub-region, generate in-focus position information which corresponds to a depth position, wherein the controller is configured to:
(a) calculate an evaluation value of contrast for each of the plurality of images with respect to a sub-region of interest;
(b) using the calculated evaluation value, determine one of the plurality of images whose evaluation value of contrast in the sub-region of interest becomes a maximum value to be an in-focus image; and
(c) generate, as the in-focus position information, a look-up table in which sub-region identification numbers for specifying the plurality of sub-regions and numbers given to the in-focus images in the corresponding sub-regions are associated with each other to specify the in-focus images with respect to all the sub-regions,
(d) using the generated in-focus position information to generate an all-in-focus image of the object being observed by extracting and linking together the in-focus images with respect to all the sub-regions; and
(e) adjusting the depth position of the all-in-focus image of the object being observed by adjusting the depth position of the in-focus image of each sub-region using the in-focus image of a next neighboring sub-region, the in-focus image of the last sub-region being used as it is.

11. A non-transitory computer-readable medium storing instructions structured to cause an information processing apparatus to:
(a) store data for a plurality of images of an object being observed at different depth positions, wherein the plurality of images are magnified digital images;
(b) divide each of the plurality of images into a plurality of sub-regions; and
(c) for each sub-region, generate in-focus position information which corresponds to a depth position, wherein the controller is further configured to:
(a) calculate an evaluation value of contrast for each of the plurality of images with respect to a sub-region of interest;
(b) using the calculated evaluation value, determine one of the plurality of images whose evaluation value of contrast in the sub-region of interest becomes a maximum value to be an in-focus image; and
(c) generate, as the in-focus position information, a look-up table in which sub-region identification numbers for specifying the plurality of sub-regions and numbers given to the in-focus images in the corresponding sub-regions are associated with each other to specify in focus images with respect to all the sub-regions,
(d) use the generated in-focus position information to generate an all-in-focus image of the object being observed by extracting and linking together the in-focus images with respect to all the sub-regions; and
(e) adjust the depth position of the all-in-focus image of the object being observed by adjusting the depth position of the in-focus image of each sub-region using the in-focus image of a next neighboring sub-region, the in-focus image of the last sub-region being used as it is.

* * * * *